United States Patent
Wallace

(10) Patent No.: US 6,609,054 B2
(45) Date of Patent: Aug. 19, 2003

(54) VEHICLE OCCUPANT CLASSIFICATION SYSTEM AND METHOD

(75) Inventor: Michael W. Wallace, 2703 SE. Briarwood Dr., Vancouver, WA (US) 98683

(73) Assignee: Michael W. Wallace ( * ) Notice: Subject to any disclaimer, the term of this patent is extended or adjusted under 35 U.S.C. 154(b) by 0 days.

(21) Appl. No.: 09/853,848

(22) Filed: May 10, 2001

(65) Prior Publication Data

US 2003/0040858 A1 Feb. 27, 2003

Related U.S. Application Data

(60) Provisional application No. 60/203,001, filed on May 10, 2000.

(51) Int. Cl.[7] ............................................. G06F 7/00
(52) U.S. Cl. .................... 701/45; 180/271; 180/273; 280/728.1; 280/735
(58) Field of Search ....................... 701/45, 46, 47, 701/49; 280/728.1, 734, 735; 180/273, 268, 271; 318/286, 466, 467, 468; 307/10.1

(56) References Cited

U.S. PATENT DOCUMENTS

| | | | | |
|---|---|---|---|---|
| 5,538,098 A | * | 7/1996 | Sparhawk .................... 180/270 |
| 5,748,473 A | * | 5/1998 | Breed et al. .................. 701/45 |
| 5,822,707 A | * | 10/1998 | Breed et al. .................. 701/49 |
| 6,005,485 A | * | 12/1999 | Kursawe et al. ............. 340/665 |
| 6,012,007 A | | 1/2000 | Fortune et al. ............... 701/45 |
| 6,015,163 A | * | 1/2000 | Langford et al. ............ 280/735 |
| 6,024,378 A | | 2/2000 | Fu ............................... 280/735 |
| 6,134,492 A | * | 10/2000 | Breed et al. ................... 701/49 |
| 6,186,539 B1 | | 2/2001 | Foo et al. ..................... 280/735 |
| 6,199,902 B1 | * | 3/2001 | Cooper et al. .............. 280/735 |
| 6,242,701 B1 | * | 6/2001 | Breed et al. ................. 177/144 |
| 6,253,134 B1 | * | 6/2001 | Breed et al. .................. 701/49 |
| 6,330,501 B1 | * | 12/2001 | Breed et al. .................. 701/49 |
| 6,364,352 B1 | * | 4/2002 | Norton ........................ 280/735 |

* cited by examiner

Primary Examiner—Gertrude Arthur
(74) Attorney, Agent, or Firm—Marger Johnson & McCollom, P.C.

(57) ABSTRACT

A vehicle occupant classification system classifies a vehicle occupant based on data from an array of sensors using a combination of weight estimation, pattern recognition, and evaluation of statistical characteristics. This occupant classification can then be used to make an airbag deployment state decision. The major modules of this system can include a calibration unit, a weight estimation module, a pattern module, and a decision-making module. The calibration unit can perform a calibration process to normalize sensor deflections using a known deflection force in order to compensate for variations in sensors and the effects of the seat trim and foam. The weight estimation module can perform a weight estimation process that uses calibration data from the calibration process and sensor data from the sensors to translate sensor deflection due to a vehicle occupant into a displacement value. The pattern module can look for traits in the pattern of sensor deflections that are common for objects other than people. Finally, the decision-making module can make a deployment state decision for the airbag by looking at displacement trends to evaluate occupant weight and movement, and by evaluating pattern information.

19 Claims, 30 Drawing Sheets

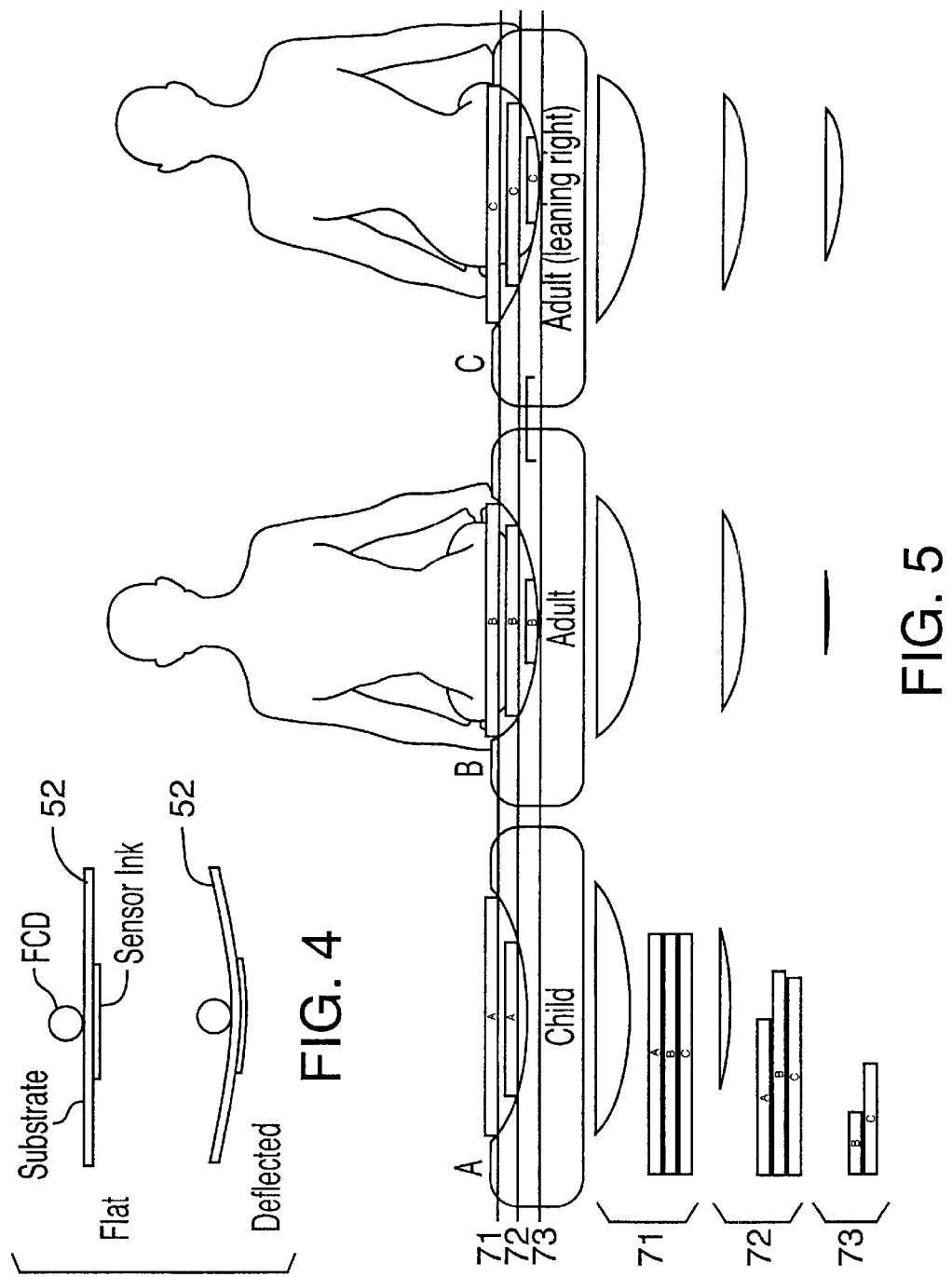

Seat Bottom with Sensor System

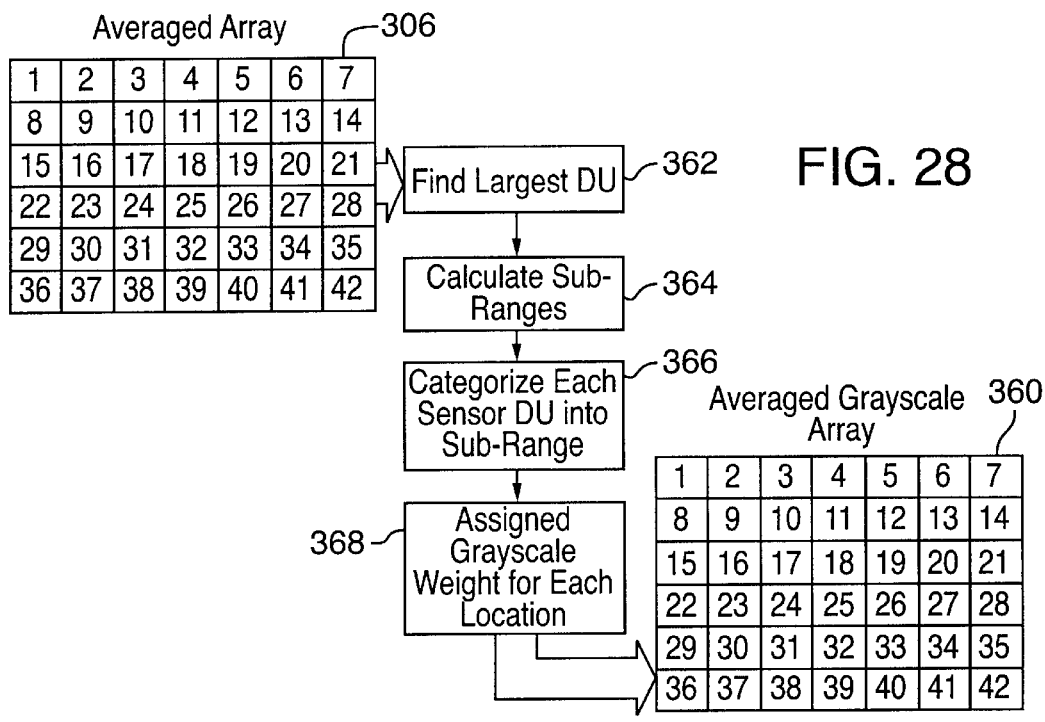
FIG. 28
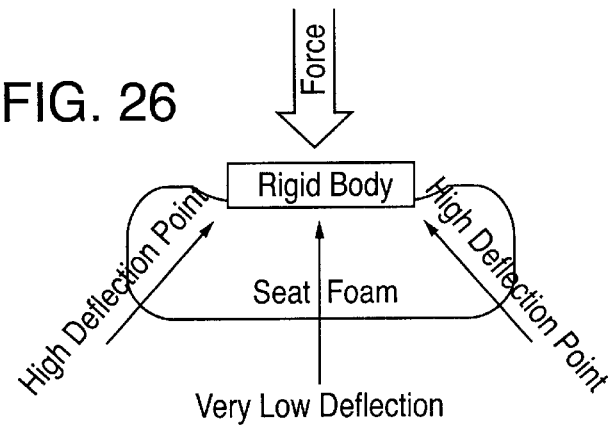
FIG. 26
FIG. 27
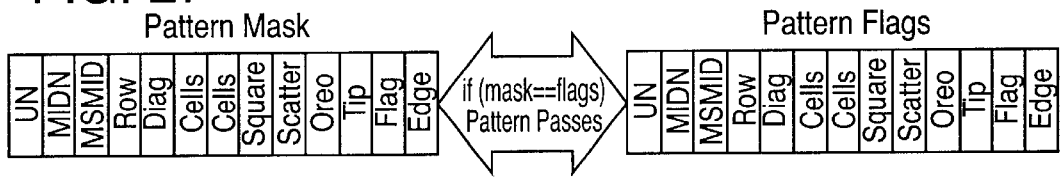

FIG. 29A
360 Averaged Grayscale Array
U-Region 372

| 1 | 2 | 3 | 4 | 5 | 6 | 7 |
|---|---|---|---|---|---|---|
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 32 | 33 | 34 | 35 |
| 36 | 37 | 38 | 39 | 40 | 41 | 42 |

FIG. 29B
360 Averaged Grayscale Array
N-Region 374

| 1 | 2 | 3 | 4 | 5 | 6 | 7 |
|---|---|---|---|---|---|---|
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 32 | 33 | 34 | 35 |
| 36 | 37 | 38 | 39 | 40 | 41 | 42 |

FIG. 29C
360 Averaged Grayscale Array
MID-Region

| 1 | 2 | 3 | 4 | 5 | 6 | 7 |
|---|---|---|---|---|---|---|
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 32 | 33 | 34 | 35 |
| 36 | 37 | 38 | 39 | 40 | 41 | 42 |

376

FIG. 29D
360 Averaged Grayscale Array
MS-Region

| 1 | 2 | 3 | 4 | 5 | 6 | 7 |
|---|---|---|---|---|---|---|
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 32 | 33 | 34 | 35 |
| 36 | 37 | 38 | 39 | 40 | 41 | 42 |

378

Averaged Grayscale Array
Thin Occupant
(ThinWidth = 3)

| 1 | 2 | 3 | 4 | 5 | 6 | 7 |
|---|---|---|---|---|---|---|
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 32 | 33 | 34 | 35 |
| 36 | 37 | 38 | 39 | 40 | 41 | 42 |

Averaged Grayscale Array
Wide Occupant
(ThinWidth = 3)

| 1 | 2 | 3 | 4 | 5 | 6 | 7 |
|---|---|---|---|---|---|---|
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 32 | 33 | 34 | 35 |
| 36 | 37 | 38 | 39 | 40 | 41 | 42 |

Thin/Wide Statistical Collection

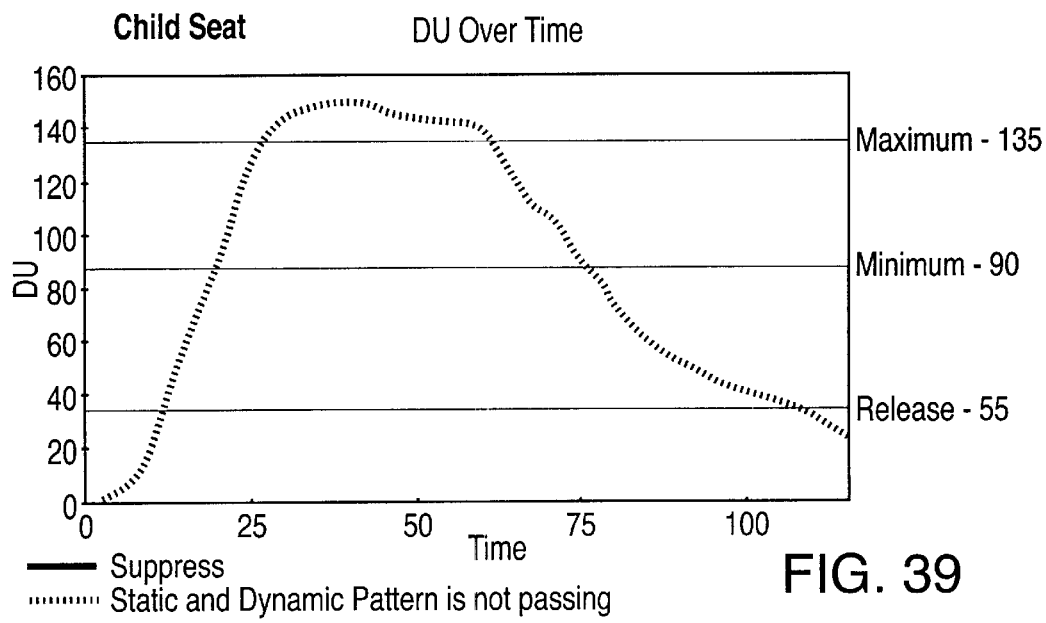

Child Seat     DU Over Time

— Suppress
······· Static and Dynamic Pattern is not passing

FIG. 39

```
Enter Each Frame if (passPattern==TRUE)  // if pattern is passing occupant this
{                       //   frame increment patternYES counter.
        patternYES++;
}
if (totalDU>minDU)      // if current DU is greater than minDU
{                       //   occupant occupant weight qualifies for
        minYES++;       //   deploy, so, increment minYES counter.
}
if (totalDU>maxDU)      // if current DU is greater than maxDU
{                       //   occupant can be classified as "heavy"
        maxYES++;       //   or "large", so increment maxYES
}                       //   counter.
if (totalDU>releaseDU)  // if current DU is greater than releaseDU
                        //   occupant is still heavy enough not to
{                       //   force suppress decision, (if decision is
        releaseYES++;   //   currently deploy) so, increment
}                       //   releaseYES counter.
if (totalDU<emptyValue) // if current DU is greater than releaseDU
{                       //   DU level qualifies for empty status, so,
        zeroYES++;      //   increment zeroYES counter.
}

EXIT
```

*Update Current Second's running statistics*

FIG. 40

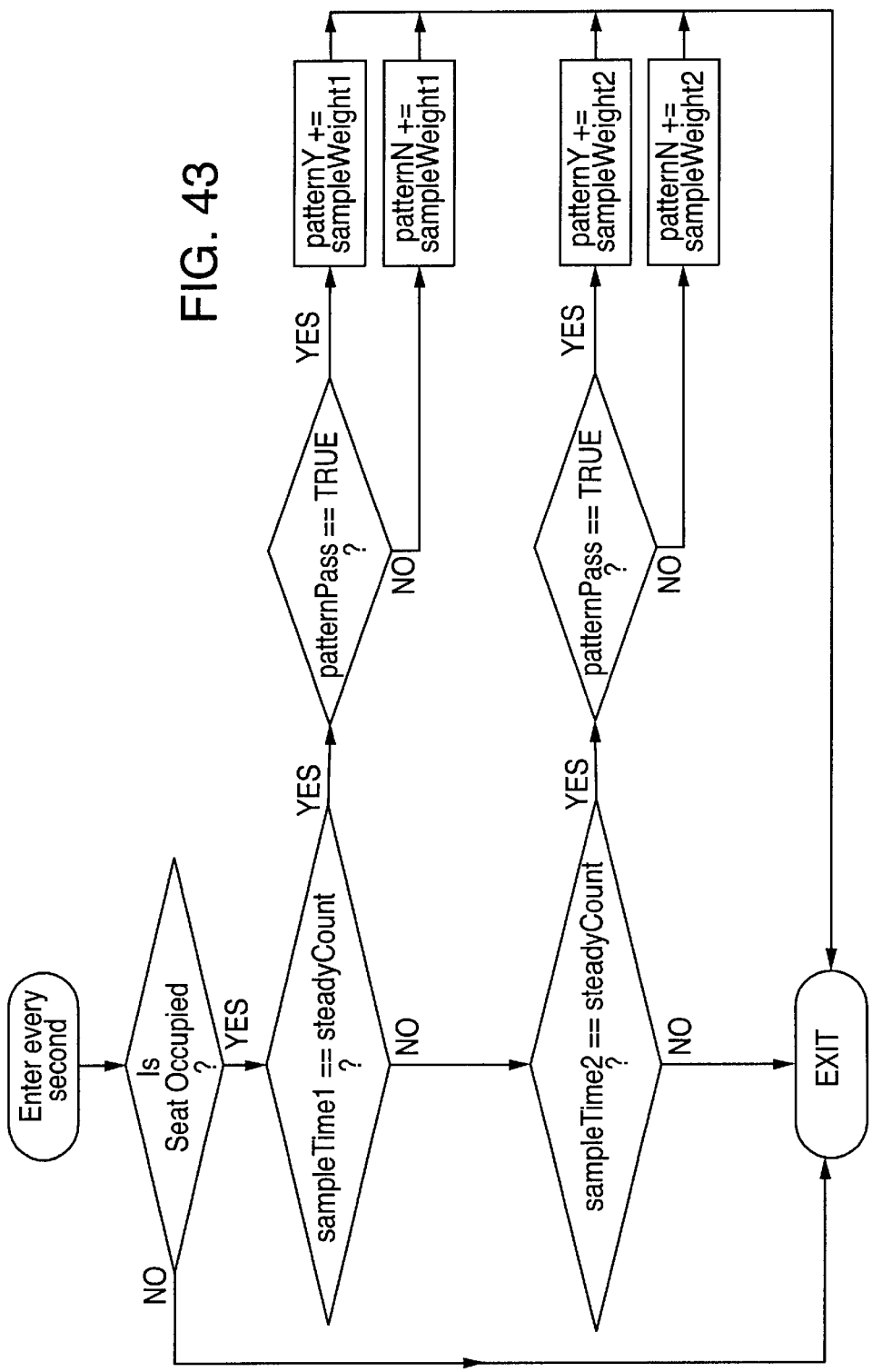

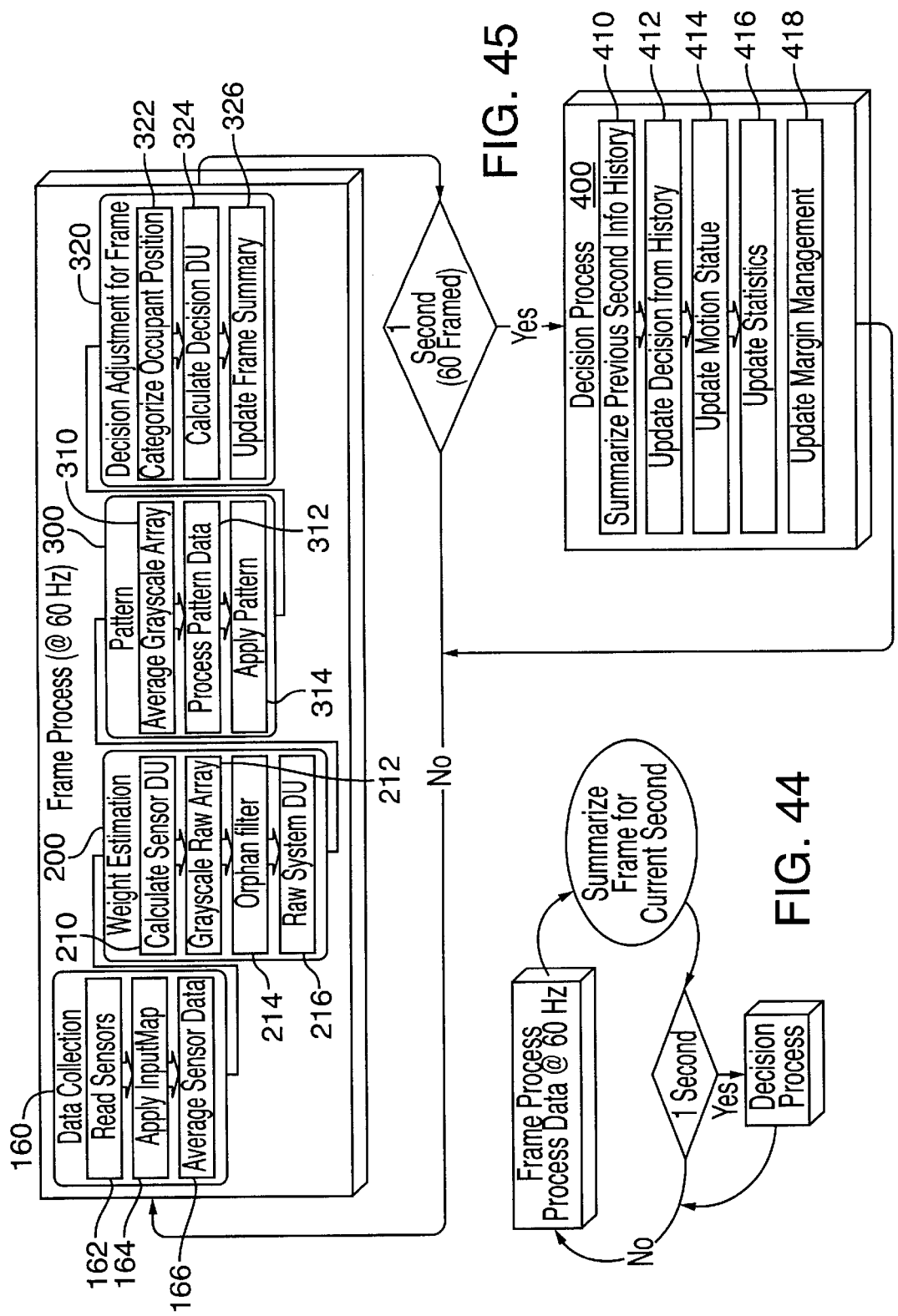

VEHICLE OCCUPANT CLASSIFICATION SYSTEM AND METHOD

This application claims priority from U.S. Provisional Application Ser. No. 60/203,001, filed May 10, 2000, herein incorporated by reference.

BACKGROUND OF THE INVENTION

This invention relates generally to systems and methods for detecting the occupants of an automobile. More specifically, this invention relates to weight-based and pattern-based automobile occupant detection systems and to methods and systems for making airbag deployment decisions based on information received from an occupant detection system.

In the United States, airbag deployment forces and speeds have been optimized to save 180 lb. males. Unfortunately, the force and speed requirements to save 180 lb. males are tremendous, and present a potentially fatal hazard to young children (especially when seated in rear-facing infant seats) and to small females. There is also a significant danger of physical injury or death from airbag deployment for anyone who is situated too close to the dashboard/steering column or who is otherwise in a vulnerable position during deployment. The National Highway Traffic Safety Administration (NHTSA) has proposed a set of requirements for automobile manufacturers to develop and install "smart" airbag systems that will detect an automobile occupant and disable the airbag when the occupant is at risk. It is also desirable to have systems which are able to adjust the deployment force/speed of airbags, as occupant classification becomes more accurate.

Several key terms are used by the NHTSA and most automotive manufacturers for occupant classification. A Rear Facing Infant Seat (RFIS) is a rear facing fixture designed to protect infants up to 30 lbs. An Infant Bed is a flat bed that straps into an automobile seat and allows infant to lie horizontally and sleep. Infant beds and RFISs are designed for infants only (typically up to 30 lbs.). A Forward Facing Child Seat (FFCS) is a forward facing seating fixture designed for children up to 40 lbs. A Booster Seat is also a forward facing seating fixture, but is designed for children heavier than 40 lbs. There are two types of booster seats: namely, booster seats that use the automobile's safety belt system to protect the child and simply augment the child's position in the seat and guide the shoulder belt into a proper position; and booster seats that are held by the automobile's belt system and have folding arms or other methods of restraining the child.

The broad goal of occupant detection/airbag suppression systems is to distinguish between adults, for whom the airbags should deploy, and children, for whom they shouldn't. Accordingly, occupant classification requirements are based on categories of occupants. Children weighing between 29.5–39.5 lbs. are generally termed "3-Year Olds" (although GM includes children up to 45 lbs.), while those weighing between 46.5–56.5 lbs. are defined as "6-Year Olds" (GM includes children up to 66 lbs.). Female adults weighing between 103–113 lbs. are referred to as "$5^{th}$ Percentile Females" or "$5^{th}$ Females". And adult males weighing approximately 140–150 lbs. are "50th Percentile Males". It should be noted that despite these generally accepted occupant categories, different automobile manufacturers interpret and endorse variations in the specific occupant detection requirements for their automobiles according to the development status and level of confidence they have in the occupant detection technologies they have evaluated.

FIG. 1 is a graph illustrating the industry deployment and suppression categories for airbag suppression systems. As shown, $5^{th}$ Percentile Females and $50^{th}$ Percentile Males are in the deploy section of the graph. In other words, airbags should typically be deployed when occupants within either of those two categories are sensed. The suppression category, on the other hand, encompasses 6-Year Olds, 3-Year Olds, and all types of child seats. When an occupant of any of these types is sensed, airbag deployment should typically be suppressed. A gray zone appears between the suppress and deploy zones. This gray zone represents a zone of uncertainty for occupants who do not clearly register within either the deployment zone or the suppression zone. A gray zone exists because the difference between actual weight/pattern characteristics in an automobile seat for 6-Year Olds and $5^{th}$ Percentile Females is quite small. In other words, it is very hard to distinguish between $5^{th}$ Percentile Females and 6-Year Olds based on their in-seat weight or pattern characteristics. Accordingly, there is very little room for error in occupant detection systems.

There are two common approaches to vehicle occupant detection, namely, weight-based detection and proximity detection. As its name implies, the weight-based detection approach uses the weight of the occupant in the seat for occupant classification. As will be discussed below, some conventional weight-based detection systems are strictly weight-based while others employ pattern-based occupant recognition of various types as well.

Because of the obvious physical differences between $5^{th}$ Percentile Females, 6-Year Olds, and car seats, it might be fairly easy to distinguish between them in some applications. On the surface, therefore, it might appear that distinction between them as vehicle occupants should not be terribly difficult. Unfortunately, however, as the following table, Table 1, illustrates, distinguishing between these occupant categories is a very challenging undertaking.

TABLE 1

Typical In-Seat Weights of Vehicle Occupants

| Occupant-Type | Typical Weight in Automobile Seat |
| --- | --- |
| $5^{th}$ Percentile Female | 75 lbs. |
| 6-Year Old | 65 lbs. |
| 3-Year Old in FFCS | 73 lbs. |

Table 1 compares typical weights exerted in an automobile seat by an average $5^{th}$ Percentile Female, 6-Year Old, and 3-Year Old in a forward facing child seat (FFCS). The similarity between these occupant-types in their typical in-seat weights makes it extremely difficult to classify them based solely on this characteristic. As the table indicates, only 2 lbs. separates the average $5^{th}$ Percentile Female's typical in-seat weight (75 lbs.) from that of the average 3-Year Old in a FFCS (73 lbs). Only 10 lbs. separates the average $5^{th}$ Percentile Female's typical in-seat weight from that of the average 6-Year Old (65 lbs.).

There are several reasons for the similarity of typical in-seat weights between these occupant-types. One reason is that small children will have most of their weight in the seat itself while $5^{th}$ Percentile Females tend to place more of their leg weight out of the seat. Another reason for the similarity is that the weight of the child seat contributes to the weight measured for a 3-Year Old in a FFCS.

The problem of accurately classifying an occupant based on his or her in-seat weight is compounded as the occupant moves in the seat. This is due to the fact that as the occupant moves in the seat, large variations in in-seat weight might be detected. Simply using the armrest or leaning against the door can reduce the occupant's weight in the seat. Clothing friction against the seat back and the angle of inclination of the seat back can also affect the amount of weight exerted in the seat. All of these factors make the in-seat weight of an occupant insufficient as a sole source of information for occupant detection.

Accordingly, several variations in the conventional weight-based approach exist. A first variation is based on "A-surface" technologies. A-surface technologies typically use film-type sensors which are placed on the "A" surface (i.e., the top surface) of the seat foam, just beneath the trim. A first of these A-surface systems uses the Institution of Electrical Engineers (IEE) Force Sensing Resistor (FSR). The FSR is a force sensor sandwiched between two layers of polyester. The IEE FSR was originally developed by Interlink Electronics, but has been licensed by IEE for automotive use. IEE had the first occupant detection system in production for such companies as Mercedes. Unfortunately, the IEE FSR is notoriously difficult to use and suffers from a high degree of variation in production. Accordingly, these early systems are very simple single sensor designs with the sensor in the center of the seat, designed only to detect the presence or absence of an occupant. The primary reason for this system is to prevent airbag deployment for empty seats to avoid the unnecessary replacement of expensive airbags. There are a number of companies now developing smart airbag systems that use IEE's FSR technology. A list of these companies can currently be found on the internet.

A second A-surface sensor system uses the Flexpoint bend sensor. One Flexpoint bend sensor is described in detail in U.S. Pat. No. 5,583,476 issued to Gordon Langford in December 1996. The first Flexpoint Bend Sensor was invented by Gordon Langford in the late 1980's and was used in Mattel's PowerGlove for the 8-bit Nintendo system. This technology has been in production for the automotive industry's smart airbag systems only since 1996, however. While the IEE sensor detects force applied to its surface, the Flexpoint bend sensor, when used as an occupant detector, relies on seat foam deflection for force detection. Seat foam typically exhibits a memory, however, and therefore isn't an ideal mechanical medium for a deflection sensor without its own spring system. To overcome this problem, the Flexpoint system uses Force Concentrating Devices (FCDs) to magnify sensor movement in the foam. Further descriptions of the Flexpoint bend sensor and its applications can currently be found on the internet.

A third A-surface sensor system relies on the Delphi-Delco Bladder for force detection. This system uses a bladder filled with silicone (or a similar substance) and a single pressure transducer. The bladder is mounted in the bottom of the seat pan beneath the seat bottom foam. Unfortunately, this system is only able to approximate weight in the seat and cannot reliably distinguish between 6-Year Olds and $5^{th}$ Percentile Females. It also cannot accurately classify tightly belted child seats in static (without vehicle motion) situations. This system does, however, sense the motion produced by an object or occupant in the seat to aid in occupant classification. Because tightly belted child seats tend to have less free motion in the seat than live occupants, motion tracking is useful in occupant detection. Accordingly, although not reliable for static situations, these systems can be used to satisfy some of the goals of occupant detection. Presently, Ford is preparing to put this type of system into production.

Each of these various A-surface sensor systems has its own advantages and drawbacks. Each is being used by various companies in an attempt to provide more accurate occupant detection systems. Furthermore, other types of weight-based detection systems continue to be developed.

Seat Frame Systems provide another variation to weight-based occupant detection. Several companies, like TRW Inc. (TRW), have mounted load cells at the base of the seat frame to measure weight in the seat. Unfortunately, these seat frame systems can only estimate occupant weight based on the weight exerted in the seat. Furthermore, the presence of floor-anchored seat belts complicates decisions for these systems. Frame-based systems are, however, fairly good at detecting shifts in weight in the seat during vehicle motion.

Proximity detection offers an alternative to weight-based detection as a way to identify vehicle occupants. Proximity detection is based on the consideration that the danger of injury or death resulting from airbag deployment is directly related to the distance of the occupant from the airbag. In other words, the closer the occupant is positioned to the airbag, the greater the risk of injury from its deployment. One reason why small females are particularly at risk, for example, is because they tend to position their seats closer to the dashboard or steering column containing the airbag. Accordingly, proximity detection systems generally use a combination of ultrasonic and infrared sensors to monitor a region in the airbag deployment path. If an object is in this path, they may elect to disable the airbag. A drawback of proximity detection systems is that they generally have difficulty making the appropriate deployment decision when books, pillows, newspapers, or other objects are held in front of the occupant. Proximity detection systems also frequently have difficulty detecting child seats. Presently, many companies, such as Siemens, TRW, and Bosch, are working on proximity detection systems.

Each of the occupant detection systems described above requires software to translate the information received from the sensors into useable data for occupant classification. Unfortunately, no one has yet been able to provide a hardware/software combination capable of meeting all of the NHTSA's proposed requirements. None of the known occupant detection systems currently in existence are able to accurately distinguish between $5^{th}$ Percentile Females and 6-Year Olds.

Accordingly, a need remains for a more accurate way to detect an occupant of a vehicle seat, and to discriminate more precisely among occupants of different size/weight characteristics.

SUMMARY OF THE INVENTION

One object of the present invention is to enable a vehicle occupant detection system to classify vehicle occupants accurately.

Another object of the present invention is to enable a vehicle occupant detection system to distinguish accurately between $5^{th}$ Percentile Females and 6-Year Olds.

Another object of the present invention is to provide an airbag deployment system that makes a suppress or deploy decision based on an accurate identification of a vehicle occupant.

The vehicle occupant classification system of the present invention provides a significant improvement in the art by classifying seat occupants based on sensor data from a calibrated array of sensors using a combination of weight estimation, pattern recognition, and statistical evaluation. The occupant classification results can then be used to make an appropriate airbag deployment state decision. The major modules of this system can include a calibration unit, a weight estimation module, a pattern module, and a decision-making module.

The Calibration Unit receives sensor data from a sensor mat subjected to a calibration force during a calibration process. The purpose of the calibration process is to normalize sensor deflections across the mat to compensate for variations in sensors and for effects of the seat trim and foam on sensor characteristics. Calibration data from the calibration process is stored for use by the other system components.

The Weight Estimation Module uses the calibration data to translate each sensor's deflection reading (sensor data) due to a seat occupant into a relative deflection value (Sensor DU). The Weight Estimation Module also combines the relative deflection values (Sensor DUs) from all of the sensors to produce a system deflection value (RawDU).

The Pattern Module receives occupant sensor data directly from the sensor mat, and also receives pre-processed data from the Weight Estimation Module. The Pattern Module uses both data inputs to look for traits in the pattern of sensor deflections that are common for objects other than people (also called "live" occupants). The Pattern Module can look for edge deflections and other pattern traits to help identify non-live occupants. The Pattern Module can then modify the RawDU from the Weight Estimation Module to produce a final Decision DU based on the pattern traits it identifies. The Decision DU and pattern information from the Pattern Module are sent to the Decision-Making Module for use in the deployment decision-making process.

The Decision-Making Module makes a final airbag deployment state decision by analyzing trends in the deflection values, which are indicative of occupant weight and movement, and in the pattern information. When the deployment status is placed into a deploy state, the airbag will deploy during impact. In a suppress state, however, deployment of the airbag will be prevented. The Decision-Making Module can include various security features to prevent modification of the deployment status if the state-change decision is based on unreliable data.

BRIEF DESCRIPTION OF THE DRAWINGS

The foregoing and other objects, features, and advantages of the invention will become more readily apparent from the following detailed description of a preferred embodiment of the invention which proceeds with reference to the accompanying drawings, in which:

FIG. 4 is a schematic cross-sectional view of a bend sensor with a Force Concentrating Device (FCD) capable of use in the sensor array of FIG. 3.

FIG. 5 is a schematic cross-sectional view of a vehicle seat illustrating the effect of shifting occupant positions on occupant detection, and further showing how the selection of planes defined by sensor sensitivities affects the accuracy of the occupant classification system of FIG. 2.

FIG. 26 is a schematic diagram illustrating deflection characteristics of seat foam.

FIG. 27 is a schematic diagram showing the Pattern Mask and Pattern Flags.

FIG. 28 is a schematic flow diagram illustrating the creation of an Averaged Grayscale Array.

FIGS. 29A–29D are schematic illustrations of the Averaged Grayscale Array of FIG. 28 showing various regions used in performing various pattern tests in a Pattern Module of the Occupant Classification System according to various embodiments of this invention.

FIG. 39 is a graph illustrating the decision process of the Decision-Making Module over time for a car seat.

FIG. 40 is a flow diagram illustrating frame processing for updating the statistics for a current second.

FIG. 43 is a flow diagram illustrating a method for detecting whether the seat is occupied or empty during a decision process.

FIG. 44 is a flow diagram illustrating the timing of the system's frame and decision processes performed for the occupant classification system of FIG. 2.

FIG. 45 is a detailed flow diagram of the frame processing and decision-making components based on the occupant classification system of FIG. 2.

DETAILED DESCRIPTION

Figure 2:
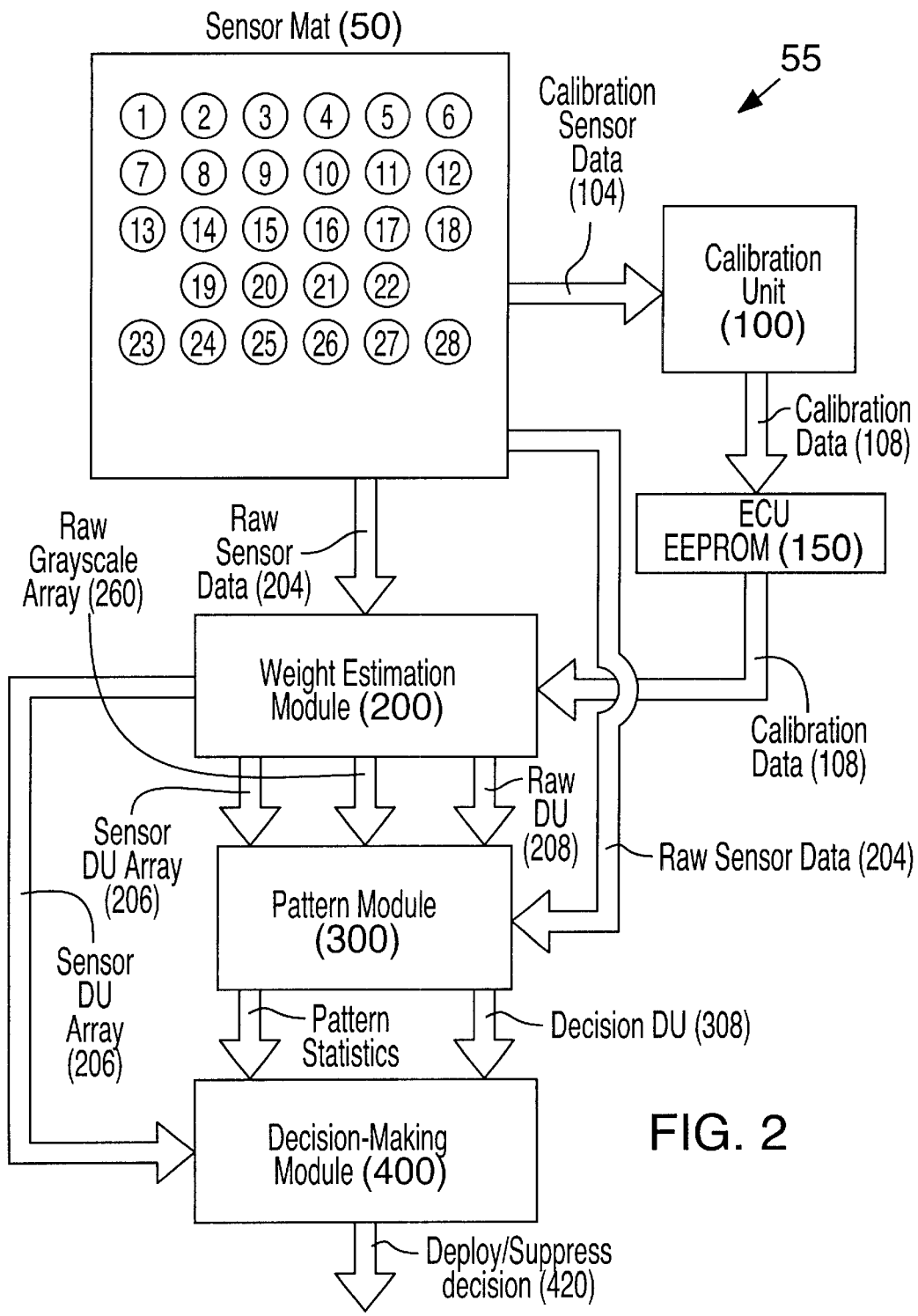
FIG. 2 is a block diagram illustrating a vehicle occupant classification system according to a preferred embodiment of this invention.

FIG. 2 is a block diagram illustrating the major components of the Vehicle Occupant Classification System (classification system) 55 according to a preferred embodiment of this invention. The classification system 55 combines weight estimation, pattern recognition, and statistical evaluation of in-seat characteristics of an occupant in order to make an informed airbag deployment state decision. Referring to FIG. 2, the major components of the classification system include a Calibration Unit 100, a Weight Estimation Module 200, a Pattern Module 300, and a Decision-Making Module 400. Using these three components, the classification system of this invention is able to accurately detect a vehicle occupant and appropriately determine a proper airbag deployment state based on that occupant's in-seat characteristics.

The Calibration Unit 100 receives sensor data from a sensor mat 50, located in the vehicle seat, during a calibration process. The purpose of the calibration process is to normalize sensor deflections across the mat 50 to compensate for variations in sensors and for effects of the seat trim and foam on sensor characteristics. Calibration data from the calibration process is stored in an ECU EEPROM 150 for use by the other system components.

The Weight Estimation Module 200 uses the calibration data stored in the EEPROM 150 to translate each sensor's current deflection reading (raw sensor data), corresponding to a vehicle occupant, into a relative deflection value (Sensor DU). The Weight Estimation Module 200 also combines the relative deflection values (Sensor DUs) from all of the sensors to produce a system deflection value (RawDU).

The Pattern Module 300 also receives the raw sensor data 204 directly from the sensor mat 50 and, in addition, receives pre-processed data from the Weight Estimation Module 200. The Pattern Module 300 uses both data inputs to look for traits in the pattern of sensor deflections that are common for objects other than people. People are soft and conform to the seat while child seats are rigid and create edge deflections. Edge deflections generally cause a number of pattern traits in a seat bottom, no matter how much weight is in the seat, that help distinguish between car seats and people. The Pattern Module 300 looks for these edge deflections, as well as other pattern traits, to help identify non-live occupants. The Pattern Module 300 can then modify the RawDU from the Weight Estimation Module to produce a final Decision DU based on the pattern traits it identifies. The Decision DU and pattern information from the Pattern Module 300 are sent to the Decision-Making Module 400 for use in the deployment decision-making process.

Finally, the Decision-Making Module 400 makes an airbag deployment state decision by analyzing trends in the deflection values. For example, the Decision-Making Module 400 reviews past versus current Sensor DUs and Decision DUs, in order to evaluate occupant weight and movement. The Decision-Making Module 400 also reviews the pattern information (i.e., pattern statistics, current pattern status, pattern size, and location in seat) to make a deployment state decision. When the Decision-Making Module 400 places the deployment status into a deploy state, the airbag will deploy during impact. In a suppress state, however, deployment of the airbag will be prevented. The Decision-Making Module 400 includes various security features to prevent modification of the deployment status if the state-change decision is based on unreliable data.

Figure 3:
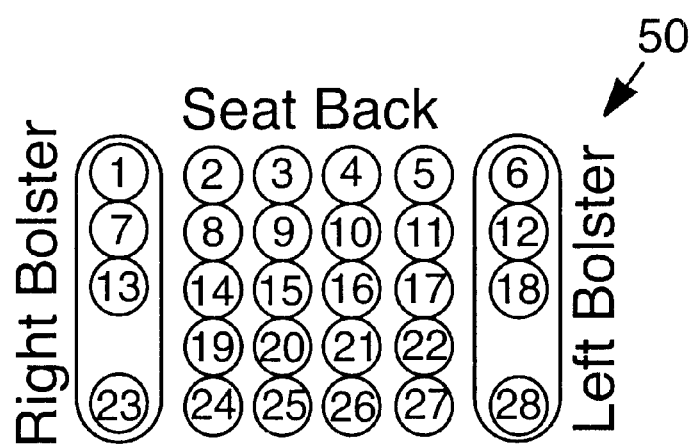
FIG. 3 is a schematic plan view of a sensor array configuration for use with the occupant classification system of FIG. 2.

FIG. 3 schematically illustrates a sensor array (or mat) 50 that can be used with the classification system of this invention. Specifically, FIG. 3 shows the orientation and relative positions of the sensors in the seat. Each of the sensors is assigned a number #1 through #28. Consistent sensor numbering is important because each sensor's location in the seat plays an important role in the system 55. This is because different sensor quadrants, or even different individual sensors, may be accorded varying significance. Additionally, seat components affect sensors differently across the seat and may require some form of compensation. Finally, the sensor numbering system is used throughout the algorithm and in the tools as a means of referring to specific sensors. All seats must therefore use the same numerical sensor layout for the algorithm to work across the various seat-types. If a given seat uses fewer sensors (e.g., only two on a bolster), then the missing sensor number(s) will be skipped and not used for that seat.

The preferred occupant detection classification system 55 of this invention has been optimized to use a bend sensor array with up to twenty-eight sensors, but could easily be adapted to other sensor types or arrangements. Each bend sensor can be constructed, for example, with a strip of conductive ink having varying resistivity as it is bent. FIG. 4 schematically illustrates an individual bend sensor both in a flat, "at rest" state, and in a deflected state. The bend sensors lie on top of the seat foam, under the upholstery. A force concentrating device (FCD) is placed directly over the center of the sensor. When an occupant sits in the seat, the occupant applies force to the FCD, around which the sensor ink bends. The bending of the sensor causes a relative increase in resistance in the ink, which is converted into a numerical value by an analog-to-digital converter and then reported to the classification system 55 as sensor data 104. A preferred embodiment uses a bend sensor array with twenty-two total sensors (sensors ##1–22) embedded in the seat of a vehicle. The electronic circuitry in which the classification system is implemented supports up to thirty-two sensor input lines, or channels, from the sensor array 50.

Referring to FIG. 3, as noted previously, each sensor in the array 50 is assigned a unique sensor ID number, for example, such as from #1 to #28. A single frame of data coming into the classification system includes a data value for each of the sensors. Accordingly, a frame for twenty-eight sensors has twenty-eight bytes of sensor data. The numerical orientation of the sensors is very important because the classification system 55 relies on the position of each sensor in the seat in processing the sensor data and making a deployment decision. The software can also compensate for some degree of sensor movement in the seat when the sensors are correctly numerically oriented.

The sensors are numbered row to row, starting in the right back corner of the seat bottom. This numbering system results in five rows and six columns. The bolster sensors, located in the first column and the sixth column, are used primarily to track an occupant when they sit on the sides of the seat. The center, however, is the most reliable area to perform occupant classification because it is relatively flat compared to the bolsters. Although sensors #23–#28 are not used in the presently preferred embodiment, they are available for future implementations.

An occupant sitting in a seat fitted with the sensor mat 50 of FIG. 3 will create a deflection pattern that can be categorized into various levels. For a "live" occupant, as opposed to a car seat, the greatest sensor deflections will generally be centered directly under the occupant, with secondary and peripheral deflections radiating outward. Tight upholstery can cause peripheral deflections to extend well beyond the actual edge of the occupant. Peripheral deflections must be accounted for or they might confuse the classification system. Incidental deflections might also confuse the system if not properly accounted for. Incidental deflections can be caused by creases and seams in the seat upholstery, stuck sensors, heater wires in the seats, and so on. An important role of the Weight Estimation Module 200 is to filter out incidental and peripheral sensor deflections.

A seat occupant or object creates a displacement in the seat foam. The sensor mat deflection pattern measures this displacement. As the occupant moves in the seat, the deflection pattern can change considerably for several reasons. FIG. 5 illustrates a seat occupant situated in two possible body positions and shows how deflection patterns can change based on the occupant's position within the seat. Referring to FIG. 5, first, although it is common for the center-of-gravity of an occupant's torso to be at the center of the deflection pattern, people are very flexible and can change their deflection pattern and its relation to their center of gravity just by altering the curve in their spine, the rotation or angle of their hips, or even their head position. Even when an occupant is just leaning against the door, for example, the deflection pattern will change. Accordingly, an occupant can sit with different body positions in the seat, causing the center of the deflection pattern either to be found in different areas of the seat, or to be rotated relative to the seat back. A few of the many possible positions include centered, left side of seat (outboard), right side of seat, rotated clockwise, etc.

Leg position and leg length also impact the deflection pattern. A $5^{th}$ Percentile Female with short legs, for example, will typically have more of her leg weight in the seat. A $5^{th}$ Percentile Female with longer legs, however, will have her knees higher and less of her leg weight in the seat. Leg position and length have additional significance when attempting to distinguish between children and adults. This is because children generally cannot reach their feet to the floor when seated and therefore have nearly their entire body weights in the seat. Small female adults, on the other hand, generally have their feet on the floor to support some portion of their body weights. Accordingly, the actual difference in weight on the seat surface between a $5^{th}$ Percentile Female and a child may be negligible.

Additionally, many seat bottoms can be raised, lowered, or even tilted, all of which can change the amount of contact between the seat and the occupant as well as the likely location of the occupant's center of gravity in any given sitting position. Changing the seat-back angle also has a significant impact on the deflection pattern, and in some cases can either increase or decrease the available surface area of the seat bottom. Furthermore, a seat bottom typically has a complex surface area created by the foam and upholstery. Seams, trenches, bolsters, and heaters can all cause differences in sensor deflections across a seat's surface. The existence of some of these can also affect final sensor spacing and sensor-to-bus anchor points in the mat design, both of which can impact the meaning of deflections from different seat areas.

To help maintain a consistent deflection pattern, the classification system tries to define an absolute plane in the seat's foam. Any displacement below this plane may contribute to the system. The seat calibration system described below is used to define this plane. Three possible planes are illustrated in FIG. 5, including a shallow plane 71, a deep plane 73, and a centered plane 72. Referring to FIG. 5, if the plane is too shallow, as is the shallow plane 71, the deflection image will change very little across occupants of different weights. More specifically, a shallow plane 71 will make all occupants appear large and will result in an unfocused pattern image.

If the plane is too deep, however, some occupants won't be acknowledged and for others, the deflection pattern will be unreliable. Furthermore, a deep plane 73 shows dramatic change when the weight of an occupant shifts in the seat. A centered plane 72 will be less affected by weight shifts and will help to accurately classify occupants of all types. The following classification system components ensure that an appropriate displacement plane is defined and that different occupants can be adequately distinguished regardless of their position and movement in the seat.

Calibration

Referring back to FIG. 2, the first classification system component is the Calibration Unit 100. There are three primary goals for the Calibration Unit 100. The first primary objective is to normalize sensor sensitivity variations across the seat. The second primary goal is to optimize sensor sensitivity thresholds for border requirements (i.e., for distinguishing between $5^{th}$ Percentile Females and 6-Year Olds). The final primary goal is to make patterns in seats predictable regardless of seat or sensor variations. Furthermore, although not a primary goal of the algorithm, the calibration process also acts as a test for sensor, installation, and seat assembly problems in production. For instance, there are several component and construction problems that can be detected during calibration, including flipped sensors. The calibration equipment can also be used for tightly controlled environmental testing in which a fixed force is applied to study the effects of temperature and humidity.

Figure 6:
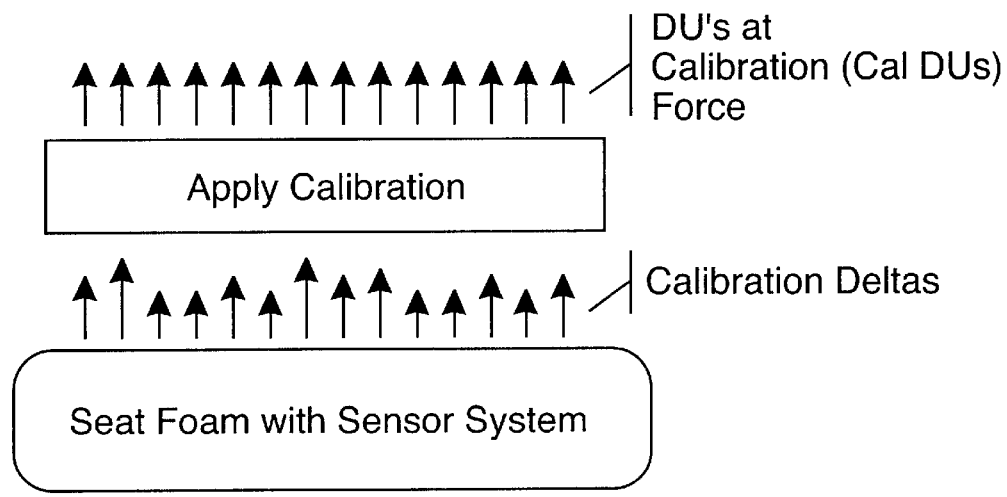
FIG. 6 is a schematic diagram showing the results of a calibration process on sensor sensitivities in the occupant classification system of FIG. 2.

Once a sensor mat 50 (see FIG. 3) has been assembled into a seat, sensor sensitivities will vary across the seat due to both sensor variations and features of the seat bottom. The calibration process is designed to compensate for variations in sensor sensitivity due to both sensor manufacturing inconsistencies and the effects of the seat trim, foam, heaters, or other seat variations. The calibration process accomplishes this by normalizing sensor deflections and sensitivity within a single seat and also by allowing variations across seats to be controlled. FIG. 6 is a schematic diagram showing natural variations between sensors in resistance difference calculations (calibration deltas or CalDeltas) when a fixed deflection force is applied, and the normalized sensor output (calibration deflection units or CalDUs) from the Calibration Unit.

The calibration process can be done one sensor at a time, to multiple sensors at a time, or to all sensors at the same time (seat-wide). Calibration is achieved by measuring each sensor's "at rest" or baseline value (Baseline) and then physically loading each sensor in the system with a known deflection or calibration force. The sensors' baseline (Baseline) and deflected values (Calibration Deltas) due to the calibration force are then used to normalize relative sensor variations as discussed in further detail below. By normalizing relative sensor variations, calibration allows each seat to achieve a predictable performance level in production.

Figure 7:
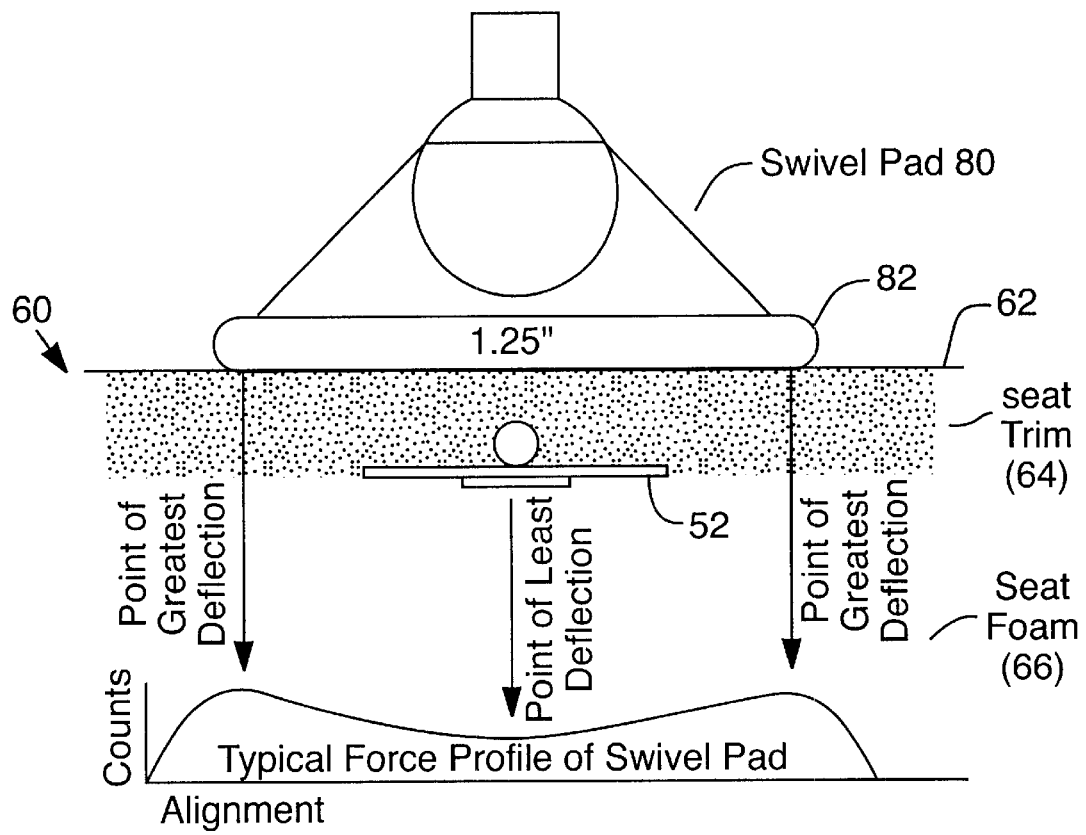
FIG. 7 is a schematic cross-sectional view of a swivel pad and its force profile as used in one embodiment of the calibration process of the occupant classification system of FIG. 2.

Although calibrations can be performed by hand after collecting performance data (e.g., by scrutinizing each seat's performance sensor by sensor and adjusting individual gains for each sensor based on observation), this approach is difficult and time consuming. The use of a swivel pad 80, such as the one shown in FIG. 7, is a way to perform automated calibrations. Automated calibrations can be performed with swivel pads 80 having, for example, a 1.25" radius. Calibration using swivel pads 80 has a major problem, however—registration. Registration refers to the force transfer between the pad (foot) 82 and the sensor 52. As registration of the pad with the sensor FCD varies, so does the deflected value of the sensor.

As the force profile graph at the bottom of FIG. 7 shows, the force transfer profile of a swivel pad 80 is non-uniform, with the outer ring of the pad 82 deflecting the seat trim 64 far more than the center. This effect is called an edge deflection, and is typical for any rigid body pressed into the seat trim. As further evident from the graph at the bottom of FIG. 7, larger pads will have still wider force profiles and will therefore produce even less deflection at the center. These issues make the swivel pad 80 less desirable for calibration.

Another issue involved in seat sensor calibration is hysteresis of the seat foam 66. The seat foam 66 generally has at least some degree of "memory" and will therefore not return immediately to its original position. Three effects of seat foam hysteresis are particularly important to calibration using swivel pads 80. First of all, repeatability is difficult because the foam must "recover" between the application of significant forces. Second, variations in approach speed (i.e., the speed at which the foot 82 impacts the seat surface 62 when approaching the deflection force) can change the results measured at the deflection force. Finally, when approaching the target deflection force to take a reading, results will differ depending upon whether it is approached from a greater or a lesser force. Variation between sensors 52 and the non-linear change in resistivity of bend sensors, such as sensor 52, when differing forces are applied also affect the calibration process.

Figure 8:
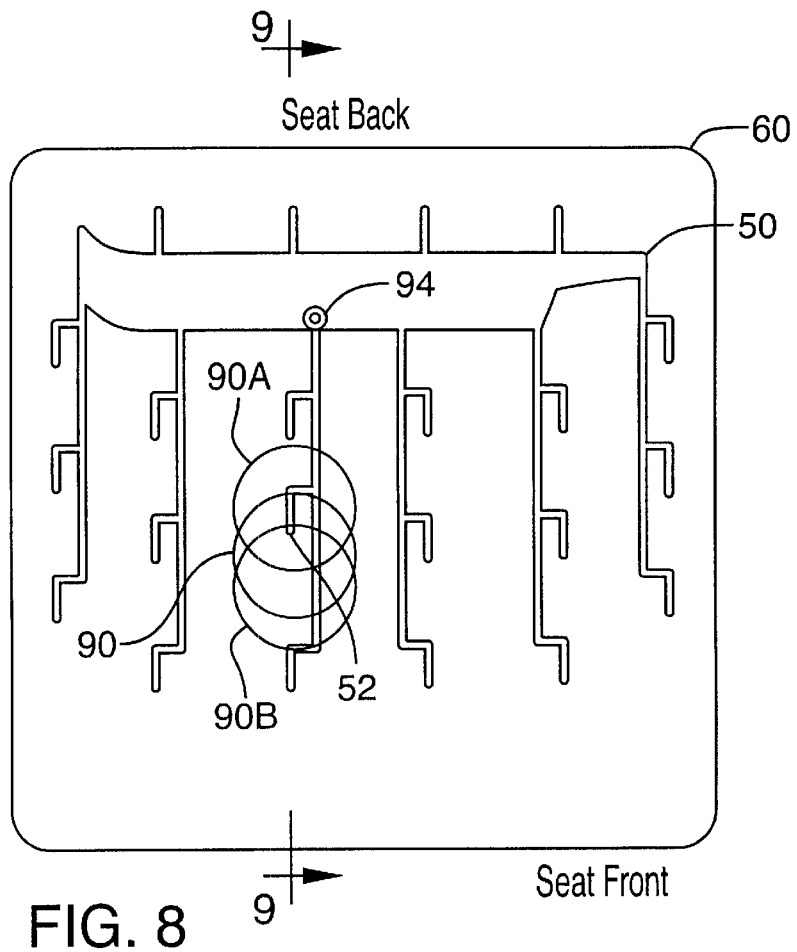
FIG. 8 is a schematic plan view of a sensor mat indicating various positioning of small bladders as used in another embodiment of the calibration process of the occupant classification system of FIG. 2.
Figure 9:
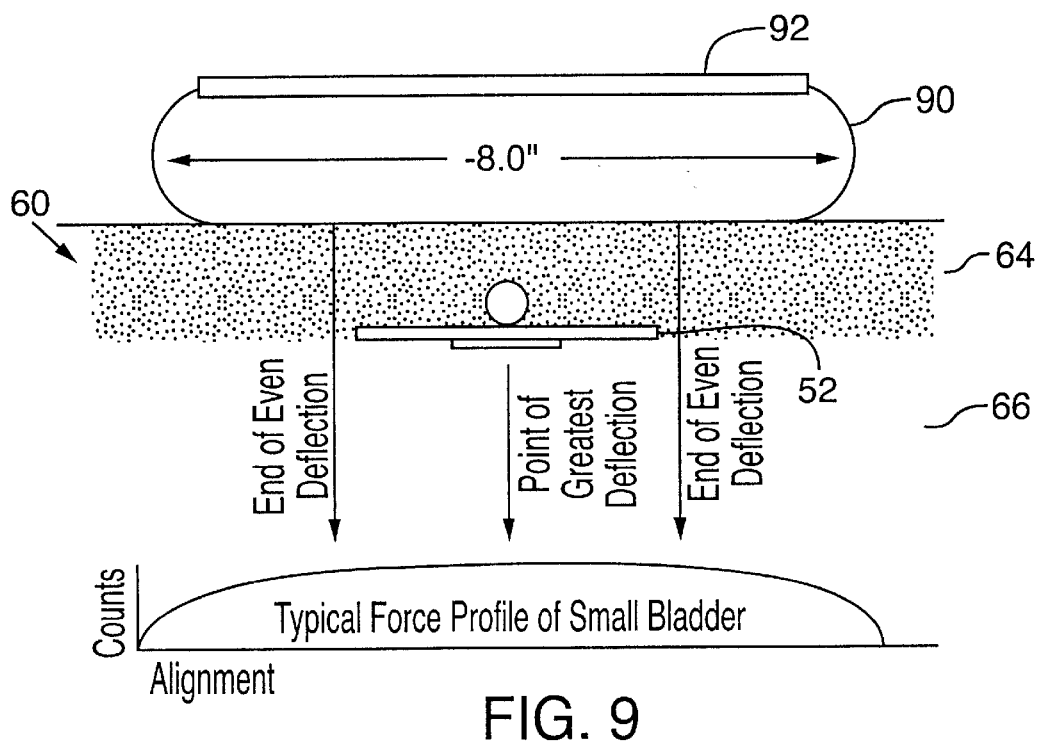
FIG. 9 is a schematic cross-sectional view taken along lines 9—9 of FIG. 8 of a small bladder and its force profile.

To solve the swivel pad problems of registration and edge deflection, calibration fixtures can instead be fitted with under-inflated air bladders. FIG. 8 is a schematic top view of a seat including a sensor mat 50 showing the positioning of small bladders 90, 90A, 90B over a sensor 52. Sensor 52 is one of an array of elongate sensors, extending fingerlike from a common bus 54. FIG. 9 is a cross-sectional side view of the seat 60 taken along line 9—9 of FIG. 8 showing the small bladder 90 in position over the sensor 52. Although round Mylar balloons can be used for the small bladders 90, small, custom-made, nylon bladders, approximately 8" across are preferred. These bladders 90 are under-inflated (measured by volume) to help them conform to the surface of the seat. Under-inflation is especially important for seat bolsters that have complex surface angles. Small bladders 90 have a better tolerance to registration than the swivel pads 80. FIG. 9 includes a force-profile graph illustrating the improved force profile of a small bladder 90 as compared to a swivel pad 80.

As shown in FIG. 9, the force profile of a small bladder 90 is more uniform across the sensor 52 than that of the swivel pad 80. A better calibration can therefore be achieved using small bladders 90 than the swivel pads 80. It should be noted, however, that the relationship between the location of the small bladder 90 to the vertical anchor-point 94 of a sensor strip and the relative force exerted to the front versus the back of the FCD are additional factors that should be considered when using small bladders 90 for calibration.

Figure 10:
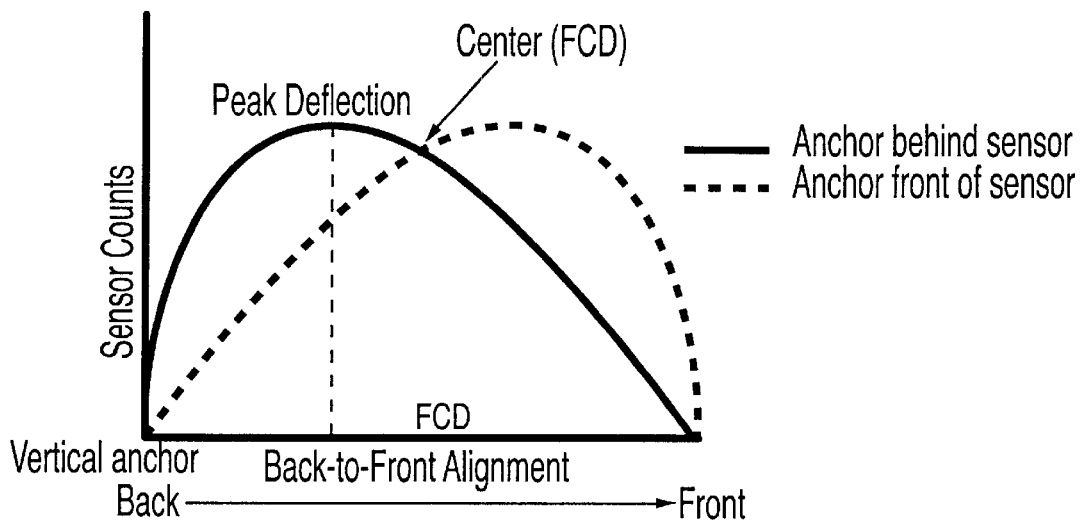
FIG. 10 is a graph illustrating the effects on sensor deflection resulting from positioning the small bladders of FIG. 8 in various vertical alignments.

FIG. 8 shows three small bladder locations 90, 90A, 90B with different vertical alignments. The vertical alignment of each small bladder 90, 90A, 90B is its position relative to the vertical anchor 94 of the sensor strip. Different vertical alignments result in different sensor deflections. The variation in sensor deflection depending on vertical alignment appears to be related to the vertical anchor 94 of each sensor strip, which is the point at which each sensor strip joins the main bus. FIG. 10 shows the effect of varying vertical (front-to-back) alignment of the small bladder 90 with respect to the vertical anchor 94.

As evidenced by the graph in FIG. 10, when the vertical anchor is located behind the sensor (i.e., nearer the seat back), deflection of the sensor will be greatest when the small bladder 90 is positioned slightly behind the sensor (i.e., nearer the seat back, similar to bladder 90A). This is due to the fact that the sensor deflection peaks before the bladder alignment is centered over the FCD when moving from behind (nearer to the seat back) the FCD to in front of the FCD. If the vertical anchor were forward (nearer the seat front) of the FCD in the seat, as indicated by the dashed lines in FIG. 10, this relationship would be reversed.

Figure 11A:
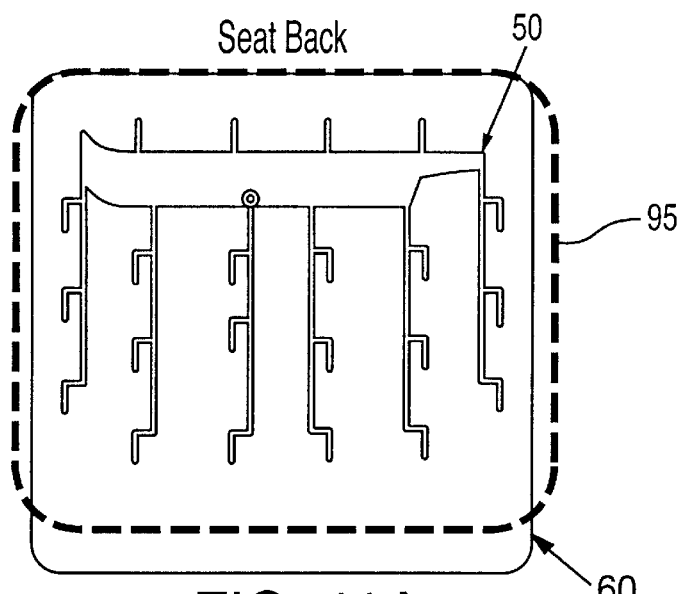
FIG. 11A is a schematic plan view of a large bladder positioned over the sensor mat of FIG. 3 in a preferred embodiment of the calibration process of the occupant classification system of FIG. 2.
Figure 11B:
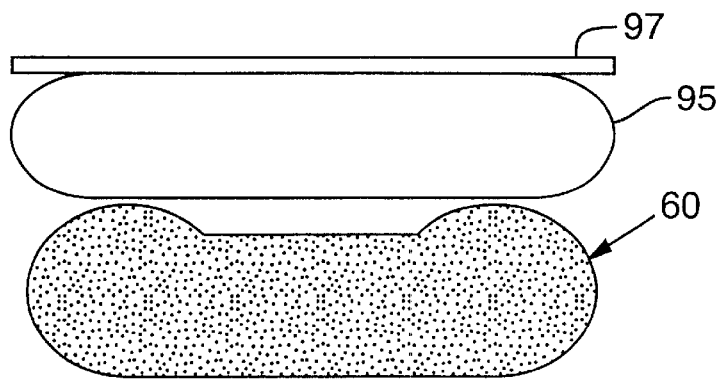
FIG. 11B is a schematic side view of the large bladder of FIG. 11A.

Although small bladders 90 can be used for calibration, a large, conforming bladder 95, such as the one shown in FIGS. 11A and 11B, is preferred to enable calibration of the entire seat at once. Using a small bladder 90 for calibration is impractical in high volume production because of how long it takes to calibrate an entire seat sensor array one sensor at a time. Although simultaneous calibration of several non-adjacent sensors using small bladders 90 could be done to reduce the calibration time for the whole seat, using a large bladder 95 is preferred. Nonetheless, validation with small bladders 90 first (one sensor at a time) helps during development to make sure that all known problems are resolved before using a large bladder 95.

As suggested above, the most preferred calibration method uses a large under-inflated air bladder 95. Under-inflation allows the bladder 95 to conform to the seat bottom contours and to apply a calibration force evenly across the seat surface. FIGS. 11A and 11B illustrate use of a large bladder 95 in a calibration process. As shown, the bladder 95 is large enough to completely cover the sensor matrix in the seat 60. A plate fixture 97 is attached to the bladder 95 to apply an even force across the bladder 95. This allows calibration of the entire seat sensor array 50 at the same time.

A large bladder system 95 is preferable to the other calibration methods because it has a much smaller susceptibility to registration problems for the individual sensors and because the process of using it is extremely repeatable from one calibration to the next on the same seat. In addition, use of the large bladder system 95 has several other fundamental benefits. For example, a very consistent calibration footprint is applied across different seats using this system, reducing adverse effects of assembly tolerance stack-ups. Also, the whole seat can be calibrated very fast with very little edge effect. Furthermore, the bolster angle is less of an issue than with the vertically applied small foot 82 or bladder 90.

There are several key design considerations and issues for calibration using the large bladder system 95. First, the bladder 95 should be pliable enough, when under-inflated, to allow conformance to the seat surface during inflation to the target pressure. Also, the bladder material should not have friction with seat material (i.e., it must slide easily) to maximize conformance to the seat surface. The bladder depth should be sufficient to allow downward pressure to be applied to the seat during inflation (not just horizontal expansion of the bladder). The bladder 95 also should not wrap around (i.e., hang off) the seat in areas close to the sensors. Use of a support plate at the back of the seat is recommended.

The volume of air in the bladder 95, the pressure within the bladder 95, and the effects of temperature and barometric pressure are also important factors. Consideration must therefore be given to choosing an optimal pressure and volume of the bladder 95, as well as to the relationship of bladder pressure and volume to the optimal pressure applied to each sensor. It may also be desirable to build walls to constrain the bladder 95, causing inflation primarily downward toward the seat. With these considerations in mind, it is possible to configure a large bladder 95 which works well in calibrating the sensors for the classification system.

Different calibration methods can be used with a large bladder system 95. One calibration method simply applies a single target force to the seat 60 and then collects values from all sensors in the sensor matrix 50. A more reliable method collects sensor values at two or more target forces, thereby allowing a force curve to be developed for each sensor. Currently, a rapid sampling approach is being developed that will collect data at sixty times a second from each sensor as the calibration force is slowly applied until it reaches a target. This yields a very high-resolution image of each sensor's performance for study and calibration.

Using the large bladder or "Big Bag" Calibration fixture 95, a large study of car seats with seat sensors was conducted. Each seat had sensor data collected at intervals from 0.60 psi (internal bag target pressure) to 1.20 psi. Some important sensor behaviors were learned from this study.

1. An analog sensor's performance in a car seat is influenced by:
    a. Sensor position in seat (where it is in the matrix).
    b. Seat construction (seat trim, foam, and contour).
    c. Sensor sensitivity (production variation).
2. When using this type of calibration fixture there is a minimum force where each sensor begins to track its calibration force curve (calibration pressure to sensor value). Forces up until this point are simply compressing the foam and trim and can actually make some sensors decrease in value.
3. Sensor production variation can affect the slope and shape of the calibration force curve.

For sensors that produce a relatively linear response, a "dual point" calibration technique has proven to be very reliable. The basic dual point calibration technique is as follows:

1. Determine safe minimum and maximum calibration force range given a known sensor variation. The most important sensor variation at this point is minimum sensitivity, because sensors that are too insensitive will yield a very low and flat calibration force curve.
2. Use the "safe" min/max calibration forces to estimate each sensor's slope in the seat matrix.
3. Use each sensor's slope to calculate its calibration value at an ideal threshold force (typically optimized for $5^{th}$ female detection). The slope can also be used to calculate any of the "ledge" calibration values for each sensor.

Sensors that produce non-linear calibration force curves simply use an extension of the dual-point approach, called a multi-point approach. In the multi-point calibration technique, enough calibration target forces are used to yield a good estimation for each sensor's curve. This collection of points are then used to estimate calibration values by interpolating between calibration values depending on the target force for estimation.

Figure 12A:
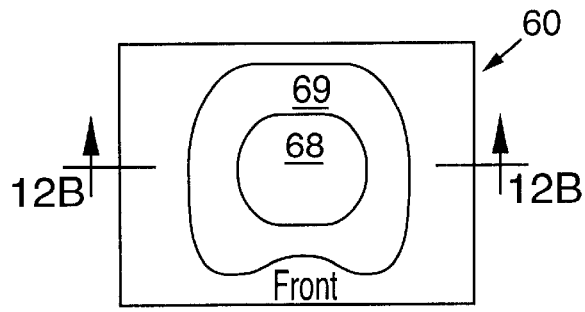
FIG. 12A is a schematic top plan view of a vehicle seat showing a typical deflection pattern of a $5^{th}$ Percentile Female.
Figure 12B:
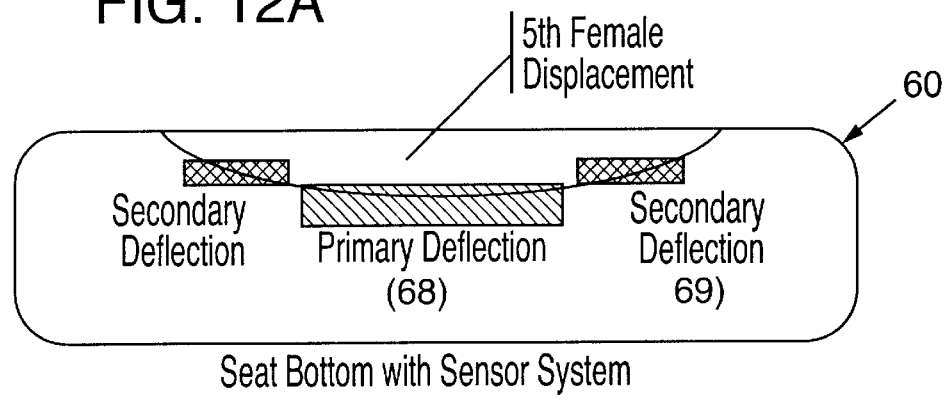
FIG. 12B is a schematic cross-sectional side view of the vehicle seat of FIG. 12A taken along line 12B—12B.

Regardless of what type of calibration instruments are used, it is desirable for the calibration process to focus sensor sensitivity on the most difficult classification zones. This is done by using a deflection force representative of the desired occupant-type. FIGS. 12A and 12B illustrate a typical deflection pattern for a live occupant in a vehicle seat 60. More specifically, FIG. 12A is a top plan view of the seat 60 showing a typical deflection pattern of a $5^{th}$ Percentile Female, while FIG. 12B is a cross-sectional side view of the seat 60 taken along line 12B—12B in FIG. 12A. Referring now to FIGS. 12A and 12B, there are two main regions of deflection seen by the classification system when the seat is occupied by a live occupant (as opposed to a car seat or other object). The primary deflection region 68 is the center of the live occupant's deflection pattern in the seat 60 and has the greatest load. The secondary deflection region 69 is typically a ring around the primary deflection region 68 typified by lower loads.

Figure 1:
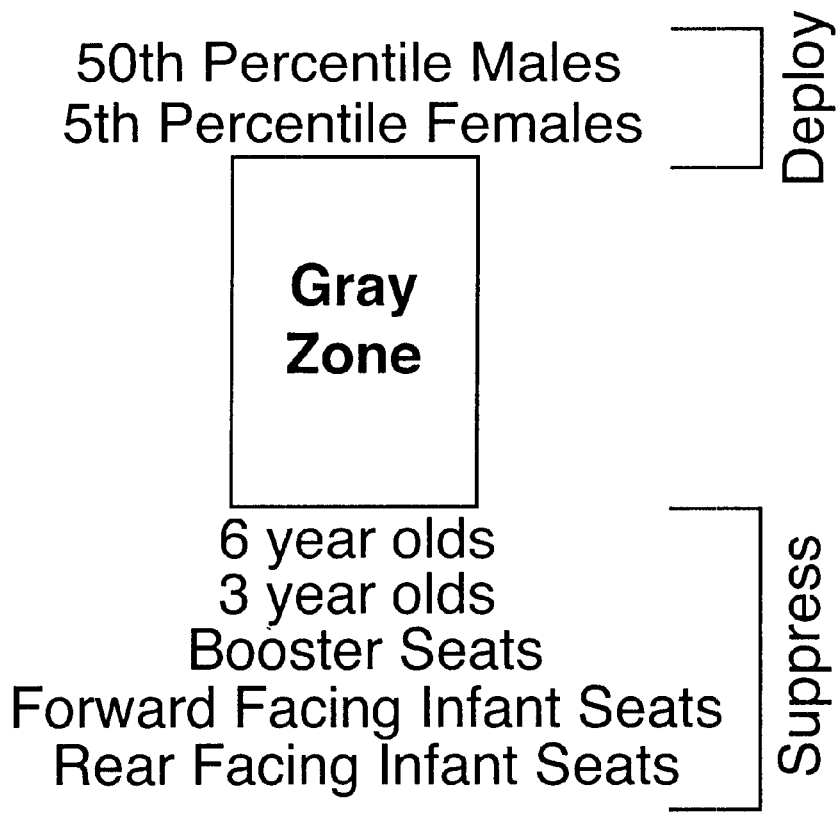
FIG. 1 is a chart illustrating the desirable deploy and suppress zones for a smart airbag system.

To distinguish effectively between occupants in or near the gray zone of the deployment graph of FIG. 1, the calibration process 100 of a preferred embodiment of this invention focuses the classification system 55 on the typical deflection pattern of a $5^{th}$ Percentile Female. Specifically, the calibration force(s) is(are) chosen to represent the target weight and deflection pattern of a $5^{th}$ Percentile Female. In this way, the calibration process optimizes detection of the $5^{th}$ Percentile Female's secondary deflection forces by focusing sensor sensitivity on those forces. A properly calibrated seat system, therefore, will have its Weight Estimation Module 200 centered around a $5^{th}$ Percentile Female's secondary deflection region and will be relatively tolerant as the system becomes more or less sensitive from environmental changes or variations in occupant weight and position.

Figure 13:
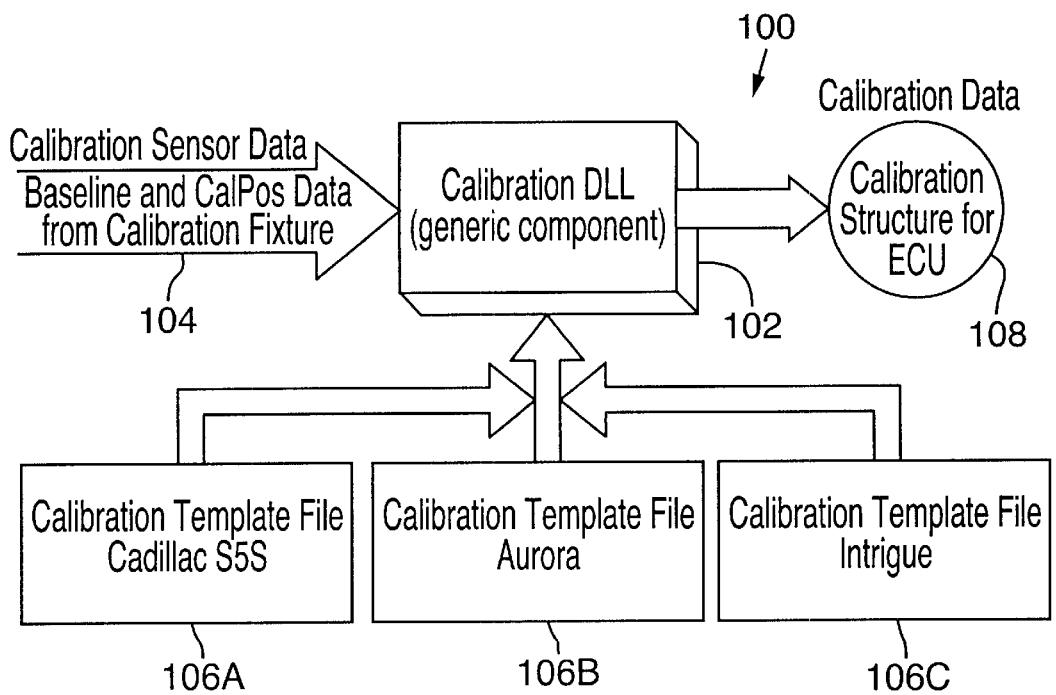
FIG. 13 is a block diagram of a calibration unit of the occupant classification system of FIG. 2.

FIG. 13 illustrates the basic components of the Calibration Unit 100. As shown in FIG. 13, there are two basic components (preferably embodied in software) provided by this invention for enabling production and development calibrations that achieve the desired system focus. These components include a Calibration DLL 102 and one or more Calibration Template Files 106. The Calibration DLL 102 of this embodiment is a standard Microsoft Windows dynamic-link library (DLL) which may be used by any compatible calibration system. The Calibration DLL 102 contains the error-checking software and generic calibration algorithm to formulate a calibration. Each Calibration Template File 106A, 106B, 106C is a data file containing specific calibration information (parameters—i.e., variable values and ranges) for a given platform (also referred to as seat-type or seat model). The Calibration DLL 102 receives, as one of its inputs, the Calibration Template File 106A, 106B, or 106C for the platform being calibrated.

The calibration information in the Calibration Template File can include various calibration data values, such as Baseline Range, CalPos Range, CalDelta Range, Gain, DeltaFilterPercent, MaxDeltaPercent, LedgeDeltaPercent, DeltaFilterMin, MaxDU, CalDU, and LedgeDU. Values for selected ones of these variables for the given platform are supplied from the Calibration Template File 106 to the Calibration DLL 102 to enable it to perform the calibration process. Each of these variables will be described in further detail below.

It should be noted that each of the ranges, percentages, or values (collectively, "variables") used in the calibration process can be customized for the particular seat-type being calibrated. Furthermore, each of the variables can be further individualized for each of the individual sensors in a production environment. For example, each of the twenty-two sensors #1–#22 in a sensor mat 50 (see FIG. 3) could have unique calibration information supplied by the Calibration Template File 106, allowing each of the different zones of the seat to have their own test parameters. The Calibration DLL 102 uses these variables for performing the calibration process. To perform the calibration process, the Calibration DLL 102 also receives sensor data 104 from the sensors, including each sensor's Baseline and CalPos values.

Figure 14:
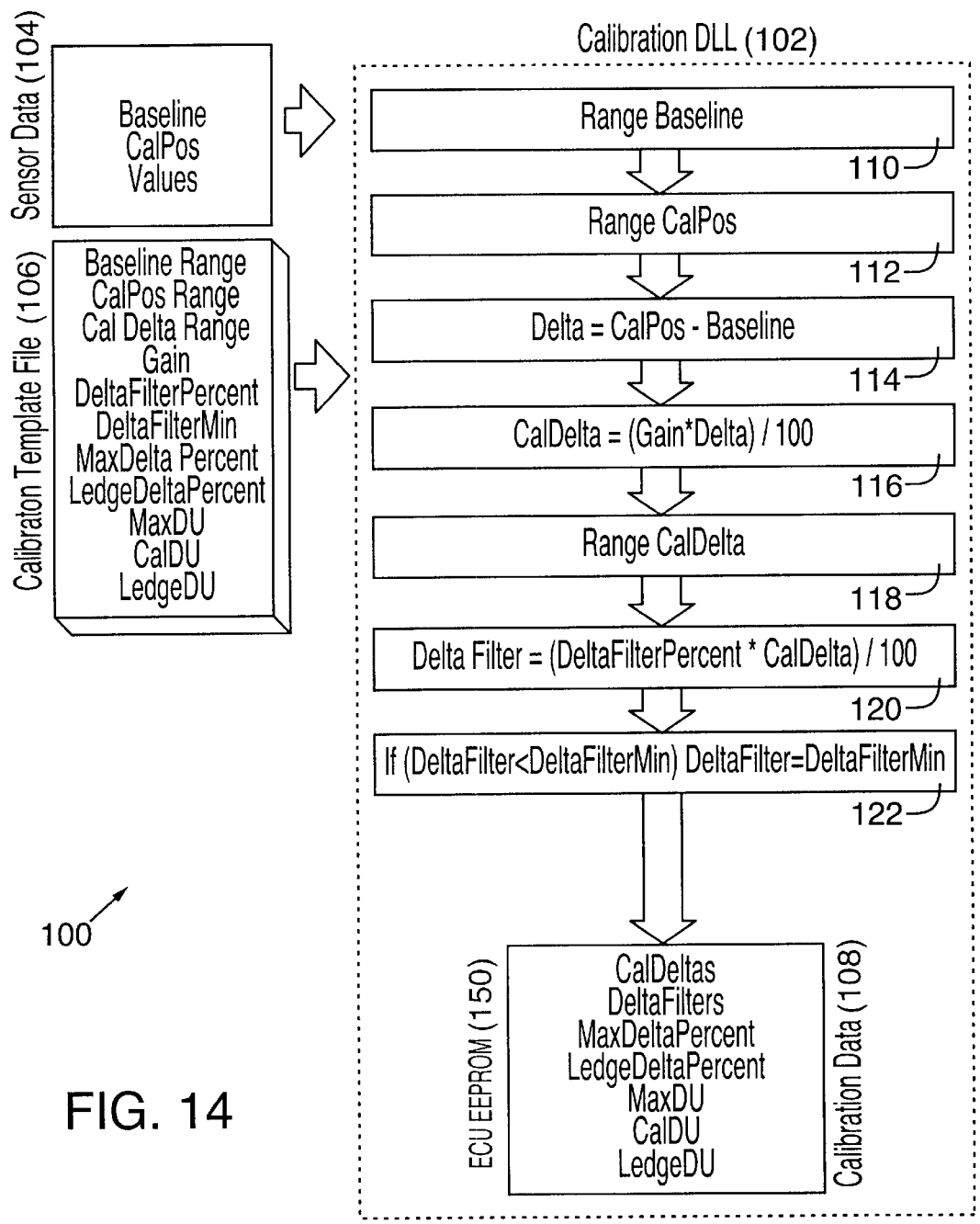
FIG. 14 is a flow diagram of the calibration process in the calibration unit of FIG. 13 illustrating the data inputs into the calibration unit, the data processing which takes place within the unit, and the data outputs from the unit.

The seat calibration process using a single sensor will now be described with reference to FIG. 14, which contains a block diagram of the Calibration Unit 100, including a flow diagram of the operation of the Calibration DLL 102. The same general process described below also applies when all of the sensors are calibrated simultaneously. The first step in the calibration process is to measure the sensor's Baseline value. A sensor's Baseline value is its "at rest" (i.e., no load) value in the seat. The Baseline is sent to the Calibration DLL 102. Error checking proceeds in the Calibration DLL 102, during the Range Baseline step 110, by comparing each sensor's Baseline against the Baseline Range from the Calibration Template File 106.

The Baseline Range contains minimum and maximum Baseline values for the specific sensor being sensed in that particular seat-type. If the Baseline is higher than the maximum allowable value, a build problem is very likely causing the sensor to be pre-loaded. If, on the other hand, the Baseline is lower than the minimum allowable, the sensor may be bent backwards or shorted to ground.

The second step of the calibration process is to apply a calibration force to the sensor and measure it's deflected value. CalPos is the deflected value of the sensor when the calibration force is applied to it. Error checking at this stage proceeds in the Range CalPos step 112 of the Calibration DLL 102 by comparing each sensor's CalPos value against minimum and maximum allowable values (CalPos Range) from the Calibration Template File 106, to detect any sensor or build problems. In addition, a good calibration will always have a CalPos value greater than the Baseline value. Each sensor's CalPos value is therefore also compared against its Baseline value. If the Baseline value is greater than the CalPos value, the sensor may be inverted in the seat. The calibration process then calculates the sensor's difference (Delta) value. The Delta value is calculated during step 114 in the Calibration DLL 102 by subtracting the Baseline value from the CalPos value. Delta is representative of an amount of change that the sensor exhibits when deflected with the calibration load and should be a positive value.

Next, the calibration Gain is used to scale the Delta value higher or lower, as desired, during step 116 in the Calibration DLL 102. Performing a Gain calculation allows a greater than ideal calibration force to be used, thereby improving the chances of getting good Delta values from seat types which have sensor sensitivity problems resulting from seams, seat heaters, or foam contours, for example. A preferred calibration process for a Cadillac seat, for instance, scales the Delta value to 75% of its original value. In the present embodiment, the Gain is linear, scaling all of the Delta values by the same amount. Other embodiments, however, may use non-linear scaling. The result from applying the calibration Gain to the raw calibration Delta value is a calibration delta value, CalDelta.

Error checking for the scaling step proceeds during step 118 in the Calibration DLL 102 by comparing each CalDelta (post-gain calculation) against a minimum and a maximum value obtained from the CalDelta Range. If CalDelta is below the minimum value, the sensor has not had a good calibration. If CalDelta is higher than the maximum value, on the other hand, there may be a build problem or the sensor may be damaged. It should be noted that although the CalDelta value is currently tested after scaling (post-gain calculation), this test could just as easily be applied to the raw Delta value before the Gain calculation (pre-gain calculation). Doing it after the gain calculation, however, adds more value to the test within the context of the preferred algorithm.

After the raw Delta value is scaled to obtain the CalDelta value, the CalDelta value is filtered during step 120. DeltaFilterPercent is the percentage of the CalDelta taken to obtain a DeltaFilter value according to the equation:

DeltaFilter=(CalDelta*DeltaFilterPercent)/100

The DeltaFilter value obtained from this calculation is compared to a minimum DeltaFilter value, DeltaFilterMin during step 122. DeltaFilterMin is the smallest value allowed for a DeltaFilter for that sensor in that particular seat-type. The provision of a minimum allowable DeltaFilter value helps guarantee successful detection of an occupant leaving the seat. If the calculated DeltaFilter value is too low, i.e., below DeltaFilterMin, the DeltaFilterMin value will be used instead. In equation form:

if DeltaFilter<DeltaFilterMin, then DeltaFilter=DeltaFilterMin

The values obtained from the calibration process are referred to as the calibration data or structure. These values are stored in the ECU EEPROM 150 for later use by the other classification system components of this invention.

In summary, the Calibration Unit 100 includes a calibration program (Calibration DLL) 102 that processes sensor data 104 during the calibration process using sensor-specific values from a calibration variable file (Calibration Template File) 106 in order to produce calibration data (or structure) 108 for storage in the ECU EEPROM 150. Specifically, the Calibration DLL proceeds by verifying that the at rest (Baseline) and deflection (CalPos) values are within their respective ranges (Baseline Range and CalPos Range), specified by the Calibration Template File. If the values are within their appropriate range, then each sensor's Baseline value is subtracted from its CalPos value to obtain a difference value (Delta).

The Delta is then multiplied by the Gain percentage to obtain a scaled difference value (CalDelta). The CalDelta is checked to make sure that it falls within the allowed scaled difference range (CalDelta Range) specified by the Calibration Template File 106. If CalDelta is within the CalDelta Range, then CalDelta is multiplied by a filter percentage (DeltaFilterPercent) to obtain a filtered difference value (DeltaFilter). If the DeltaFilter value is less than a minimum filtered difference (DeltaFilterMin) specified in the Calibration Template File 106, then it is set equal to DeltaFilterMin. CalDelta, DeltaFilter, MaxDeltaPercent, LedgeDelta Percent, MaxDU, CalDU, and LedgeDU values for each of the sensors are sent to and stored in the ECU EEPROM 150 for use by other components of the occupant detection software.

The calibration data 108 is stored in the ECU EEPROM 150 using the following program structure (calibration structure):

```
//
// struct for calibration data for Ledge DU calculation
//
typedef struct    _DULEDGE
{
    UINT8    deltaFilters[SENSORNUM];
    UINT8    calDeltas[SENSORNUM];
    UINT8    ledgePercent,
             maxPercent;
    UINT8    ledgeDU,
             calDU,
             maxDU;
}DULEDGE, *PDULEDGE;
```

The calibration data 108 from this calibration structure can then be used during the weight estimation process to make a preliminary weight estimate of a seat occupant.

Figure 15:
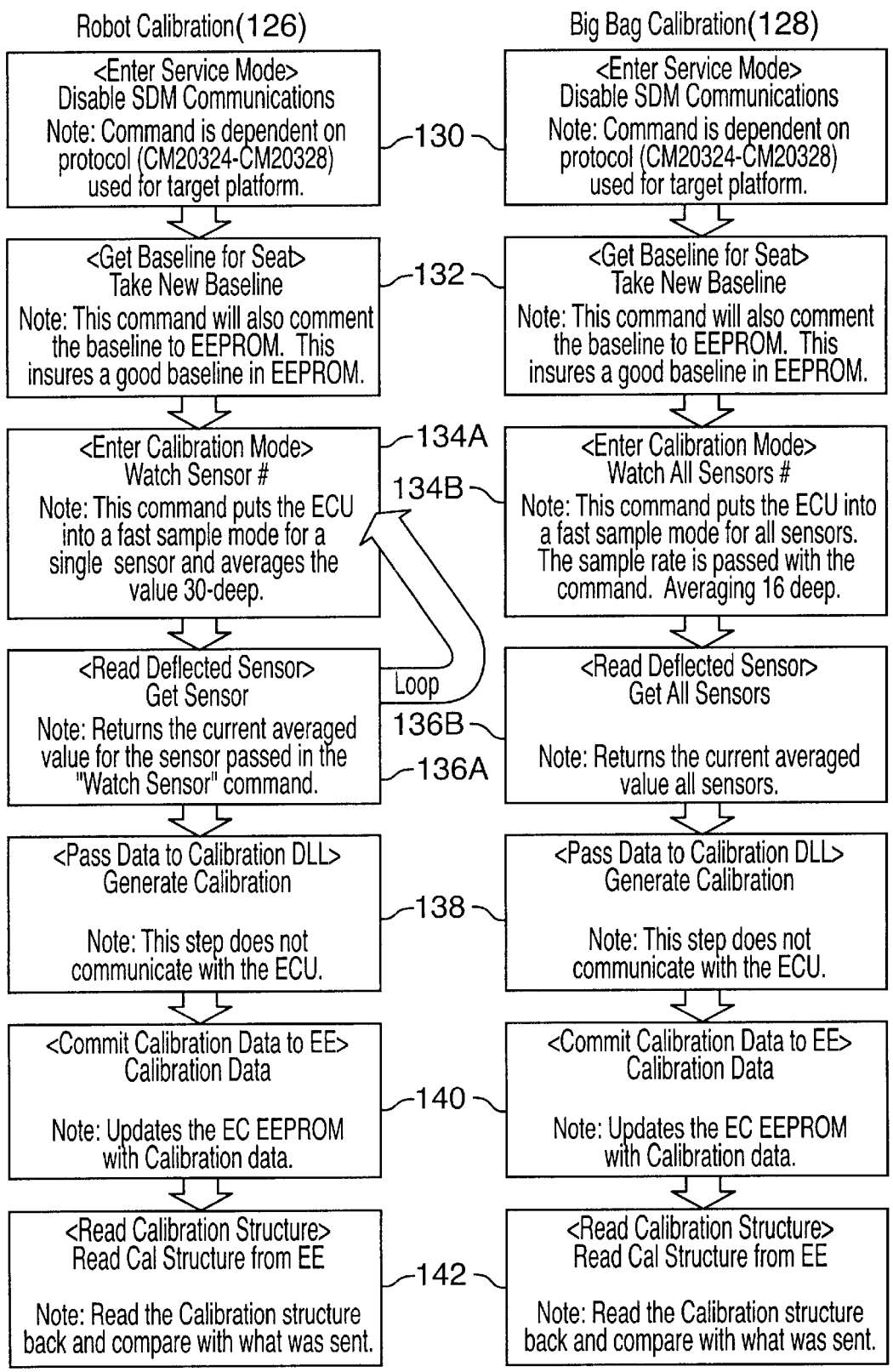
FIG. 15 includes two flow diagrams illustrating an overall calibration process for a single sensor at a time and an overall calibration process for all sensors at a time for use in the calibration unit of FIG. 13.

FIG. 15 contains two flow charts illustrating the electronic control unit (ECU) calibration interface for two embodiments of the calibration process. These two calibration processes include Robot Calibration 126 and Big Bag Calibration 128. These processes will now be described in detail with reference to FIG. 15. To begin, during step 130, both processes enter a service mode and start the calibration process by disabling SDM communications (the command for which depends on the protocol used for the target platform). Both processes also then obtain new Baseline values from the sensors during step 132. Further, in both processes, the new Baseline values are commented to the EEPROM 150 as part of step 132. Following the Baseline value sampling and storing step, however, the processes become slightly different. The Robot Calibration process 126 proceeds with respect to a single sensor, while the Big Bag Calibration process 128 proceeds with respect to all sensors.

Accordingly, in the Robot Calibration process 126, a specific sensor is watched as the calibration mode is entered in step 134A. In this step, the ECU is put into a fast sample mode for the single sensor, averaging the value 30-deep. At a given sampling point, the sensor's deflection is read by a get sensor command as shown in step 136A. The deflected sensor value, CalPos, for the watched sensor is then passed to the Calibration DLL 102 during step 138 in order to generate the calibration data 108 (this step does not communicate with the ECU). Once the Calibration DLL 102 generates the calibration values 108 described above, these values are committed to the EEPROM 150 during step 140, thereby updating the ECU EEPROM 150. Finally, in step 142, the calibration data structure 108 is read from the EEPROM 150 and compared with what was sent in the previous step 140.

Unlike the Robot Calibration process 126, in the Big Bag Calibration process 128, all of the sensors are watched simultaneously as the calibration mode is entered during step 134B. The watch sensor command of step 134B, therefore, puts the ECU into a fast sample mode for all sensors and the sample rate is passed with the command. Furthermore, averaging is 16 (rather than 30) deep. Next, during step 136B the values from all of the sensors are read by the get all sensors command. The final three steps 138, 140, 142 of the Big Bag Calibration process 128 are again similar to the Robot Calibration process 126. Specifically, the calibration sensor data is passed to the Calibration DLL 102 to generate the calibration data values 108. The calibration data (structure) 108 generated by the Calibration DLL 102 is then committed to the EEPROM 150. Finally, the calibration data 108 is read back from the EEPROM 150 and compared with what was sent for error checking.

Referring again to FIG. 2, the calibration data 108 obtained from the calibration process 100 forms the foundation for the operation of the other occupant classification components. The Weight Estimation Module 200, in particular, uses the seat's calibration information 108 in combination with occupant sensor data (Raw Sensor Data) 204 to identify a vehicle occupant. The Pattern Module 300 then uses occupant sensor data 204 in combination with outputs from the Weight Estimation Module 200 to identify a vehicle occupant. These two modules have different responsibilities within the system, but both modules contribute to a final deployment decision 420 made by the Decision-Making Module 400.

More specifically, the Weight Estimation Module 200 uses the seat's calibration information 108 and current sensor status 204 to calculate Sensor DUs for each of the sensors. This array 206 of Sensor DUs is in turn used to make a preliminary estimate of the occupant's weight, represented as the occupant's Raw DU 208. The Sensor DU array 206 from the Weight Estimation Module 200 is sent to the Decision-Making Module 400 and both the Raw DU 208 and the Sensor DU array 206, along with a raw grayscale array 209, are sent to the Pattern Module 300 for use as pre-processed data. The Pattern Module 300 then analyzes the Sensor DU array 206 to create a "seat image" or deflection pattern of the occupant, that is based upon the current deflection positions of the individual sensors in the seat. Although the output of both modules influences the final decision 420, the Pattern Module 300 has the most influence on the final decision 420 because it can directly manipulate the final estimated weight (Decision DU) 308. Specifically, the Pattern Module 300 can directly influence the Decision DU 308 by modifying the Raw DU 208 from the Weight Estimation Module 200. The specifics of each of these modules will now be discussed in greater detail.

Weight Estimation Module

The Weight Estimation Module 200 performs the weight estimation process. Weight estimation makes two primary contributions to the occupant classification system 55. First, it creates its own input to the decision-making process and second, it lays a foundation for the Pattern Module 300. In order to make these contributions valuable to the classification system 55, there are several goals within the weight estimation process itself. A first goal is to successfully separate $5^{th}$ Percentile Females from 6-Year Olds. Another goal is to distinguish other weight targets as may be required by a specific customer. A third goal is to maintain a consistent weight "image" across body types, sitting positions, weight shifts, and environmental changes. Yet another goal is to calculate the weight image of an occupant consistently across the seat material and assembly variations seen in production for a particular platform. Finally, the weight estimation process should prepare a normalized representation of the sensor array's input for use in the pattern process. It is not the role of the Weight Estimation Module 200, however, to determine by itself whether the occupant is a live occupant or another occupant-type.

Figure 16:
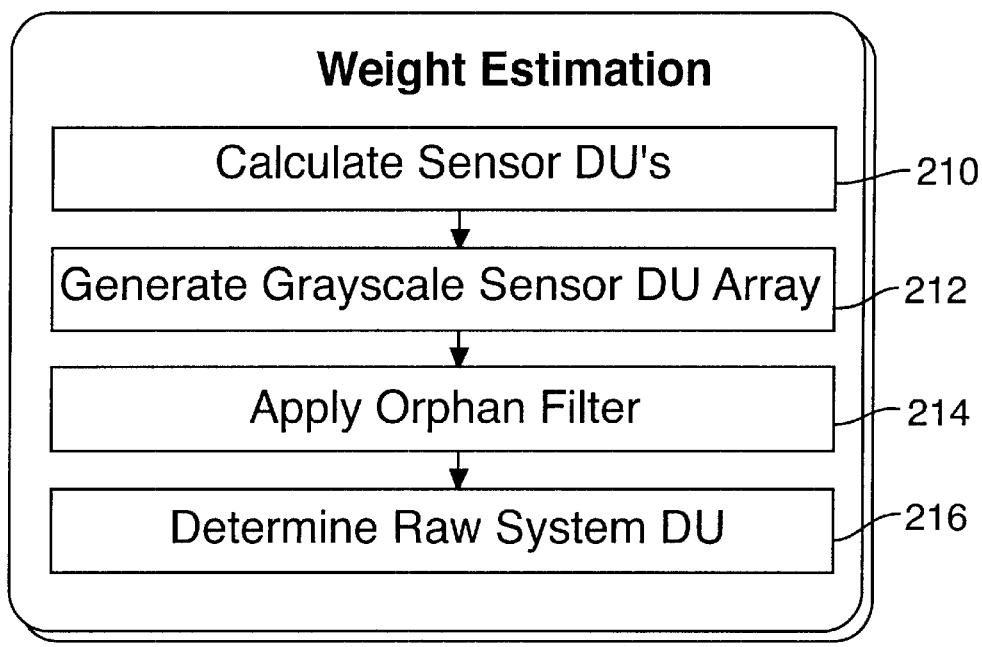
FIG. 16 is a flow diagram illustrating the basic steps of the weight estimation process performed by the weight estimation module of the occupant classification system of FIG. 2.
Figure 17:
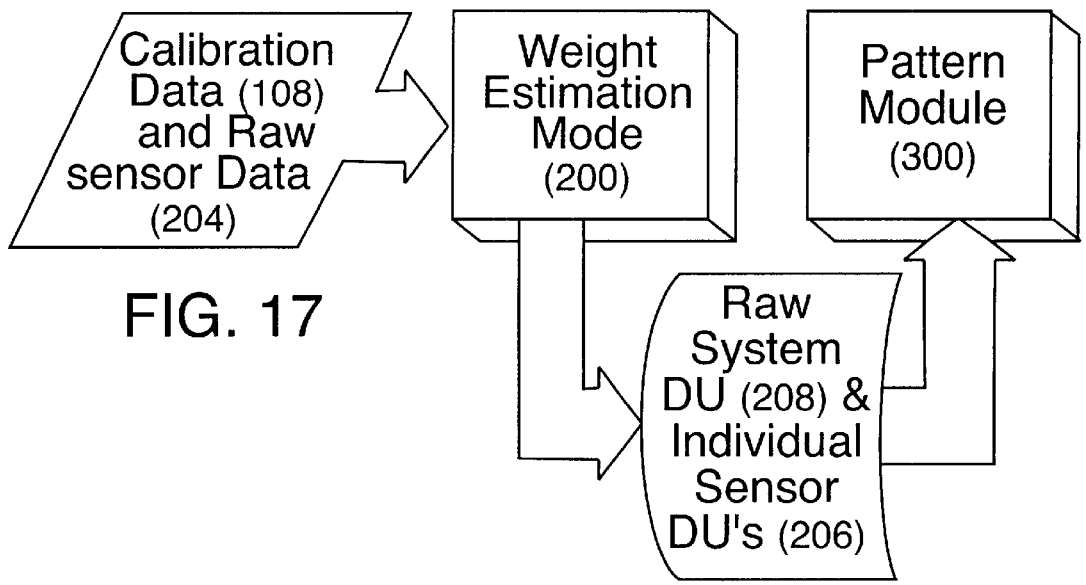
FIG. 17 is a block diagram illustrating the weight estimation module and the pattern module of the occupant classification system of FIG. 2, and the transfer of data into and between them.

FIG. 16 is a flow diagram illustrating the basic components of the weight estimation process. As shown by FIG. 16, the first step 210 in weight estimation is to calculate the Sensor DU for each active sensor in the system. The result of these calculations is an array of up to 28 bytes with a Sensor DU for each sensor. FIG. 17 is a block diagram illustrating data flow into the Weight Estimation Module 200 from the Calibration Unit 100 and the sensor array 50 (see FIG. 2) and further illustrating data flow from the Weight Estimation Module 200 to the Pattern Module 300. As illustrated in FIG. 17, the Weight Estimation Module 200 uses calibration data 108 from the Calibration Unit 100 to translate sensor data 204, representing each sensor's deflection due to a seat occupant, from the sensor array 50 into a normalized deflection (Sensor DU) value 206. The Weight Estimation Module 200 also calculates an effective system deflection (Raw System DU or Raw DU) value 208 of the seat occupant by adding the Sensor DUs from all of the individual sensors together in step 216 of FIG. 16. The Raw DU value 208 is used in the classification system as a preliminary weight estimate of the seat occupant.

Figure 18:
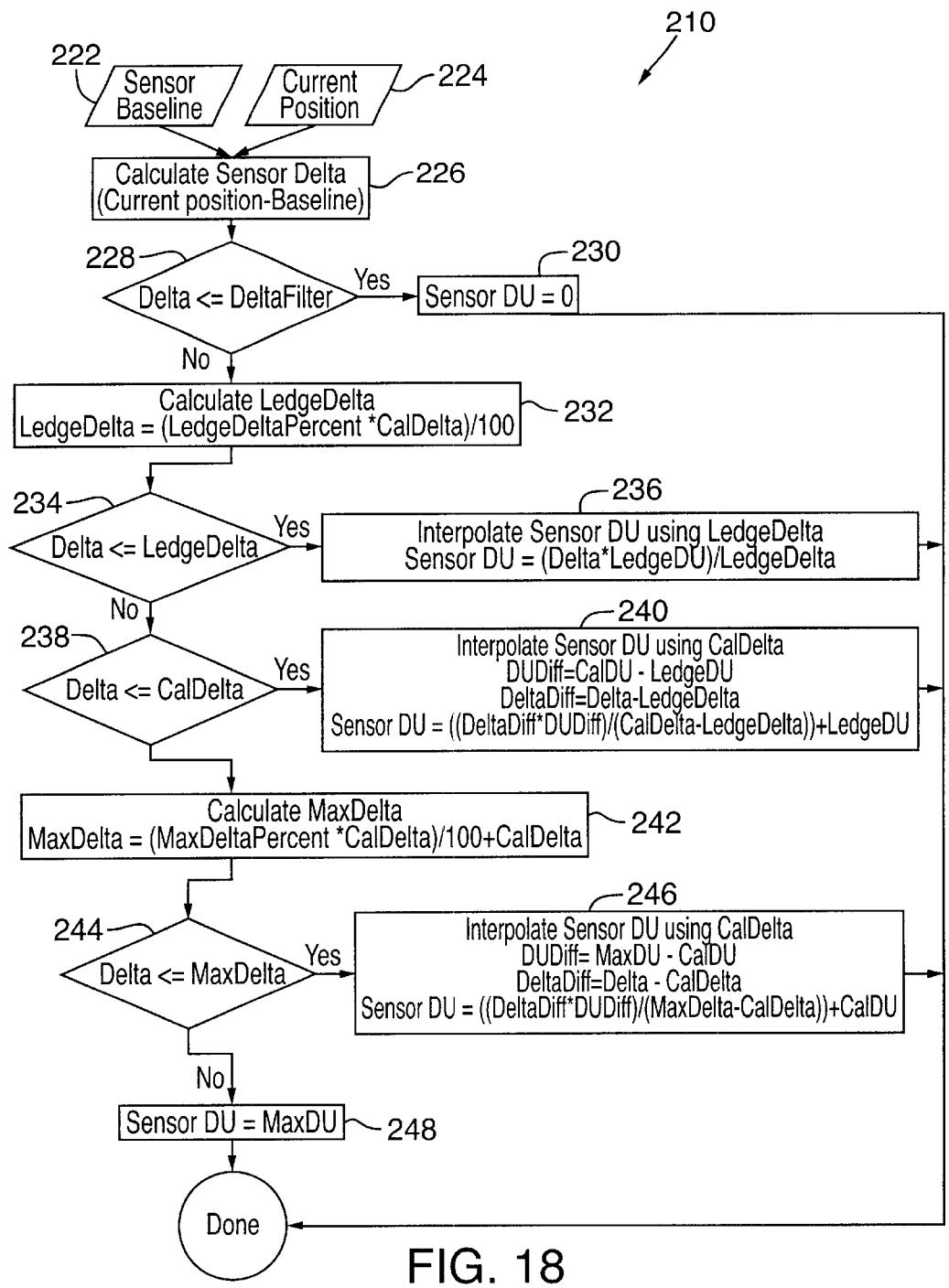
FIG. 18 is a flow diagram illustrating a process for calculating relative sensor deflection values (Sensor DUs) in the weight estimation process of FIG. 16.

FIG. 18 is a flow diagram illustrating the process for calculating a Sensor DU according to step 210 of FIG. 16. Referring to FIGS. 16–18, the process for calculating a Sensor DU during the weight estimation process, including the definitions of several terms useful in describing the process, will now be explained. A Sensor Baseline 222 is a sensor's "at rest" value in the seat, or, in other words, its value with no load. A System Baseline is the array of baselines for the whole sensor mat 50 (see FIG. 3). Monitoring Sensor Baselines 222 is very important because a sensor will never produce zero resistance (especially with upholstery pre-loading), and a sensor's change in resistance due to a seat load can't be accurately determined without knowing its resting resistance. The Weight Estimation Module 200 continually tracks the baselines 222 for all sensors.

A sensor's Current Position 224 is its last position observed by analog-to-digital (A-to-D) conversion hardware. The Current Position 224 and Sensor Baseline 222 values (sensor data) are numbers between 0 and 255 and are not actually raw sensor resistance readings, although they are determined based on the raw sensor resistance readings. The Current Position 224 value is averaged in its own first-in first-out (FIFO) queue before any part of the DU calculation is performed. This helps to reduce the impact of noise in the system.

A Sensor Delta is calculated in step 226 by subtracting the Sensor Baseline 222 from its Current Position 224. The resulting difference should be a positive value, and represents the amount of deflection the sensor is currently experiencing due to a seat load. This can be compared against the sensor's calibration deflection (CalDelta) value from the fixed-load calibration process to help estimate the current load on the sensor. Because the Baseline Management (BLM) System gets the sensor's Current Position 224 after the DU calculation, negative Sensor Deltas are possible. Any negative Sensor Deltas that arise should be considered to have a DU value of "0" without any further calculation.

The DeltaFilter values serve as a threshold for the DU calculation to take place. There is a DeltaFilter value for each sensor in the system. As indicated in step 228 of FIG. 18, if the Sensor Delta is not greater than its DeltaFilter value, the Sensor DU is set to "0" in step 230 and no further calculation is performed for that sensor. The DeltaFilter values thereby help to define a centered plane 72 (see FIG. 5) through the seat foam at a place where various occupants can be detected accurately. When the Sensor Delta value is greater than the DeltaFilter value, the Sensor DU will be calculated using the CalDelta value from the calibration data 108. As explained with respect to the Calibration Unit 100, a calibration delta (CalDelta) is a sensor-specific, post-gain deflection value determined during the calibration process.

There are three Sensor Delta values or regions where the Sensor DU can be determined without interpolation. When a Sensor Delta is equal to its CalDelta value, for example, the sensor is given a DU value equal to the CalDU setting. Also, when the Sensor Delta value equals the LedgeDelta value, the Sensor DU will be set to the LedgeDU setting. LedgeDeltaPercent (or ledgePercent) is equal to a fixed percentage of a sensor's CalDelta value, as determined for that sensor in that seat platform. The calculation of LedgeDelta takes place in step 232 by multiplying LedgeDeltaPercent and CalDelta together and then dividing by one hundred. Finally, when the Sensor Delta value is equal to, or greater than, MaxDelta, the Sensor DU will be set to the MaxDU value. Like LedgeDeltaPercent, MaxDeltaPercent (or maxPercent) is also a fixed percentage of a sensor's CalDelta value as determined for that sensor. The MaxDelta value is calculated during step 242 by multiplying the MaxDeltaPercent and CalDelta together, dividing by one hundred, and then adding CalDelta.

In short, Sensor DU is a normalized value that represents the current relative deflection of a sensor. CalDU is the DU value assigned to a sensor as its Sensor DU when its Sensor Delta is equal to its CalDelta value. LedgeDU is the DU value assigned to a sensor as its Sensor DU when its Sensor Delta is equal to its LedgeDelta value, calculated using its LedgeDeltaPercent. And finally, MaxDU is the DU value assigned to a sensor as its Sensor DU when its Sensor Delta is equal to its MaxDelta value, calculated using its MaxDeltaPercent. Each of these values can be sensor specific as well as platform specific, and they are all preferably determined so as to optimize sensor focus to distinguish between $5^{th}$ Percentile Females and 6-Year Olds.

Figure 19:
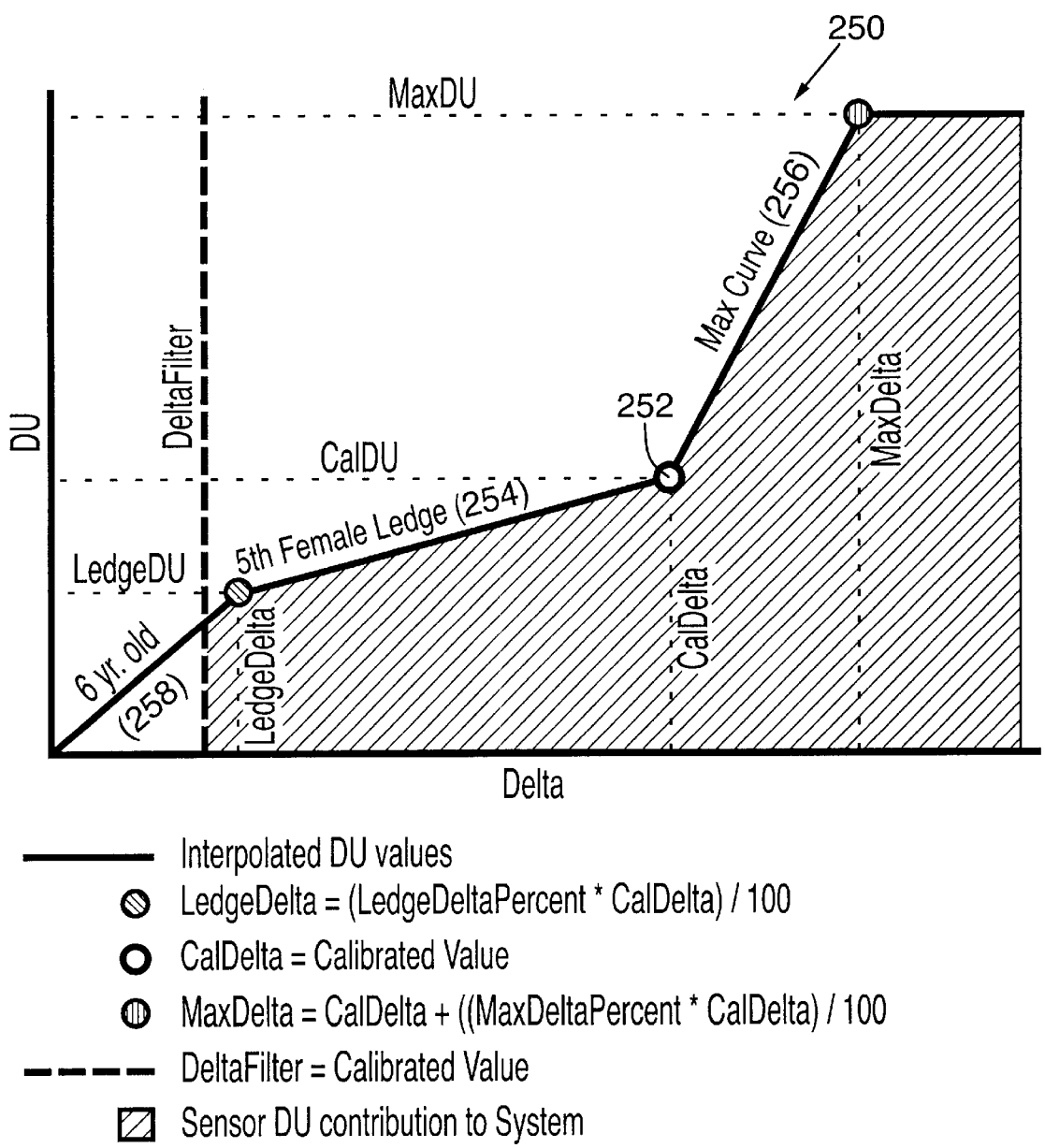
FIG. 19 is a Ledge Curve for a given sensor in the sensor array of FIG. 3, defined by calibration data received from the calibration unit of FIG. 14, and used in determining Sensor DUs through interpolation as illustrated in FIG. 18.

When the Sensor Delta falls somewhere between the foregoing values, interpolation must be used to determine the Sensor DU. Steps 236, 240, and 246 show the interpolation that takes place to calculate the Sensor DU, when necessary. The interpolation steps will now be described in further detail with reference to FIGS. 18 and 19. FIG. 19 is a graph showing a representative Ledge Curve 250. A Ledge Curve 250 is defined by values created during calibration and defines interpolation points for determining a Sensor DU. More specifically, a Ledge Curve 250 is a curve on a Delta versus DU graph defined by the LedgeDelta, CalDelta, MaxDelta, LedgeDU, CalDU, and MaxDU calibration values for a given sensor. Each Ledge Curve 250 defines interpolation points for determining a Sensor DU for a specific sensor based on its current Sensor Delta. Accordingly, when the Sensor Delta does not equal CalDelta, LedgeDelta, or MaxDelta, the Sensor DU is calculated by interpolating along the Ledge Curve 250 for that sensor. The configurable settings in the calibration data allow the curve itself to be re-shaped, if necessary. The Ledge Curve 250 shown in FIG. 19 has been optimized to maximize the DU difference between a $5^{th}$ Percentile Female and a 6-Year Old and to maintain a consistent DU image across occupant positions, weight shifts, and seat types.

The (CalDelta, CalDU) point 252 on the Ledge curve 250 of FIG. 19 represents a typical secondary deflection surrounding a $5^{th}$ Percentile Female. The relatively flat section 254 of the curve before that point is referred to as a $5^{th}$ Female Ledge (or Ledge). The Ledge section 254 helps maintain a consistent $5^{th}$ Percentile Female image as her position and weight distribution change. The MaxCurve 256, located between CalDelta and MaxDelta, on the other hand, represents a zone that 6-Year Olds seldom reach. Therefore, the DU values in that zone are escalated rapidly. This allows the slightly greater deflections of a $5^{th}$ Percentile Female to help increase her overall DU dramatically over a 6-Year Old. The 6 yr. old line 258, located between zero deflection and LedgeDelta, represents a range of typical secondary deflections for a 6-Year Old. DU values along this portion of the curve drop quickly to zero, in the direction of the origin, in order to minimize the effects of any peripheral deflections surrounding a 6-Year Old. Additionally, all Sensor Deltas less than or equal to the DeltaFilter are assigned a DU of "0". This further helps distinguish 6-Year Olds from $5^{th}$ Percentile Females. Finally, all Sensor Deltas greater than the MaxDelta are assigned the MaxDU value.

As discussed previously with respect to FIG. 18, to calculate the Sensor DU for a given sensor, the Sensor Baseline 222 and Current Position (or Sensor Position) 224 values are obtained from the sensor being evaluated. The Sensor Baseline 222 and Current Position 224 values are then compared (step 226) to obtain a Sensor Delta, representing the difference between them. If the Sensor Delta is less than its DeltaFilter value from the calibration data for that sensor stored in the EEPROM 150 (see FIG. 2), then the Sensor DU is set (step 230) to "0". Otherwise, the sensor's LedgeDelta is calculated (step 232) by multiplying its CalDelta by LedgeDeltaPercent, both of which are also stored in the EEPROM 150. If the Sensor Delta equals LedgeDelta, then the Sensor DU is set to the LedgeDU value. When the Sensor Delta is greater than its DeltaFilter value but less than its LedgeDelta value, however, then an interpolation (step 236) should be conducted to determine the Sensor DU. In this event, the interpolation (step 236) proceeds according to the formula:

$$SensorDU = (Delta * LedgeDU)/LedgeDelta$$

Similarly, when the Sensor Delta is equal to CalDelta, the Sensor DU is set equal to CalDU. In the event the Sensor Delta is greater than its LedgeDelta value but less than its CalDelta value, an interpolation (step 240) should be conducted. The interpolation in this instance follows the formulas:

$$DUDiff = CalDU - LedgeDU$$

$$DeltaDiff = Delta - LedgeDelta$$

$$SensorDU = [(DeltaDiff * DUDiff)/(CalDelta - LedgeDelta)] + LedgeDU$$

Finally, if the Sensor Delta is greater than its CalDelta, the sensor's MaxDelta is calculated (step 242) by multiplying its CalDelta by its MaxDeltaPercent, both of which are stored in the EEPROM 150, and then adding CalDelta. If the Sensor Delta is equal to or greater than its MaxDelta value, then the Sensor DU is set (step 248) equal to the MaxDU value. When the Sensor Delta is greater than its CalDelta but less than its MaxDelta, however, an interpolation (step 246) must be conducted. The interpolation to obtain the Sensor DU in this instance proceeds according to the formulas:

$$DUDiff = MaxDU - CalDU$$

$$DeltaDiff = Delta - CalDelta$$

$$Sensor\ DU = [(DeltaDiff * DUDiff)/(MaxDelta - CalDelta)] + CalDU$$

By interpolating using a Ledge Curve 250, an appropriate DU value can be determined for each sensor in order to help classify a vehicle occupant.

Figure 20:
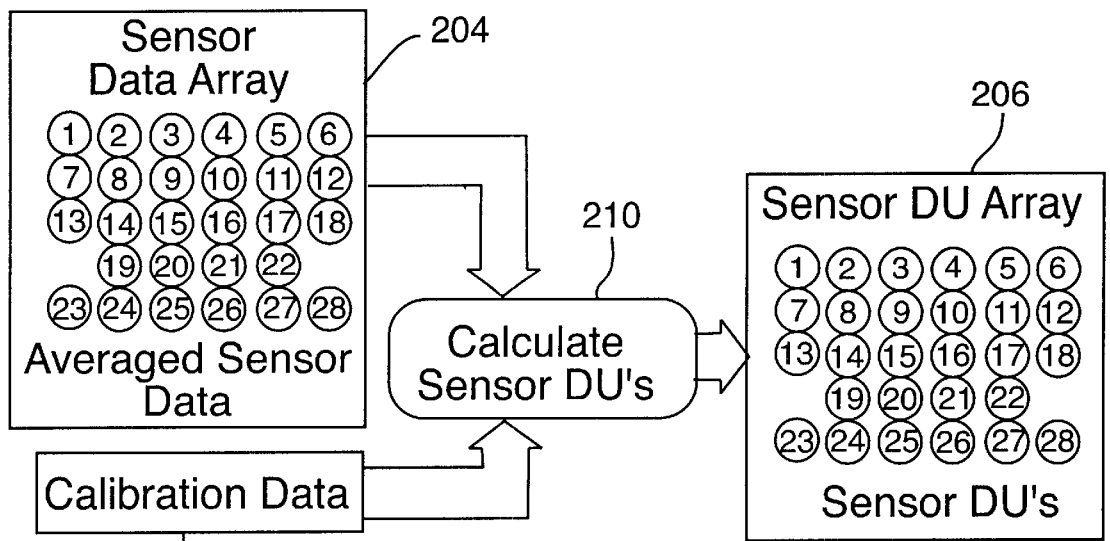
FIG. 20 is a block diagram illustrating the formation of a Sensor DU Array from the Sensor DUs of FIG. 18 using a Raw Sensor Array and the calibration data from the calibration unit of FIG. 14.

FIG. 20 is a schematic diagram illustrating the conversion of the Sensor Data Array 204 into the Sensor DU Array 206. As shown, the calibration data is used to convert the sensor data into Sensor DU values for each of the sensors. Referring back to FIG. 16, in step 212 of the weight estimation process, after the Sensor DU Array 206 has been created, a Raw Grayscale Array 260 of up to twenty-eight bytes is then created from the Sensor DU Array 206 using a grayscaling process.

Although, in this embodiment, grayscaling takes place during the weight estimation process, it is used primarily in the Pattern Module 300 and will therefore be discussed in detail in that section. An Orphan Filter, which will also be described in further detail below, identifies orphan sensors and eliminates their contribution to both the Sensor DU Array 206 and the Raw Grayscale Array 260 during step 214. Once the Orphan Filter has been applied, all the Sensor DUs are added together in step 216 to obtain the Raw System DU 208. As shown in FIG. 17, this Raw DU 208 is then sent to the Pattern Module 300 along with the Sensor DU Array 206 for use in the pattern process.

Figure 21:
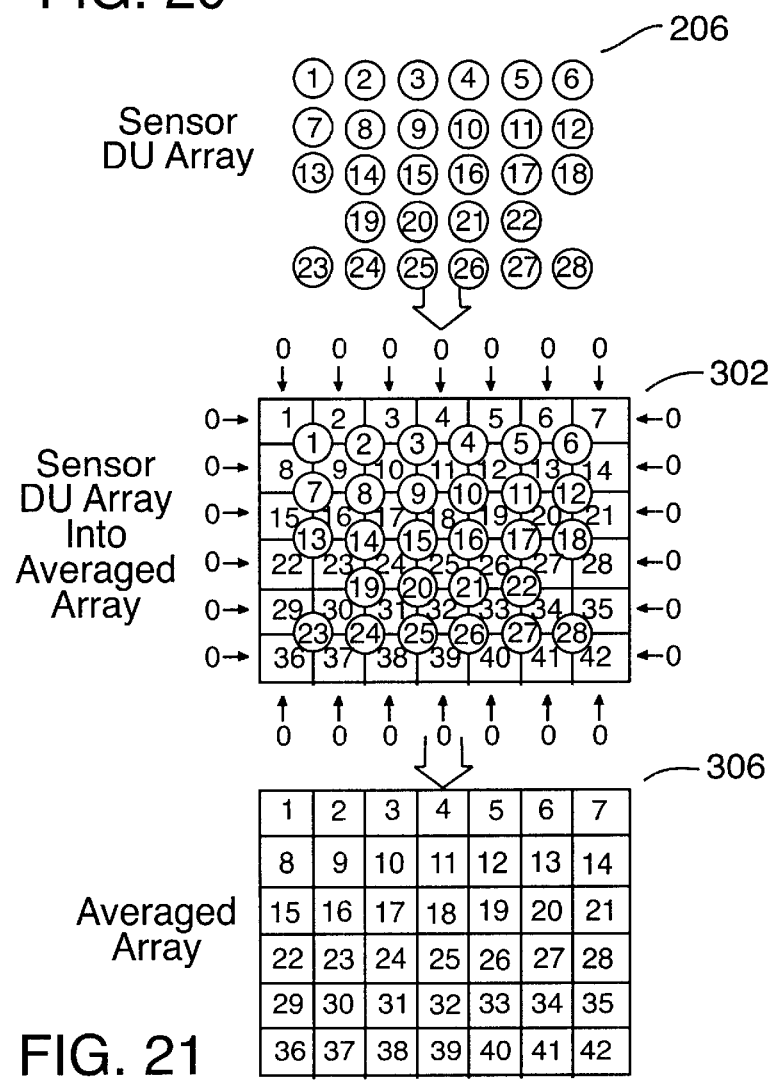
FIG. 21 is a block diagram illustrating the conversion of the Sensor DU Array of FIG. 20 into an Averaged Array.

FIG. 21 illustrates the creation of an Averaged Array (forty-two values in this example) 306 from the array of Sensor DUs (twenty-eight values in this example) 206 received from the weight estimation process. Referring to FIG. 21, the Averaged Array 306 is created as follows. Each Sensor DU from the Sensor DU Array 206 is mapped at the intersection of four Averaged Array cells. Each Averaged Array cell value is computed from the average of the four Sensor DUs on its corners. Any corner that does not have a Sensor DU uses the value of "0" instead. The result is an anti-aliased image of the Sensor DUs.

The Averaged Array 306 is then reduced into a Averaged Grayscale Array 360 with values from "0" to "3" in a way similar to the Raw Grayscale Array 260. This removes all absolute references from the sensor data. The Raw Grayscale Array 260 and Averaged Grayscale Array 360 are used to process the information in the Pattern Module 300. The relative weights of many regions are calculated, as well as the width, height, number of active sensors, which rows and columns have occupied sensors, the grayscale weights for each, and many other values.

Pattern Module

The Pattern Module 300 is a significant part of the Occupant Classification System 55. There are two categories of pattern subsystems. The first category is Child Seat Detection subsystems. These subsystems directly contribute to the pattern statistics and to the deploy or suppress status of the airbag controller by identifying child seats and triggering a suppress state when a child seat is detected. The second category is Occupant Classification subsystems. These subsystems only indirectly contribute to the deployment status of the airbag by altering the final Decision DU 308 when appropriate. Specifically, the Occupant Classification subsystems can change the Raw DU 208 to produce a final Decision DU 308 based on various factors.

There are currently two Occupant Classification subsystems that are used to update the Raw DU 208 and create the Decision DU 308. The Decision DU 308 is the final DU number used by the system for determining a deploy or suppress status of the airbag. The two Pattern subsystems used to obtain this final number are the Thin/Wide and ScatterCount subsystems. The Thin/Wide subsystem measures the width of the occupant in the Averaged Grayscale Array and determines if the width is indicative of a $5^{th}$ Percentile Female or a 6-Year Old child. If the width is indicative of a 6-Year Old, then the Decision DU value 308 is set to one-half (½) the Raw DU value 208.

The ScatterCount subsystem determines the number of non-zero cells in the Raw Grayscale Array 260. This subsystem is fairly complex and has it own Margin Management component to help widen the gap between $5^{th}$ Percentile Females and 6-Year Olds. If this subsystem determines that the data is indicative of a 6-Year Old in the seat, it will also make the Decision DU value 308 equal to one-half (½) the Raw DU value 208.

In addition to the width of the occupant, the occupant's position in the seat is also monitored by the Occupant Classification subsystems. The absolute position of the occupant is found using the Raw Grayscale Array 260. Determining the occupant's position is an important component of Context Management. Context Management attempts to keep track of where the occupant has sat and prioritize a decision reached when the occupant's position was optimal and block a decision change when the occupant's position is less dependable. The Decision DU 308 and pattern information from the Pattern Module 300 are sent to the Decision-Making Module 400 for final processing to determine a deployment state of the airbag.

In particular, the Pattern Module 300 identifies and evaluates patterns of sensor deflections created by seat occupants. In evaluating these patterns, the Pattern Module's 300 two primary tasks, related to the two subsystems introduced previously, include the detection of child seats and the classification of occupants. The first of these tasks, child seat detection, relies primarily on edge deflections and other unique pattern distributions created by rigid objects, such as child seats. Because rigid bodies deflect car seat upholstery and foam differently than softer, organic occupants, such as humans, detecting edge deflections provides a reliable way of identifying non-human occupants. Additionally, because child seats distribute their weight across a seat in a much different manner than a human, analyzing pattern distributions in the seat further facilitates the identification of child seats. The second task, occupant classification, evaluates the size of an occupant's deflection pattern, and can be "tuned" to meet customer requirements.

The Pattern Module 300 relies heavily on grayscaling to accomplish both of these goals. Grayscaling helps correct for variations in raw sensor readings caused by environmental and other changes. Although "grayscaling" in the digital media world typically refers to a fixed or absolute method of representing visual media without color information, in this application, the preferred grayscaling method is more a "relative grayscaling." It does not use a predetermined "brightness" scale but instead adjusts the grayscale image according to the relative "brightness" of the input sensor data. Grayscaling according to this process provides both weight immunity and outline detection.

Figure 22:
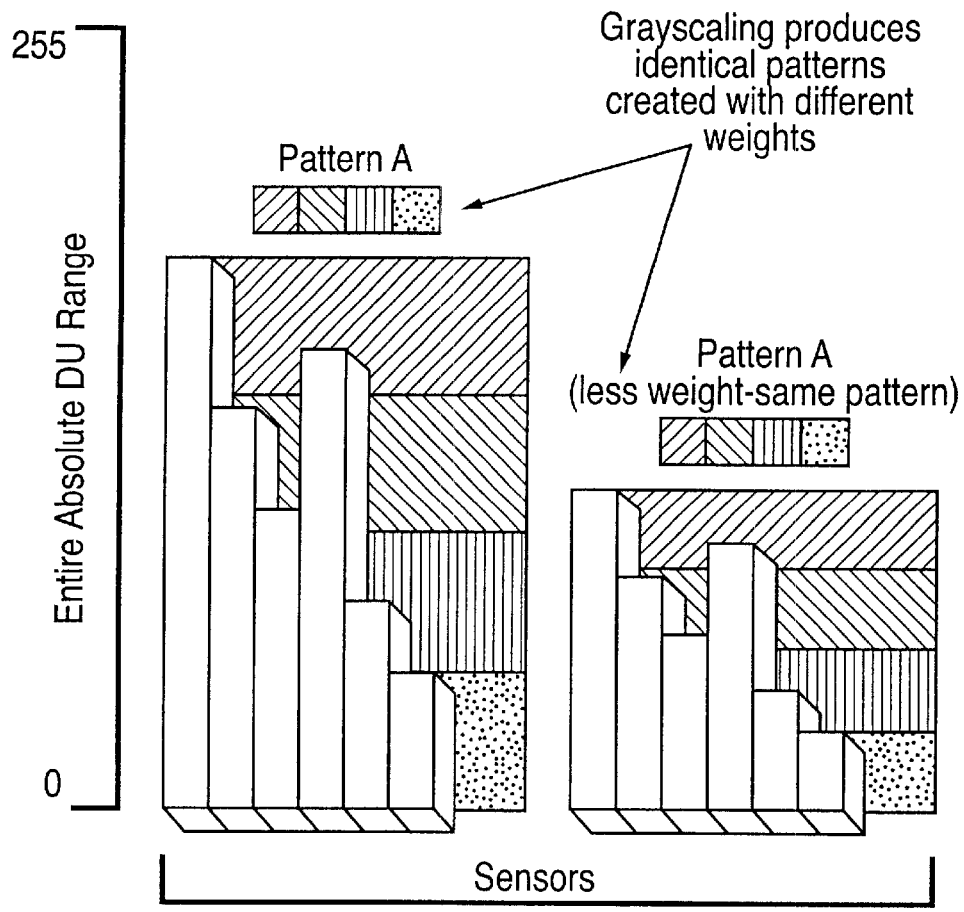
FIG. 22 is a graphical comparison illustrating how grayscaling can be used to provide consistent pattern images regardless of absolute in-seat weights.

Grayscaling is generally necessary in automotive seat occupant detection because, among other things, the seat foam and upholstery of a car seat are constantly reacting to movement, force, and environmental changes. The seat foam and upholstery also typically exhibit a memory by retaining some amount of deformation caused by previous occupants. As illustrated by the two graphs of FIG. 22, the result of these characteristics is often that the sensor system exhibits different absolute readings for an identical occupant. The deflection pattern, however, remains generally the same. Unfortunately, trying to recognize a pattern when looking at an image based on an absolute scale can be very difficult. Patterns will be lost or can change simply based on their scale.

Figure 23:
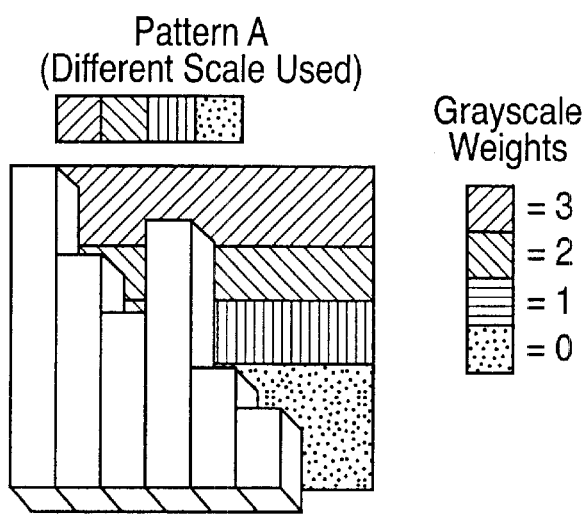
FIG. 23 is a graph illustrating the same basic grayscaling technique of FIG. 22 but using a different scale for grayscaling.

Grayscaling is one of the best ways to deal with the inherent variations of an "A-surface" seat sensor system. As shown by the graphs in FIG. 22, grayscaling provides an identical image for the deflection patterns by removing all references to an absolute scale and creating a scale based on the relative data in the image. Removing all absolute references from the grayscaled image of the seat sensor deflection pattern provides weight immunity, allowing the system to detect an outline of an occupant regardless of in-seat weight. The system is thereby able to create a consistent image for the same occupant regardless of sensor variations caused by use or environmental changes. It is also able to provide similar images for different occupants having similar in-seat shapes but different in-seat weights. This method therefore provides a way of focusing fuzzy images so that their relative shapes can be identified and used. The focused grayscale image is what makes accurate child seat recognition and occupant classification possible. The grayscale in FIG. 23 uses an alternative weighting system.

Figure 24:
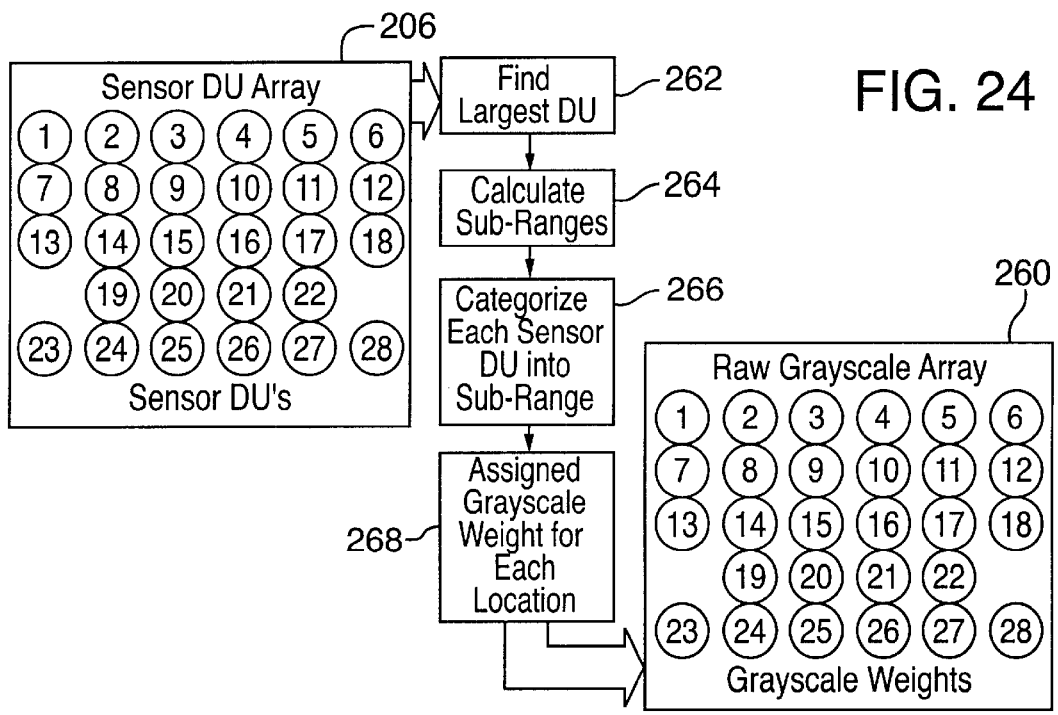
FIG. 24 is a schematic flow diagram illustrating the creation of a Raw Grayscale Array.

Referring to FIGS. 24 and 28, there are two types of grayscaled images used by the Pattern System, the Raw Grayscale Array 260 and the Averaged Grayscale Array 360.

The Raw Grayscale Array 260 is presently the most helpful of the two images. The Raw Grayscale Array 260 is created from the Sensor DU Array 206 and provides an image of the active sensors in the seat. Each component of the array has a direct relationship with a physical sensor in the seat. This array 260 reveals specific pattern traits of objects and occupants in the seat. In particular, edge deflections from child seats are exposed by this array 260 as well as general occupant size. The Raw Grayscale Array 260 is therefore very effective for detection of occupants and objects with specific characteristics. The Averaged Grayscale Array 360 is created from the Averaged DU Array 306 and is used to generalize relative weight distribution.

The first step 262, 362 in building either grayscale image (or array) is to identify the largest value from the appropriate underlying array (i.e., Sensor DU Array 206 or Averaged Array 306). The largest array value is used to define the top of the scale (100%) for the grayscale range. The range (from zero to the largest Sensor DU or Averaged Array value) is then divided into four different sub-ranges during step 264, 364. These four sub-ranges are called Range0, Range1, Range2, and Range3. The sub-ranges are preferably divided into equal percentages, where each sub-range contains 25% of the range. More or fewer sub-ranges and various other sub-range distributions could also be used, however, with varying percentages. The various preferred sub-ranges and their distribution percentages are shown below:

Range0=0%–25%
Range1=25%–50%
Range2=50%–75%
Range3=75%–100%

In step 266, 366, once the sub-range distributions are established, every other Sensor DU or Averaged Array value is divided by the largest value and multiplied by one hundred to obtain its percentage value with respect to the greatest possible value. Each percentage Sensor DU or Averaged Array value is then placed within its appropriate sub-range and assigned a grayscale weight for its value relative to the largest value during step 268, 368. The exact weighting system may be modified depending on the desired application (see, e.g., FIG. 23). The present grayscale weight system uses values ranging from 0 to 3 for the sub-ranges Range0 to Range3.

| 1. | Range0 | (0–25%) | Grayscale Weight = "0" |
| 2. | Range1 | (25–50%) | Grayscale Weight = "1" |
| 3. | Range2 | (50–75%) | Grayscale Weight = "2" |
| 4. | Range3 | (75–100%) | Grayscale Weight = "3" |

Finally, the grayscale weight for each of the sensors is placed in its appropriate location, based on its sensor number or array location, into the Raw Grayscale Array 260 or Averaged Grayscale Array 360, respectively. The final result is two arrays of grayscaled weights reflecting the normalized values in the original Sensor DU Array 206 and Averaged Array 306.

Figure 25:
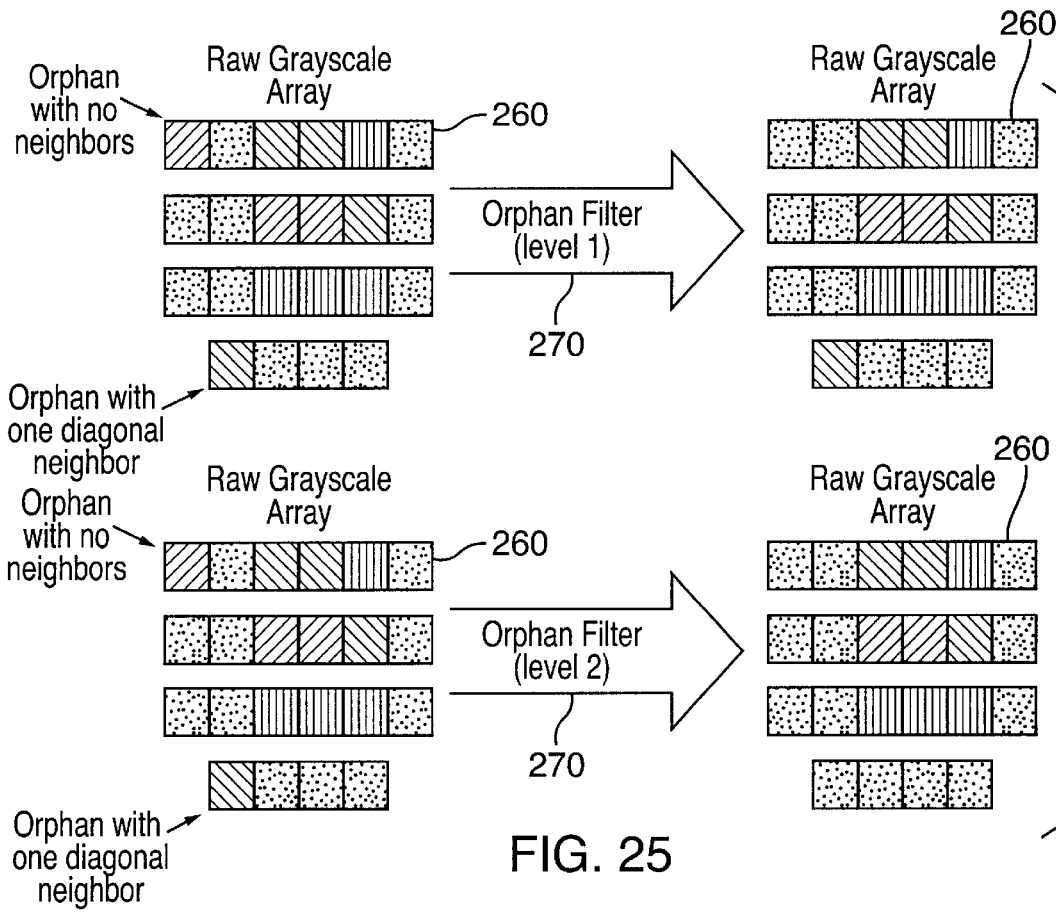
FIG. 25 includes schematic diagrams illustrating the use of the Raw Grayscale Array of FIG. 24 in detecting orphan sensor deflections during an Orphan Filter Test.

Referring now to FIG. 25, once the Raw Grayscale Array 260 has been constructed, an Orphan Filter 270 uses that array to search for orphan sensor deflections during step 214 of the weight estimation process. The Orphan Filter 270 has been adapted to provide two levels of functionality. Bolster sensors deflecting from wrinkled upholstery are a common problem. A first level of functionality was originally implemented to help the occupant classification system ignore these unwanted bolster deflections as well as other single-point deflections caused by various objects in the seat. Originally, therefore, this filter 270 was designed to find only "true" orphan sensors. True orphan sensors are sensors having a grayscale weight greater than "0" that do not have any neighbors with grayscale weights greater than "0".

At the first level, therefore, to qualify as an orphan, the sensor must not have another sensor deflection on any of its eight possible sides in the Raw Grayscale Array 260. A second level of functionality was developed. In addition to identifying true orphan sensors, this second level also identifies sensors having only one deflected neighbor on a diagonal corner. This variation was developed to help minimize the pattern size of small children sitting in the seat with their legs apart. Any orphan sensors found using these two levels are marked.

The current Orphan Filter 270 therefore searches for both types of orphan sensor deflections, namely, sensor deflections without any neighbors and sensor deflections with only one diagonal neighbor. Any orphan sensor deflections found by the Orphan Filter 270 are eliminated in both the Sensor DU Array 206 and the Raw Grayscale Array 260 by writing a value of "0" at each orphan's location. For example, sensor #1 in FIG. 25 is an orphan sensor within the first level of functionality because it has a raw grayscale weight of "2", while each of its neighbors, sensors #2, #7, and #8, all have a raw grayscale weight of "0". In this instance, therefore, the Orphan Filter 270 writes a value of "0" into orphan sensor #1's location in both the Sensor DU Array 206 and the Raw Grayscale Array 260.

Sensor #19 is an orphan sensor using the second level of functionality. In this figure, sensor #19 is shown having a raw grayscale weight of "1", while only one of its neighbors, diagonal neighbor sensor #15, also has a grayscale weight greater than "0". The value "0" is therefore written into sensor #19's location in both the Sensor DU Array 206 and the Raw Grayscale Array 260 as well. By thus identifying and eliminating isolated deflections, this filter helps minimize the effects of incidental deflections on the final weight estimate.

Child Seat Detection

As noted above, one of the main purposes of the Pattern Module 300 is to look for traits in the pattern of seat sensor deflections that are common for objects other than people. To help accomplish this, the Occupant Classification System 55 of this invention can take advantage of the unusual deformation characteristics exhibited by seat foam. Referring to FIG. 26, unlike balloons or other types of bladders filled with a gas or fluid, which tend to exert an even force across their surface when deformed, seat foam concentrates a higher surface force at the edges of the object causing the deformation. For this reason, flat, rigid objects pressed into the seat tend to experience the highest resistance at their edges, while their centers see relatively light forces. Fluid-like or softer objects, on the other hand, will tend to re-form against the foam and experience a far more even deflection pattern in the foam. Accordingly, because people have relatively soft bodies, they deflect the seat foam in a far different manner than rigid, plastic molded child seats. This recognition is incorporated into the Pattern Module 300, allowing it to recognize child seats very effectively.

A child seat can cause any one or more of a number of pattern traits in a seat bottom, regardless of how much weight is in the child seat. These pattern traits can help to distinguish between a child seat and a live occupant. Filters are provided to the Occupant Classification System 55 to test for these pattern traits and fail child seats when detected. There are two basic categories of pattern detection techniques that are preferably used by the Occupant Classification System 55, namely, edge deflection and distribution. Edge deflection pattern detection primarily uses the Raw Grayscale Array 260 to detect edge characteristics that result from rigid bodies (like child seats) in the seat. Distribution, on the other hand, recognizes that child seats can be quite large, long, or wide and will typically distribute force/weight across the seat in a manner very inconsistent from real people. Both the Raw Grayscale Array 260 and the Averaged Grayscale Array 360 can be used for this type of detection.

Internally, the Occupant Classification System 55 preferably comprises software that represents each pattern test using a single pattern flag. Referring to FIG. 27, an identical set of flags is used as a mask to enable or disable the different pattern tests. This allows individual tests to be enabled or disabled for different vehicle platforms or foam or trim types. As noted above, the Pattern Module 300 essentially tests for non-human occupants. Failing a pattern test is an indication of a non-human occupant in contact with the seat. An individual pattern test sets its flag when it passes and clears its flag when it fails. The pattern system passes an occupant when the flags are identical to the mask.

Referring now to FIG. 28, the Averaged Grayscale Array 360 is primarily used to analyze weight distribution in the seat bottom. For instance, if a very large person is firing all the sensors in a seat, the force applied to the sensors closest to the seat edge should not be significantly greater than the force experienced by the sensors in the middle of the seat. The Averaged Grayscale Array 360 is created from the Averaged Sensor DU Array 306. These two arrays 306, 360 focus on the relational status of neighboring sensors. The diagram shows forty-two (42) cells in the array, where one physical sensor can be found at the corner of four neighboring array cells.

Several pattern filters have been developed to find common child seat patterns in the Averaged Grayscale Array 360. Referring additionally to FIGS. 29A–D, each Averaged Grayscale Array 360 pattern component is made-up of a region or group of specific array cells. This region is scored by summing all the grayscale weights within that region. The system 55 can be configured to use any single region or combination of regions in new filters. While the following regions are currently defined, numerous other regions are possible.

The U-Region 372, shown in FIG. 29A, measures the total grayscaled weight of the left, right, and front edges of the seat bottom. The N-Region 374, shown in FIG. 29B, is the exact inverse of the U-Region 372. The N-Region 374 measures the total grayscaled weight of the middle and mid-back edge of the seat bottom. The MID-Region 376, shown in FIG. 29C, measures the total grayscaled weight of the middle six cells plus cell #11. The MS-Region 378, shown in FIG. 29D, measures the total grayscaled weight of the two middle cells in the middle column.

The pattern tests performed on the Averaged Grayscale Array 360 typically compare the total grayscale weight for two regions mathematically. While the following tests are currently defined, numerous other tests are possible. The UN-Pattern test, for example, compares the outside edges of the seat to its middle. If the outer edges of the seat are deflected more than the middle, the object in the seat is causing an edge deflection, or may even be spanning the center of the seat, which is very typical of car seats. The comparison is straightforward and can be performed using the following algorithm:

```
if (Utotal > Ntotal)
{
            patternFlagUN = 0;      // test fails
}
else        patternFlagUN = 1;      // test passes
```

The MIDN-Pattern test compares the middle region of the seat to seven specific center cells. It is possible for a child seat to score well with the UN but still be failing in the very middle of the seat. The following algorithm can be used to perform this test:

```
if (MIDtotal <= (Ntotal/3))
{
            patternFlagMIDN = 0;    // test fails
}
else        patternFlagMIDN = 1;    // test passes
```

The MSMID-Pattern test looks for a specific hole in the averaged pattern directly in the seat middle. Certain child seats will always create this hole. A preferred algorithm for this test is provided here:

```
if (!MStotal && MIDtota)
{
            patternFlagMSMID = 0;   // test fails
}
else        patternFlagMSMID = 1;   // test passes
```

The BlockCount is the total number of cells in the Averaged Grayscale Array 360 with a weight greater than "0". The BlockCount can be tuned, however, to higher weight thresholds. The BlockCount is compared to a minimum required BlockCount value. If the BlockCount is less than or equal to the minimum, the test fails. This test detects very small objects or point loads such as those resulting from child seat corners or legs. The following algorithm can be used to accomplish this:

```
if (blockCount <= maxBlockCount)
{
            patternFlagBlockCount = 0;   // test fails
}
else        patternFlagBlockCount = 1;   // test passes
```

Figure 30A:
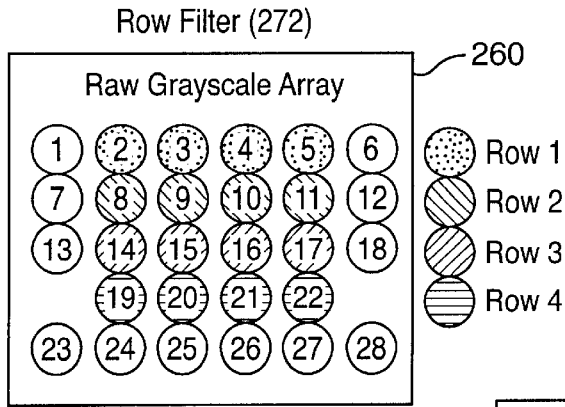
FIGS. 30A–30G are schematic diagrams of the Raw Grayscale Array of FIG. 24 illustrating how the Raw Grayscale Array can be used to perform various filter tests to identify patterns in the Pattern Module of the Occupant Classification System according to various embodiments of this invention.

In addition to the pattern tests identified above that use the Averaged Grayscale Array 360, several pattern "filters" use the Raw Grayscale Array 260 to test for common child seat patterns. Referring to FIGS. 24 and 30A–G, these filters are useful in identifying additional characteristics common to child seats. For example, many child seats have bars, plastic legs, or other edges running horizontally. These horizontal fixtures create patterns with very clear horizontal components. The Row Filter 272, the arrangement for which is shown in FIG. 30A, can be used to detect this type of pattern. Referring to FIG. 30A, only the center sixteen sensors are used in the Row Filter 272. The bolster sensors are not used. For the Row Filter 272, the center sensors are organized into four rows of four sensors each. The back row of sensors, located at the back of the seat, is identified as row one, the next two rows are row two and row three, respectively, and the front row is identified as row four. Each row's score Row1, Row2, Row3, and Row4, respectively, is calculated by summing the grayscale weights of its members.

RowThreshold and RowTotal are the two variables used to set the sensitivity of the Row Filter 272. The RowThreshold value is a grayscale weight total that an individual row must be greater than or equal to before qualifying to be passed through the Row Filter 272 test. The RowTotal value is compared to the summed grayscale weights of the neighboring rows (above and below the current row being tested). If the summed weights are less than the RowTotal value, the filter fails.

The tests for Row2 and Row3 are similar. The test algorithm is shown here using Row2:

```
if (Row2 >= RowThreshold)      // threshold test
{
    if ((Row1 + Row3) < RowTotal)
    {
        patternFlagRow = 0;     // test fails
    }
}
```

Because the front and back rows have only a single row next to them, the logic of these tests (Row1 and Row4) must be modified slightly, but remains essentially the same. The test algorithm for these rows is shown below using Row4.

```
if (Row4 >= RowThreshold)      // threshold test
{
    if (Row3 < RowTotal)
    {
        patternFlagRow = 0;     // test fails
    }
}
```

A second part of the Row Filter 272 doesn't have a sensitivity adjustment. It simply tests to see if any Row has non-zero weight and its surrounding rows have no weight. The test for Row2 follows:

```
if ((Row2) && !(Row1 || Row3))
{
    patternFlagRow = 0;     // test fails
}
```

The test for rows one and four simply tests the single neighboring row (example uses Row4):

```
if ((Row4) && !(Row3))          // check front row
{
    patternFlagRow = 0;         // test fails
}
```

Figure 30B:
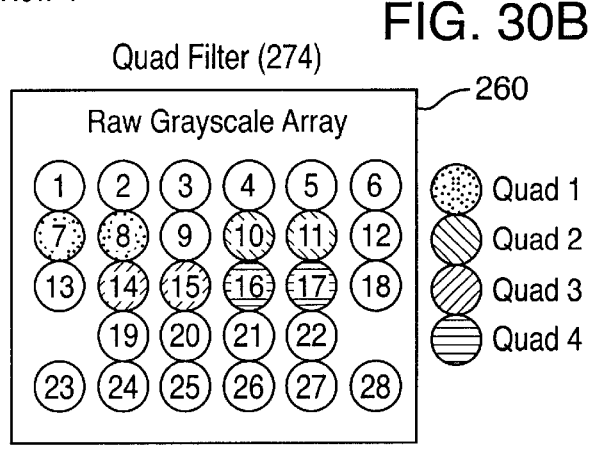

Another filter is the Quad (Diagonal) Filter 274, illustrated in FIG. 30B. When a child seat with horizontal pattern components is twisted clockwise or counterclockwise in the seat the horizontal components become diagonal. The Quad Filter 274 tests for this. Referring to FIG. 30B, the Raw Grayscale Array cells are organized into quadrants (Quad1, Quad2, Quad3, and Quad4) in the seat middle. Each quadrant score is calculated by summing the grayscale weights of its members. A single variable, QuadTotal, is used to set the sensitivity of the Quad Filter 274. QuadTotal is a grayscale weight total which must be greater than three quadrants added together before failing the Quad Filter test.

Each quadrant is tested as follows (example uses Quad1):

```
if ((Quad1) && ((Quad2 + Quad3 + Quad4) <= QuadTotal))
{
    patternFlagQuad = 0;     // test fails
}
```

There is another optional way to apply the Quad Filter 274 using the Pattern System's statistics. If the pattern statistics indicate that the pattern system has failed the current occupant more often than passing that occupant, then the Quad Filter 274 is enabled, otherwise the Quad Filter 274 is bypassed. This is an optional feature that is being evaluated. The basic logic follows:

```
//
// The flag use_Diagcontext is set if pattern statistics are to be used
// to enable/disable the Quad Filter
//
if ((!use_DiagContext) || (PatternFailStats >= PatternPassStats))
{
    // perform Quad Filter here
}
```

Figure 30C:
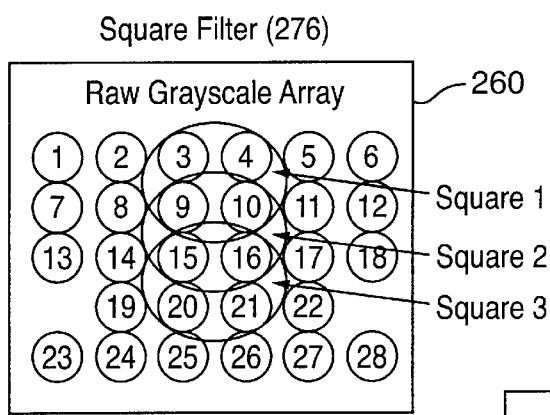

The Square Filter 276, illustrated in FIG. 30C, was originally designed to detect Rear Facing Infant Seats (RFISs). These seats will typically not successfully deflect one of the groups of four sensors (called squares) located near the center of the seat. During use, this filter has proven to be very good at detecting many child seats that have structures around the edges of their frames, or with relatively flat bottoms.

The two center columns of cells in the Raw Grayscale Array 206 are organized into three squares—Square 1, Square 2, and Square 3. At lease one of these squares must pass the Square Filter test 276 for the test to pass. Each square is scored to produce a square value (Square1, Square2, Square3) by counting the number of cells with non-zero grayscale weights. The highest possible score for any square is four. SquareTotal is a sensitivity setting for this filter that may be set from 0–4. Any square scoring less than the SquareTotal will fail the Square Filter test 276. The Pattern Context feature discussed later in this document can alter the Square Filter 276. The test used for each square is shown below (example uses Square 1):

```
if (Square1 < SquareTotal)      // are we below the threshold??
{
    patternFlagSquare = 0;      // fail test
}
```

The Scatter Filter measures the density of the occupant's image in the Raw Grayscale Array 260. The Scatter Filter begins by calculating several values. One of those values is RawHeight, which represents the height of the image, measured by finding the non-zero cells closest to the back and front rows. RawWidth is also calculated, which represents the occupant's width measured by finding the leftmost and rightmost non-zero cells. ScatterCount represents the total number of non-zero cells in the Raw Grayscale Array 260. The Scatter Filter tests the density of the occupant's image by calculating its area and comparing it to the total number of non-zero cells.

```
if (ScatterCount <= ((RawHeight * RawWidth) / 3))
{
    patternFlagScatter = 0;      // fail test
}
```

A sensitivity adjustment for the Scatter Filter can be created by adding an extra term to the area calculation in the test. For example, a sensitivity term named ScatterAdjust can be used to adjust sensitivity as follows. The greater the value of ScatterAdjust, the less sensitive the Scatter Filter test will become. The new test would be:

```
if (ScatterCount <= (((RawHeight * RawWidth) / 3) + ScatterAdjust))
{
    patternFlagScatter = 0;      // fail test
}
```

Figure 30D:
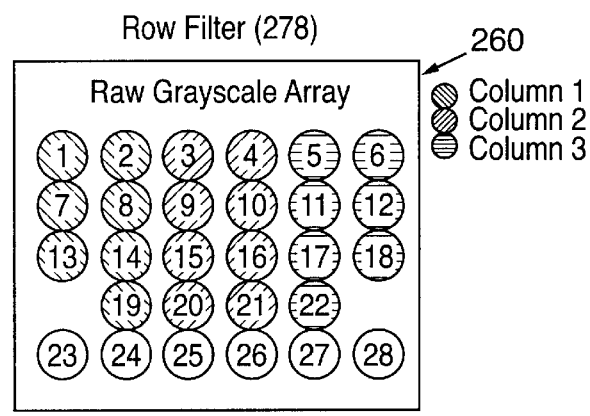

Another filter is the Oreo Filter 278 shown in FIG. 30D. The Oreo Filter 278 tests for the very typical child seat characteristic in which the left and right sides of the car seat have significantly more deflections than the center. Referring to FIG. 30D, the Raw Grayscale Array 260 is organized into three columns. Each column score is calculated by summing the grayscale weights for all member cells.

The logic for the Oreo Filter test is as follows:

```
if ((Column1 + Column3) > ((Column2 / 2) + OreoTotal))
{
    patternFlagOreo = 0;         // fail test
}
```

OreoTotal is a sensitivity adjustment to the final value for the right side of the test. As OreoTotal increases in value the test sensitivity is lowered. The Pattern Context feature discussed later in this application can also be used to alter the Oreo Filter 278.

Figure 30E:
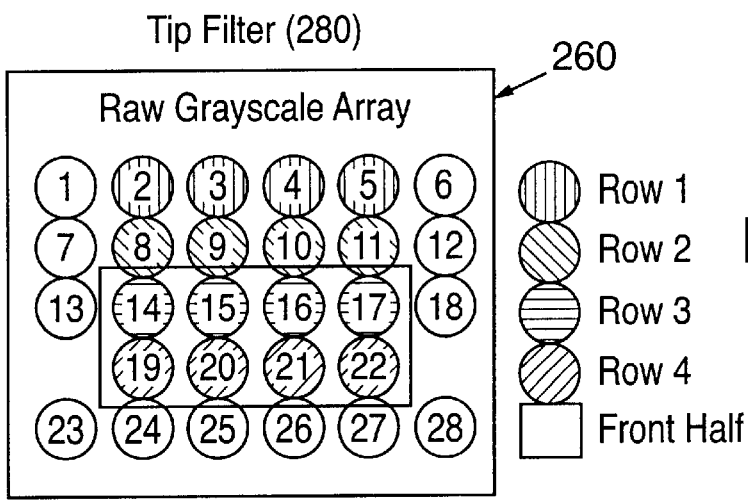

The Tip Filter 280, shown in FIG. 30E, was created to test a category of Rear Facing Infant Seats (RFISs) that apply all their weight in the front half of the seat bottom. This test uses the same Raw Grayscale Array 260 cell organization as the Row Filter 272. In this filter, the front two rows are compared to the back two. If the front half is significantly more affected by the occupant, the filter fails. The logic for this test is as follows:

```
if (((Row3 + Row4)/2) > (Row1 + Row2 + TipSensitivity))
{
    pattern FlagTip = 0;         // fail test
}
```

There is a sensitivity term on the right side of the test called TipSensitivity. As TipSensitivity increases, the Tip Filter sensitivity is lowered. The Pattern Context feature discussed below can also alter the Tip Filter 280.

The Tip Filter 280 may cause some problems when the occupant sits in the front of the seat. To help prevent this problem, the Tip Filter 280 is enabled or disabled using the Pattern Statistics. The test to enable/disable this filter follows:

```
if (PatternFailStats >= PatternPassStats)
{
    // Perform Tip Filter Test
}
```

On seats where the front-to-back spacing of the sensors is compressed, it is generally best to disable the Tip Filter 280. The reduced spacing typically does not allow RFIS patterns to occupy the front two rows.

Figure 30F:
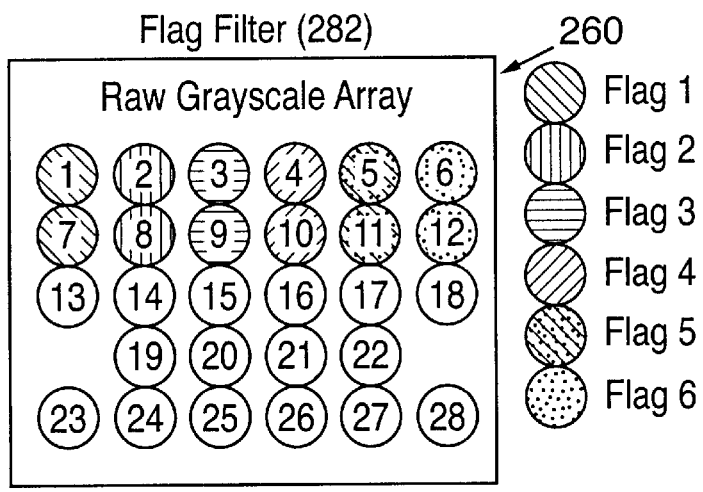

The Flag Filter 282, shown in FIG. 30F, tests all columns of the back two rows (row one and row two) for flags. Many child seats will create patterns that have small vertical columns (flags) in the back. The first step in the Flag Filter 282 is to score the possible flags (there are six total). The scores are calculated using the Raw Grayscale Array 260 and simply represent the number of non-zero cells in each Flag.

(Score=2) A score of 2 means that both cells of the flag are non-zero.

(Score=1) A score of 1 means that only one cell of the flag is non-zero. (Score=0) A score of 0 means neither cell of the flag is non-zero.

The logic for building the Flag scores is as follows:

```
// Build flag scores in a column orientation for back two rows of seat.
for(x=0; x<6; x++)
{
    score = 0;
    if (RawGray[x] && RawGray[x + 6])    // are both rows non-zero ??
    {
        score = 2;
    }
    else if (RawGray[x] || RawGray[x + 6])   // is only one row non-zero
    {
        score = 1;
    }
    Flags[x] = score;
}
```

The next step is to perform the test itself. Presently, this test is only performed on the four center Flags 2–5). However, Flags 1 & 6 are used in the test of Flags 2 & 5 (shown below). FlagThreshold is a possible sensitivity threshold for this filter and simply represents the necessary score for a Flag before it can be considered valid.

```
// Test Flag 2
if ((Flags[1] >= FlagThreshold) && !( Flags[0] || Flags[2]))
{
    patternFlagFlags = 0;        // test fails
}
// Test Flag 3
if ((Flags[2] >= FlagThreshold) && !( Flags[1] || Flags[3]))
{
    patternFlagFlags = 0;        // test fails
}
// Test Flag 4
if ((Flags[3] >= FlagThreshold) && !( Flags[2] || Flags[4]))
{
    patternFlagFlags = 0;        // test fails
}
// Test Flag 5
if ((Flags[4] >= FlagThreshold) && !( Flags[3] || Flags[5]))
{
    patternFlagFlags = 0;        // test fails
}
```

Another possible sensitivity adjustment would require a minimum number of valid flags to be present before failing the test.

Figure 30G:
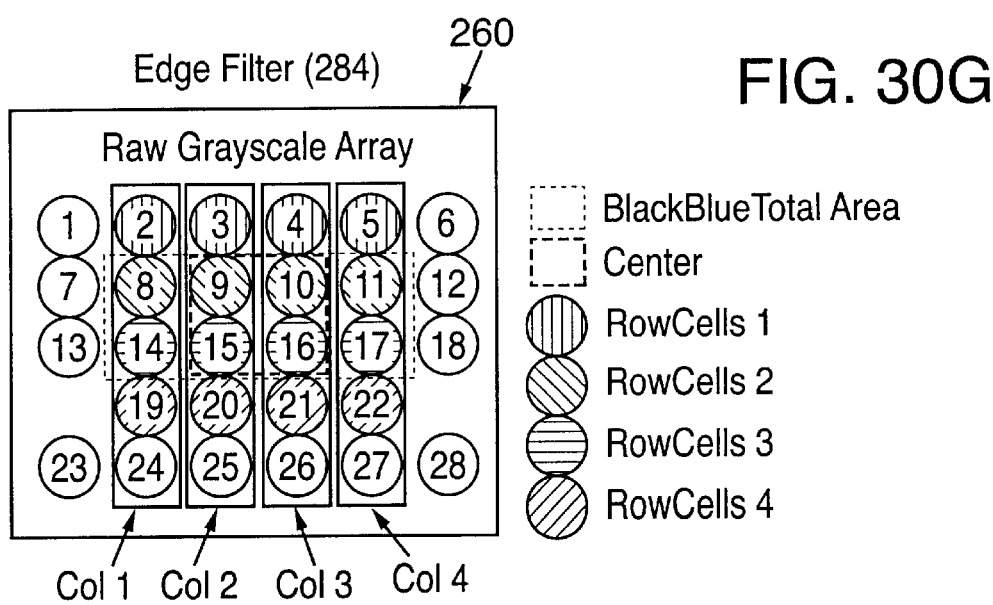

The Edge Filter 284, illustrated in FIG. 30G, tests for occupant characteristics that are the opposite of those of a human occupant. Humans will typically have their largest deflections in the middle of their pattern with the deflections tapering off toward the pattern's edges. Rigid objects, however, create just the opposite pattern—having large deflections on the outside and smaller deflections in the middle. In some cases, this can be the only difference in the patterns, which may otherwise be in the same area of the seat and have roughly the same shapes.

Several variables are calculated for the Edge Filter 284. The BlackBlueTotal value, for instance, is obtained using a weighted-scoring system that assigns and adds a weight for each grayscale weight of "0" and "1" (the bottom 50%). This is performed on the middle two rows in the seat center (row two and row three). The grayscale weights are assigned the following values and added to the BlackBlue Total:

| Grayscale Weights | Assigned Value |
|---|---|
| 0 | 2 |
| 1 | 1 |
| 2 | 0 |
| 3 | 0 |

Referring to FIG. 30G, for the Edge Filter 284, the Raw Grayscale Array 260 is organized into four center columns. The grayscale weights of a column's cells are summed to create the terms Col1, Col2, Col3, and Col4. These terms are very similar to the Row1–Row4 values calculated for the Row Filter 272. The same rows in the Raw Grayscale Array 260 are used, but instead of summing the grayscale weights, the cells with non-zero grayscale weights are counted. The Row1–Row4 values are also calculated for use in the Edge Filter 284. These are the same terms calculated for the Row Filter 272.

The grayscale weights of the four middle cells in the Raw Grayscale Array 260 are summed to create the term Center. There is also a sensitivity setting, EdgeDiff, which is a threshold setting that BlackBlueTotal must exceed before applying the Edge Filter 284. The present version of the Edge Filter 284 has been optimized for seat patterns having set dimensions. The Edge Filter 284 checks the outer edges of the center section in the Raw Grayscale Array 260. This includes rows one and four and columns two and five. Basically, the relative edge weights are compared to the seat middle. The following steps are used in the Edge Filter execution:

Step 1: Threshold Test
BlackBlueTotal must be greater than EdgeDiff. In other words, there must be enough low grayscale weights in the middle of the pattern to warrant applying this test.
There must also be enough grayscale weight in the back and front halves of the image to warrant proceeding. In other words, there must be a possibility of outside edges in the pattern.

Step 2: Edge Test #1
This first edge test simply requires that the summed weights of the front and back rows are each above a hard-coded threshold of "2". And, the summed weights of the front and back rows added together must be greater than or equal to the summed weights of the two middle rows (two and three) plus an additional constant of "5".

Step 3: Edge Test #2
The second edge test uses higher edge thresholds and a lower middle threshold when compared to Edge Test #1. An alternative test for the middle threshold uses the Center term and requires that it be less than or equal to "4".

Step 4: Edge Test #3
The third edge test imposes a much higher threshold for the front and back edges and a much lower requirement for the middle rows as compared to the other edge tests.

Step 5: Edge Test #4
The fourth edge test checks for vertical edges. It is identical to the second edge test except that column weights are used in place of row weights.

The algorithm for the Edge Filter 284 is as follows:

```
if ((BlackBlueTotal > EdgeDiff) &&
    ((Row1Cells + Row2Cells) >= 4) && ((Row3Cells +
    Row4Cells) >= 4))
{
    // Edge Test #1
    if ((Row1 >= 2) && (Row4 >= 2) &&
        ((Row1 + Row4) >= (Row2 + Row3 + 5)))
    {
        patternFlagEdge = 0;      // fail test
    }
    // Edge Test #2
    else if ((Row1 >= 3) && (Row4 >= 3) &&
    (((Row1 + Row4) >= (Row2 + Row3 + 3)) || (Center <= 4)))
    {
        patternFlagEdge = 0;      // fail test
    }
    // Edge Test #3
    else if ((Row1 >= 5) && (Row4 >= 5) &&
        ((Row1 + Row4) >= (Row2 + Row3)))
    {
        patternFlagEdge = 0;      // fail test
    }
    // Edge Test #4
    else if ((Col1 >= 3) && (Col4 >= 3) &&
        (((Col1 + Col4) >= (Col2 + Col3 + 3)) || (Center <= 4)))
    {
        patternFlagEdge = 0;      // fail test
    }
}
```

An edge filter that supports seat patterns of different sizes is also within the contemplation of this invention.

Pattern Context

Many of the filters discussed above have sensitivity settings. As these settings are changed, the system's sensitivity to child seat patterns can be raised or lowered. In other words, the system's likelihood of falsely classifying a human occupant as a child seat can be raised and lowered. During seat system development, all filters must be evaluated with live occupants to make sure there is no false child seat detection. These settings are called the "Default" settings.

Another group of settings can also increase child seat detection success. These settings are called the "Context" settings. An option in the occupant classification system allows the Context Filter settings to be used, under specific circumstances, to increase child seat detection. This option is called Pattern Context, and once enabled, it uses the Pattern Statistics to dynamically apply either the Default or Context Filter settings.

Figure 31:
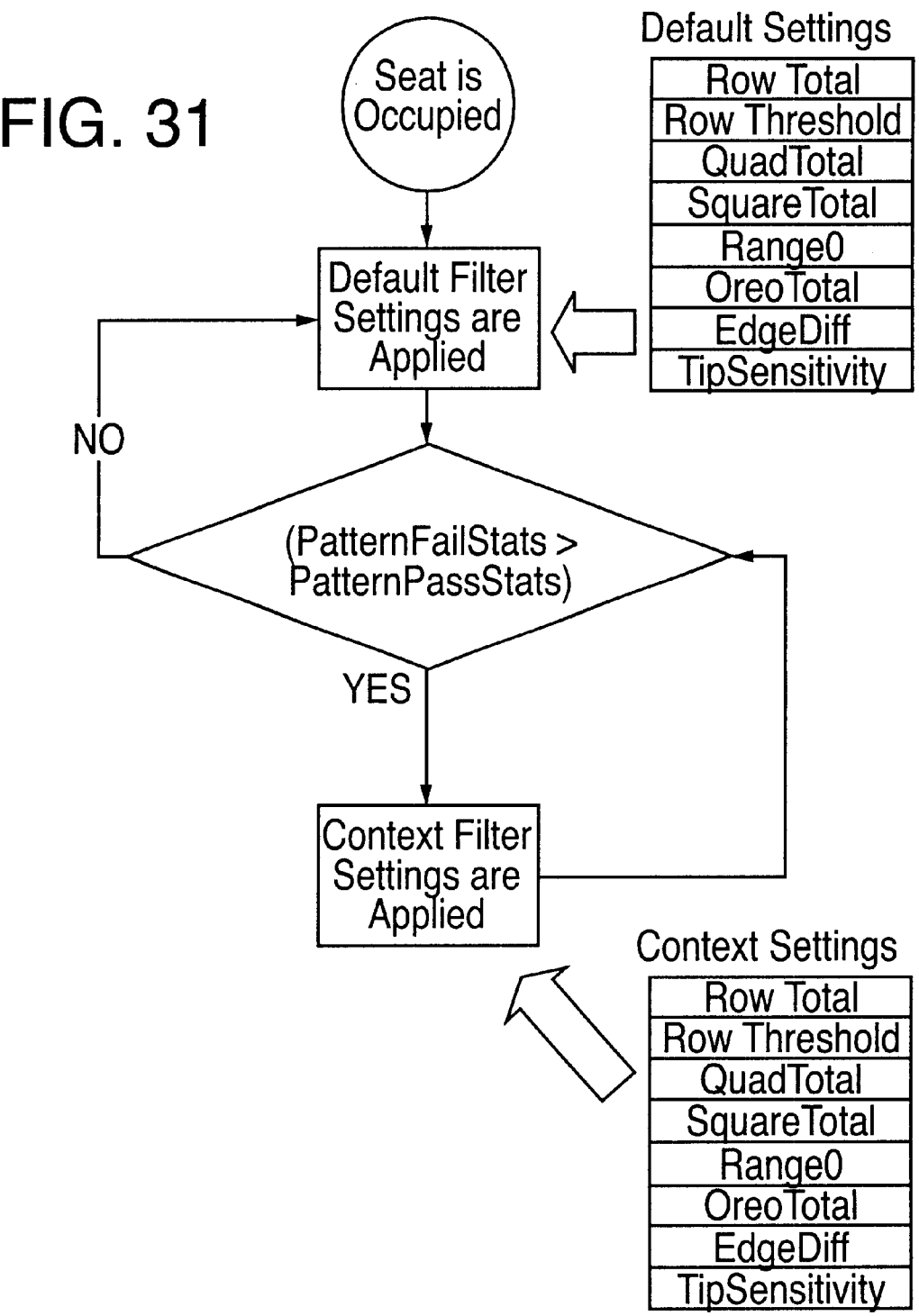
FIG. 31 is a schematic flow diagram illustrating the application of context filter settings during pattern evaluation.

Referring to FIG. 31, when a seat is initially occupied, the Default settings are always used. However, if PatternFailStats becomes greater than PatternPassStats—meaning that the pattern test has failed the occupant more than it has passed the occupant—the Context Filter settings are applied so that the occupant will be more likely to continue failing the pattern test. If, at anytime, PatternFailStats is no longer greater than PatternPassStats, the Default settings are then re-applied.

The purpose of the context settings is to keep the pattern system successfully detecting a child seat for the entire duration it is in the seat. It is important to remember that the Context settings don't fail human occupants easily, so, using them doesn't disable the system's ability to detect live occupants.

Occupant Classification

If the pattern test determines that the seat is occupied by a human rather than a car seat or other rigid object, occupant classification takes place to distinguish between the different types of live occupants. As discussed previously, occupant classification is particularly challenging when distinguishing between 6-year-old children and $5^{th}$ percentile females. This is primarily because their in-seat weights are very similar; with small children having most of their weight in the seat and $5^{th}$ percentile females normally applying only part of their total weight to the seat bottom.

Figures 32A, 32B, 32C:
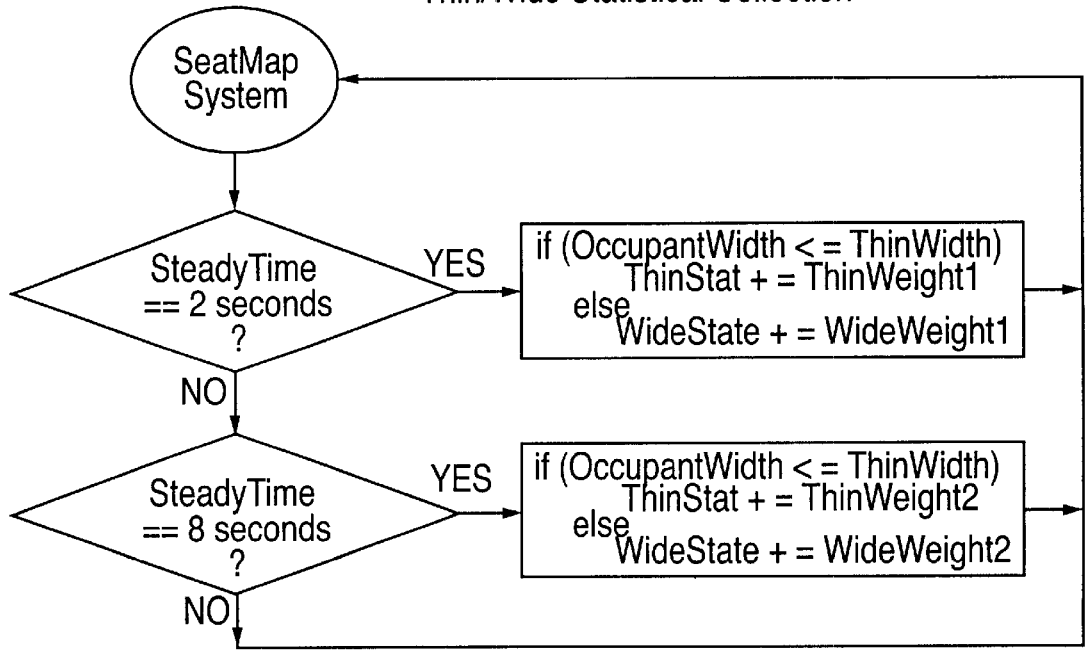
FIGS. 32A and B are schematic diagrams of the Averaged Grayscale Array of FIG. 28 illustrating the use of a Thin/Wide occupant classification technique.
FIG. 32C is a schematic flow diagram illustrating the basic Thin/Wide statistical collection operation according to an embodiment of this invention.

In order to overcome this difficulty, the Pattern System 300 uses occupant size, as it can be perceived in the seat bottom, to classify seat occupants. In general, this means measuring the size of the sensor deflection pattern in the seat. There are two primary approaches for determining pattern size, Thin/Wide and ScatterCount. Referring to FIGS. 32A, 32B, and 32C, the Thin/Wide approach uses the Averaged Grayscale Array to measure the occupant's width. This method is presently less preferred, because it has a predictable instability. The ScatterCount method, illustrated in FIG. 34, uses the total number of cells firing in the Raw Grayscale Array to measure the occupant's overall size, and is the presently preferred approach. A schematic representation and comparison of the two approaches is presented in FIG. 33.

Referring to FIGS. 32A, 32B, 32C, and 33, the Thin/Wide occupant classification method simply measures the width of the pattern in the Averaged Grayscale Array 360 by finding the left-most and right-most non-zero cells in the array. The result of this width algorithm is OccupantWidth. The parameter ThinWidth determines the maximum width allowed for a "thin" classification. An example of this is:

```
if (OccupantWidth <= ThinWidth)
{
    // process for thin classification
}
else
{
    // process for wide classification
}
```

Unfortunately, there are circumstances than can make this method unreliable. The Averaged Grayscale Array 360 is created from the Averaged DU Array 306. The edges of the pattern seen in the Averaged Grayscale Array 360 are simply therefore a product of the grayscaling algorithm and the 25% range that is assigned a grayscale weight of zero. At any point, one of the four cells contributing to the "zero-weight" cell on the pattern edge could increase due to a weight shift or environmental change. This can cause any edge cell to "wink" on or off as the occupant shifts, or as environmental changes occur. A single Average Grayscale Array cell close to the 25% border that is winking can cause the results of the Thin/Wide approach to change at any moment.

The Thin/Wide method results are used by a weighted-statistical system. The collection and use of statistics is covered in greater detail with respect to the Decision-Making Module 400. Basically, statistics are gathered based on occupant movement. When an occupant is moving in the seat, no system statistics are gathered, as any snapshot during movement would be unreliable and unpredictable. Once the occupant becomes steady (i.e., stops moving), a SteadyTime counter is incremented for each consecutive "steady" second, until the occupant moves again. Renewed movement resets the SteadyTime to 0. An important element of statistical sampling in the SeatMap system is applying more emphasis on samples taken with a larger SteadyTime value than those taken with a lower one. This means that an occupant measurement resulting from a longer steady state will have a greater contribution to the overall statistical picture. Thin/Wide statistics, for instance, do this.

There are two statistical collection points for Thin/Wide, currently set at two and five seconds respectively. Each collection point has its own statistical weight for thin or wide status. This allows the second collection point to be tailored independently to add greater, equal, or less to the statistical totals. This also allows thin and wide weights to be adjusted independently for both collection points. Each frame processed uses Thin/Wide statistics to alter the Decision DU, if necessary. For example:

```
if (ThinStats > WideStats) // if statistics indicate thin occupant
{
    // Lower DU by a preset fraction of the DU which is defined
    // by the value of ThinDUScale
    DecisionDU -= (DecisionDU / ThinDUScale);
}
```

An improvement for Thin/Wide statistics blocks statistical gathering when the occupant is not centered in the seat because a Thin/Wide classification can be unreliable when the occupant sits either inboard or outboard.

Figure 33A:
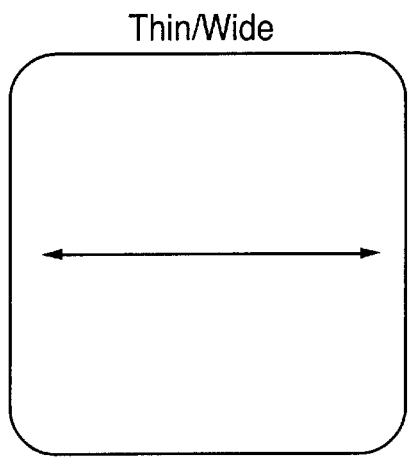
FIGS. 33A and 33B provide a schematic comparison of the relative functions of the Thin/Wide and ScatterCount statistical collection and pattern evaluation approaches.
Figure 33B:
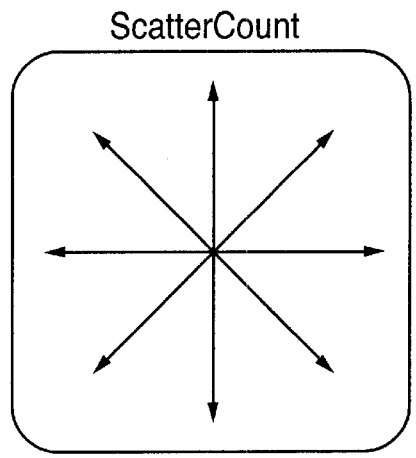

The ScatterCount method is the presently preferred method for occupant classification. ScatterCount represents the number of non-zero cells in the Raw Grayscale Array 260. This method has proven much more reliable and stable across environmental and sensitivity changes than the Thin/Wide method. Referring to FIG. 33, the ScatterCount method also represents a multidimensional approach to determining occupant size, where the Thin/Wide approach only provides a one-dimensional measurement. The reasoning behind the application of the ScatterCount method is that different size occupants will generally have a very predictable surface area, which is consistent across many individuals.

Figure 34:
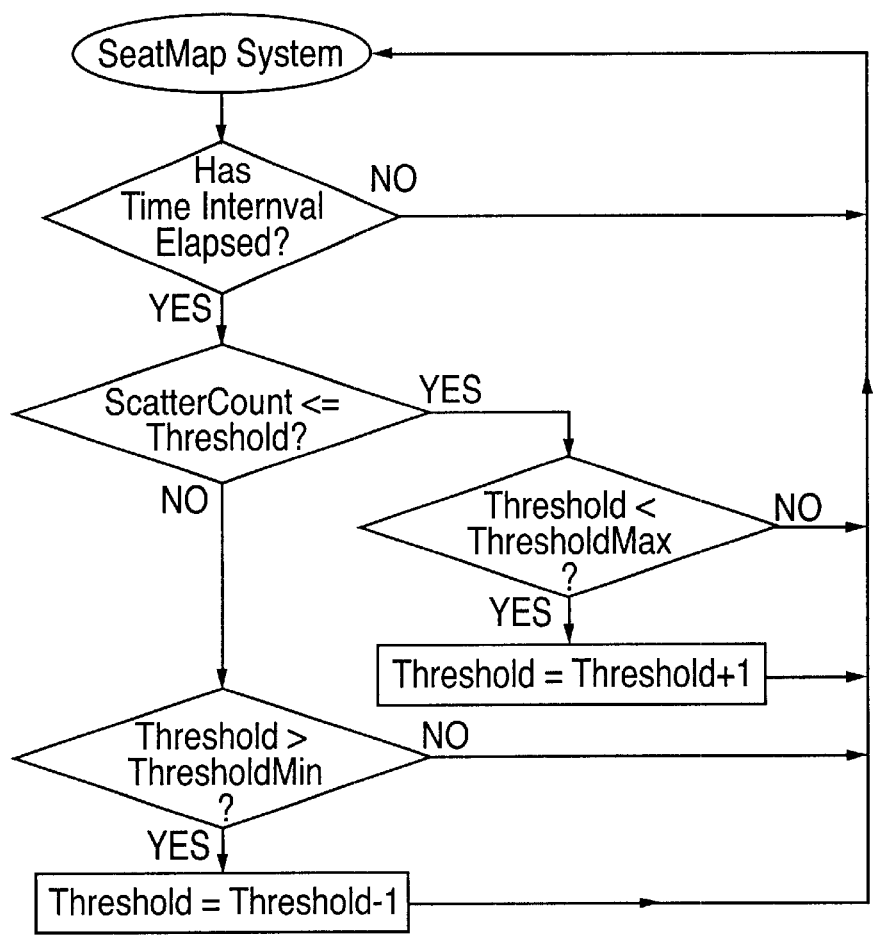
FIG. 34 is a schematic flow diagram of the ScatterCount occupant classification approach according to another embodiment of this invention.
Figure 35:
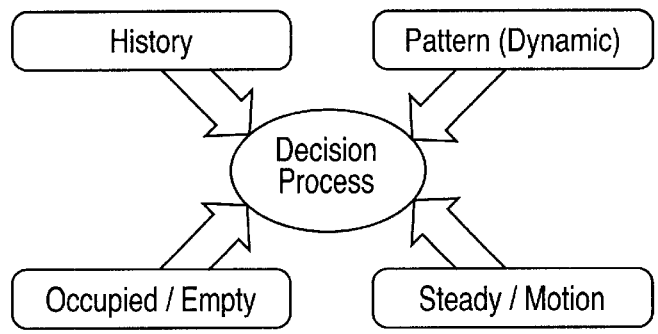
FIG. 35 is a schematic flow diagram illustrating the inputs into the Decision-Making Module's decision process.

Referring to FIG. 34, the ScatterCount method uses predetermined thresholds to classify occupants. Fifth percentile females will have a typical ScatterCount value ("11" for Cadillac S5S) that is much greater than 6-year olds ("6" for Cadillac S5s). This is a much larger margin than the single column width difference for the Thin/Wide method.

| Occupant | Typical ScatterCount |
| --- | --- |
| 5th Female | 11 |
| Six-year-old | 6 |
| 50th male | 16 |

The typical threshold used for ScatterCount is "9". The logic for the ScatterCount method looks like this:

```
if (ScatterCount <= ScatterCountThreshold)
{
    // classify occupant as a child
}
else
{
    // classify occupant as 5th female or larger
}
```

Because car seats have complex surfaces, the position an occupant is sitting in can affect the ScatterCount. This is particularly true for Inboard/Outboard (Left/Right) positions, which typically reduce the ScatterCount value. A separate threshold is used for non-centered positions to maintain consistent performance. A common threshold for use when the occupant is in the Inboard/Outboard position is "6".

```
if (offcenter) // is occupant inboard or outboard?
{
if (ScatterCount <= OffCenterThreshold)
{
    // Lower DU by a preset fraction of the DU which is defined
    // by the value of SmallDUScale
    DecisionDU -= (DecisionDU / SmallDUScale);
}
else
{
    // classify occupant as 5th female or larger
}
}
else
{
if (ScatterCount <= CenterThreshold)
{
    // classify occupant as a child
    // Lower DU by a preset fraction of the DU which is defined
    // by the value of SmallDUScale
    DecisionDU -= (DecisionDU / SmallDUScale);
}
else
{
    // classify occupant as 5th female or larger
}
}
```

Various alternatives are also contemplated. For instance, a separate threshold for occupants sitting in the front part of the seat versus the back is a potential improvement. Seating positions could also be categorized in quadrants.

Another feature is Margin Management. The Thin/Wide method uses statistics to help keep it from quickly changing the system's deploy status every time the occupant appears to be thin or wide. Statistics generally work well for preventing unwanted shifts in the deploy status because occupants are more likely to be classified correctly over time. There may be circumstances, however, where an occupant is initially misclassified and is thereafter only correctly classified after the passage of a certain period of time. Unfortunately, using statistics in this situation slows recovery to the correct occupant classification because the statistical balance must swing the other way and this may take time.

A design goal for using ScatterCount was to try to create an alternative method that can dynamically adjust ScatterCount thresholds based on the occupant and allow for quick recovery in the case of misclassification. To accomplish this, the ScatterCount Threshold is managed up or down within a range defined using the ThresholdMin and ThresholdMax values. Each time the ScatterCount classifies the occupant as a child the Threshold is incremented until it reaches the ThresholdMax. This allows the margin to be dynamically increased for the child to help guard against accidental misclassification because of some future activity in the seat.

If the ScatterCount is greater than Threshold (occupant is a $5^{th}$ female or larger) the Threshold is decremented until it equals ThresholdMin. The range allowed for the Threshold is relatively small to allow a misclassification to recover very quickly. For instance, if a thin $5^{th}$ female somehow scores a ScatterCount of "8" initially but later shifts and scores an "11", her classification will change immediately. This would not happen with a solely statistical method. The present Margin Management method uses different thresholds for centered versus off-center positions. There are also two different ranges for center versus off-center positions. Each time the seat is vacated and then occupied the thresholds are reset to the middle of their respective ranges.

Decision-Making Module

The final component in the occupant detection system is the Decision-Making Module 400. The Decision-Making Module 400 takes the information gathered from the other components and makes a deployment state decision for the airbag. Specifically, to make the deployment state decision, the Decision-Making Module 400 looks at DU trends (past versus current DU) to evaluate occupant weight and movement, and pattern information (pattern statistics, current pattern status, pattern size and location in seat). Based on a careful analysis of the weight, movement, and pattern information, the Decision-Making Module 400 determines whether the airbag should be placed in the deploy or suppress state.

The Decision-Making Module 400 relies most heavily on the pattern status. Factors such as temperature, humidity, and aging will each affect the seat foam and sensors, altering the results of weight estimation with time and environmental changes. Occupant pattern characteristics, on the other hand, remain predictable even with severe variations in sensor sensitivity. Another benefit from the basic processing of the Pattern System is the ability to track occupant location in the seat.

The decision process requires a predefined period of steady state before allowing itself to change decision status. This avoids decision oscillations when the system state hovers around a possible point of change. A change from "Suppress" to "Deploy" requires that the conditions for this change be stable for a period of deployWait seconds. Changing from "Deploy" to "Suppress" requires steady conditions for the period defined by suppressWait seconds. Each of these periods is set to three seconds in the presently preferred embodiment but can be configured for any desired time period. A FIFO structure called History is used to keep a summary of system statistics for up to five seconds. This structure is used to make sure the system has been stable before changing state.

Experience with live occupants made it clear that allowing the system to change its decision state during movement in the seat can result in bad decisions. An occupant constantly moving while trying to get comfortable or simply climbing into a seat may fail pattern recognition or not have enough perceived weight to allow the system to make a "Deploy" decision. Since many statistical measurements are active during seat occupation, the system will not allow the occupied status to be set "TRUE" until the occupant has been steady for an occupiedWait period.

Reliably recognizing the occupied and empty states of a seat is important to accurate classification. Failure to distinguish between these states may cause the system to hang in an unusable state. There is a threshold DU level called emptyValue, which must be exceeded before the seat is eligible to be declared occupied. The occupant must also be steady before the occupied state will become "true".

The statistics gathered for each second are categorized as static since they represent the momentary snapshots for each frame. Such static statistics are gathered whether the seat is occupied or not. Dynamic statistics, however, are only collected when the seat is occupied. After many tests it was determined that the pattern system always indicates the correct decision if its state is tracked statistically over the period of each seat occupation.

Figure 36:
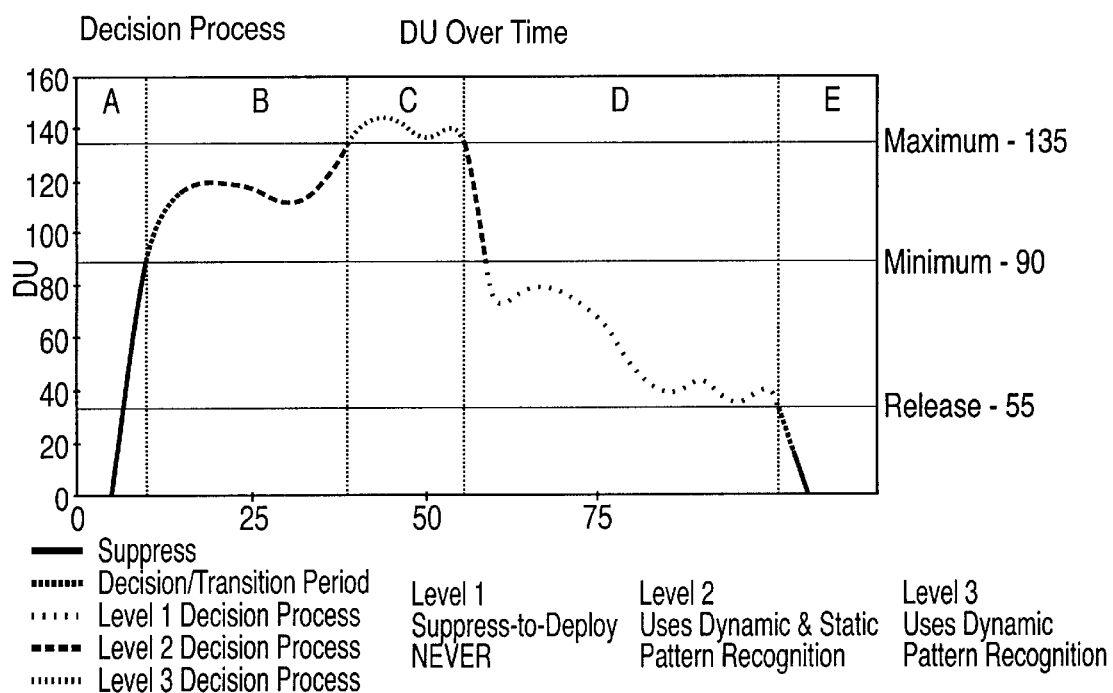
FIG. 36 is a graph illustrating a decision process of the Decision-Making Module over time for a typical adult.

FIG. 36 is a graph showing the decision process as a seat is occupied and then evacuated in a hypothetical situation. Sections A thru E show the various stages of a seat occupation. The pattern system is passing throughout this example.

Section A: The occupant has just entered the seat and the DU is climbing but still below the Minimum level. At this point the system will not consider changing from Suppress to Deploy while DUs are still below Minimum.

Section B: The system DU is now above the Minimum level. The decision period deployWait is used by the system before it officially changes its state to "Deploy".

Section C: System DU is now above the Maximum level. Originally this level could only be forced to suppress if the Dynamic statistics forced it. However, some extreme child seat testing made it necessary to turn this feature off. This level can be used to pass extra information concerning the occupants size to the airbag system.

Section D: Now the occupant is beginning to climb out of the seat. As the DU drops below the Minimum level the decision to deploy is held. System DU must drop below the Release level for suppressWait time before a decision change to "Suppress" will be made.

Section E: System DU has now dropped below the Release level and the Decision/Transition Period line indicates that a decision change is being evaluated. If system DU stays below Release for suppressWait seconds the decision will be changed to "Suppress" as indicated by the solid Suppress line.

Figure 37:
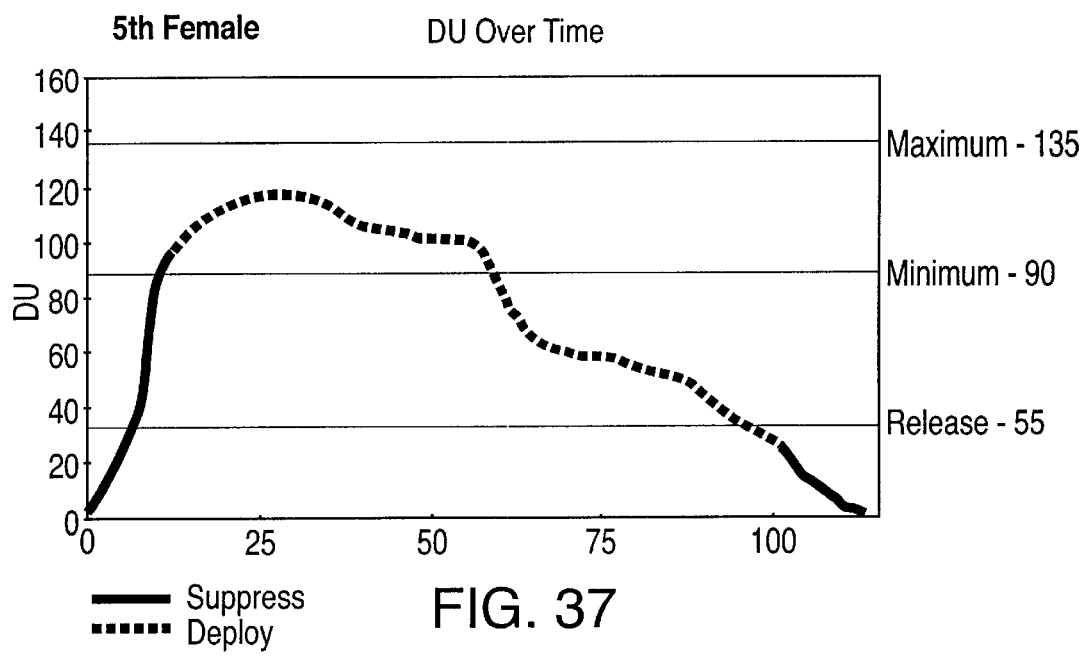
FIG. 37 is a graph illustrating the decision process of the Decision-Making Module over time for a typical $5^{th}$ percentile female.
Figure 38:
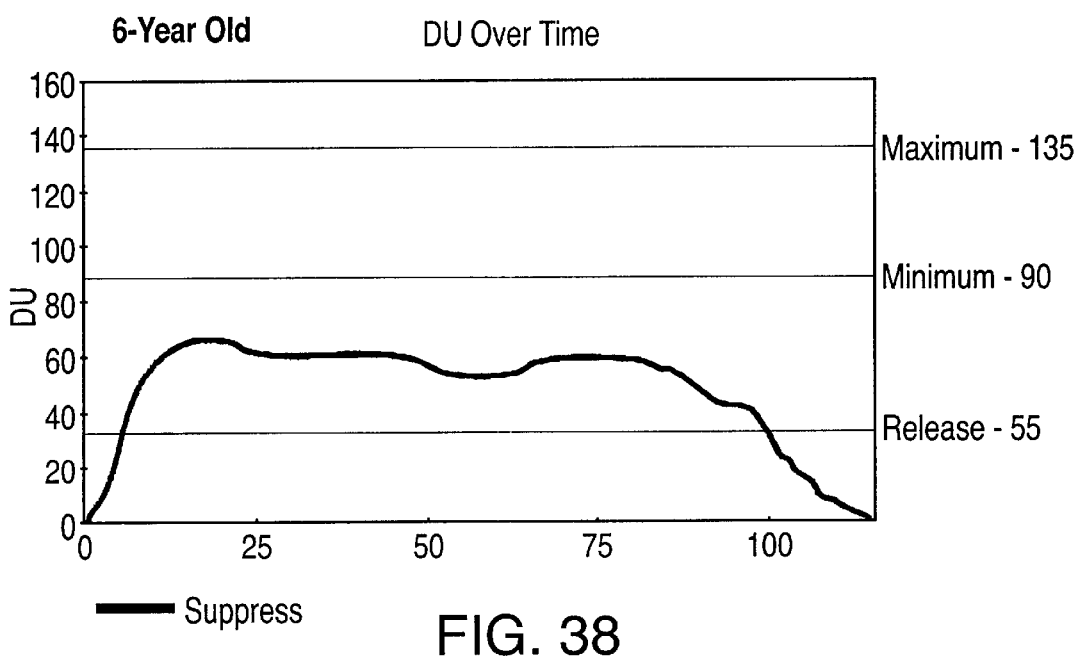
FIG. 38 is a graph illustrating the decision process of the Decision-Making Module over time for a typical 6-year old.

FIG. 37 shows a typical session with a $5^{th}$ percentile female. Notice that her DU never goes above the Maximum level. The $5^{th}$ percentile female is always passing the static and dynamic pattern tests in this example. FIG. 38 shows a typical session with a 6-year-old child. The system DU never goes above the Minimum level. While this example shows that the pattern test is passing, it should be noted that children will typically not pass the pattern system. FIG. 39 is an example of a child seat being occupied and then tightened dramatically with the seat belt, causing the system DU to go over the Maximum level. Because the pattern system does not pass for this occupant (indicated by the dashed line), however, the decision status never changes to "Deploy".

Each frame, five different counters are used to monitor the static frame-based statistics for each second of operation:

patternYES→incremented if pattern filters are "TRUE" (occupant is passing the pattern tests).

minYES→incremented if system DU is greater than minDU level.

maxYES→incremented if system DU is greater than maxDU level.

releaseYES→incremented if system DU is greater than releaseDU level.

ZeroYES→incremented if system DU less than emptyvalue level (seat qualifies for empty status).

Figure 41:
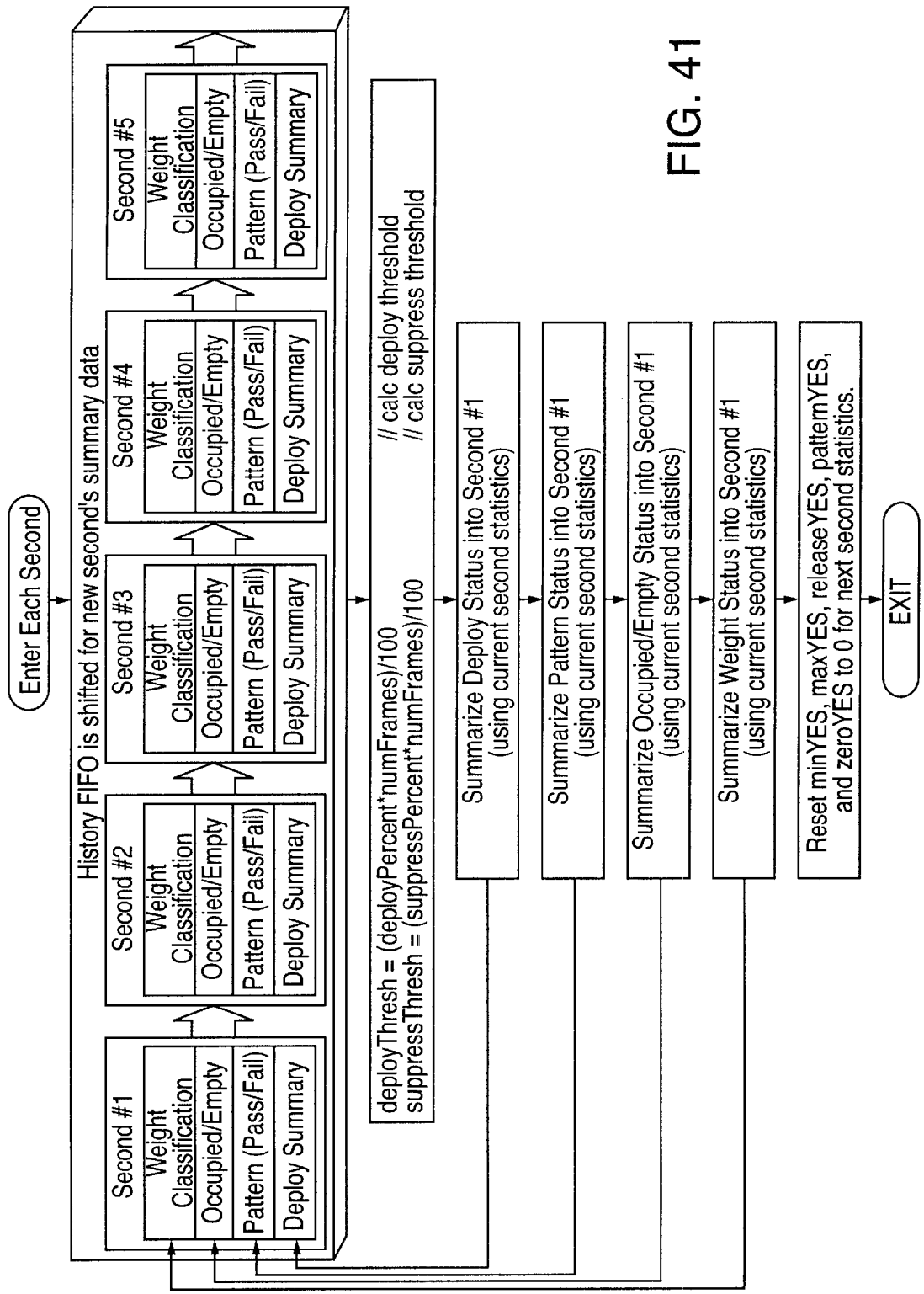
FIG. 41 is schematic diagram illustrating the updating and use of the History FIFO.

Since the number of frames in each second is pre-defined, the number of failures for each test can be calculated quickly. Referring to FIGS. 40 and 41, at the end of each second, the static statistics are summarized into the History FIFO structure. First the structure is shifted to make room for the new summary data. Two thresholds are calculated based on deploypercent and suppressPercent. These numbers represent the percentage threshold that must be reached by each static count of the total frames per second before the summary may be swung toward a "Suppress" or "Deploy" decision. If the count qualifies in the "Deploy" direction it is assigned a DMdeploy value. If it qualifies in the "Suppress" direction it is assigned a DMsuppress value. If any count does not reach the necessary percentage total determined by deployPercent or suppressPercent it is assigned a DMNeither value, which means that it will not contribute to an overall decision change.

Then the FIFO is evaluated for the possibility of a decision change. If the current status is "Deploy", the suppressWait number of seconds is evaluated to see if all their summaries warrant a decision change. To change decision to "Suppress", the following must be true for all evaluated History cells.

minDU values must all be DMsuppress.

maxDU values must all be DMsuppress.

releaseDU values must all be DMsuppress.

patternstatus does not matter.

occupiedStatus does not matter.

If the current status is "Suppress", the deployWait number of seconds is evaluated to see if all their summaries warrant a decision change. To change the decision to "Deploy", the following must be true for all evaluated History cells.

minDU values must all be DMdeploy.

maxDU values do not matter.

releaseDU values must all be DMdeploy.

patternStatus values must all be DMdeploy.

occupiedStatus values must all be DMdeploy.

Occupant must also be steady (see below).

Recognizing when the occupant is moving or still (steady) is important to system performance. Collecting snapshots or statistical information while the occupant is in motion is very unreliable. However, collecting information when the occupant has been still (steady) for a period of time increases the overall reliability of the system.

Figure 42:
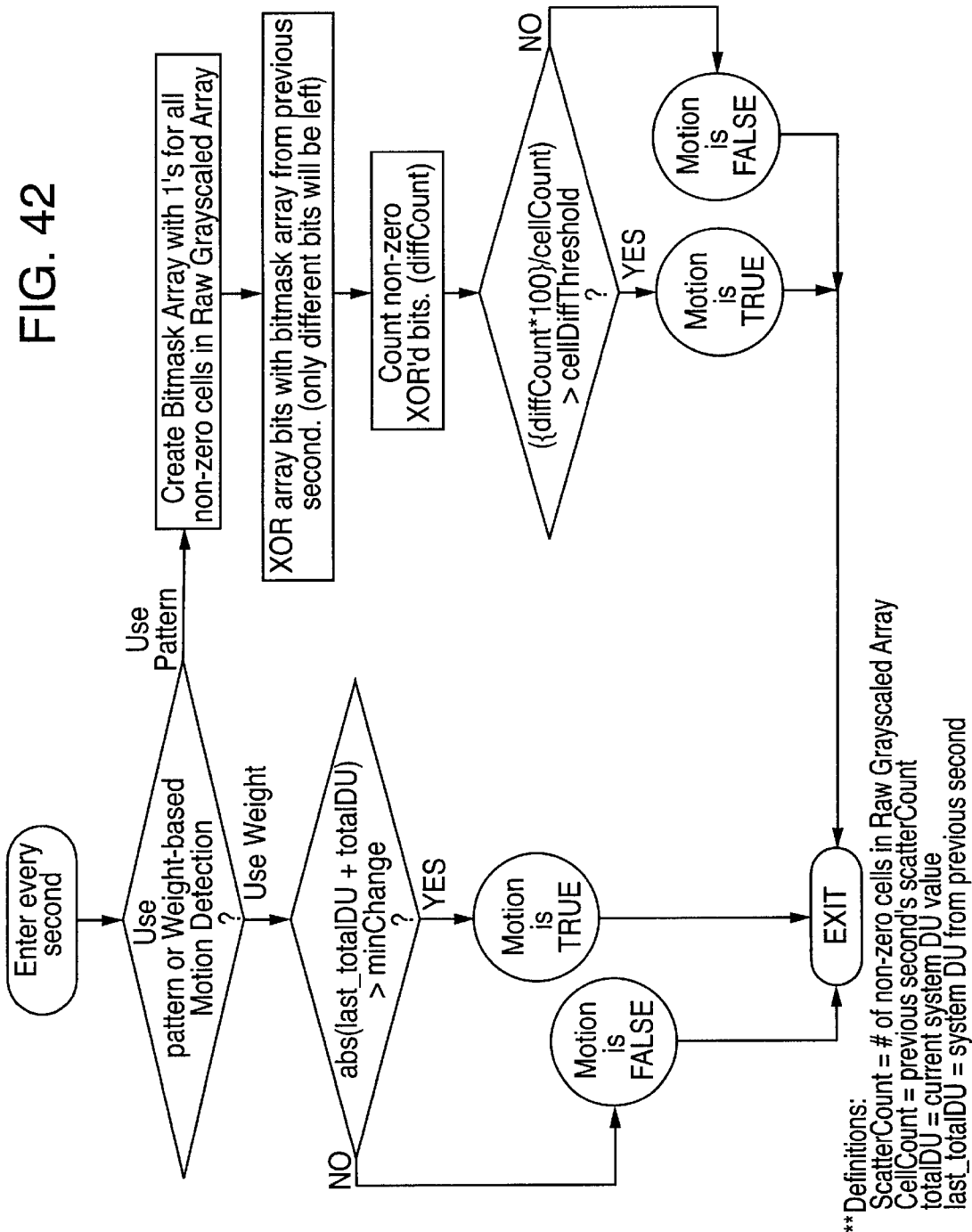
FIG. 42 is flow diagram illustrating methods for pattern and weight-based motion detection during the decision process.

Referring to FIG. 42, the system can use either of two methods for occupant motion detection. One simply monitors system DU fluctuations over time against a predetermined threshold. The other uses the pattern system 300 to detect pattern shifts over time. Both methods are depicted in the flow chart shown in FIG. 42. Motion detection is currently performed once per second. Upon entering the routine, a flag is checked to see which type of motion detection has been activated (weight-based or pattern-based).

Weight-based Motion Detection

Following are the terms used in the weight-based (system DU) implementation of motion detection:

minChange: A preset threshold for amount of absolute change tolerated in system DU before motion is flagged.

totalDU: Current system DU for current frame.

last_totalDU: Cached system DU from previous second—used to compare against current system DU. The absolute value of the difference between totalDU and last_totalDU is compared against minChange. If this value is greater than minChange, motion is flagged in a system status bit.

```
if (abs(last_totalDU - totalDU) > minChange)
{
    system.flags.motion = TRUE;
}
else
{
    system.flags.motion = FALSE;
}
```

Pattern-based Motion Detection

Following are the terms used in the pattern-based implementation of motion detection:

ScatterCount: The number of non-zero cells in the Raw Grayscale array 260.

cellCount Set equal to the previous second's ScatterCount.

cellDiffThreshold: A preset threshold describing the number of cells which may change from the previous pattern before motion is flagged to the system. This term may be a percentage of total non-zero bits or simply an absolute value. Using a percentage of non-zero bits allows the sensitivity to scale based on the size of the occupant.

rawGrayBits: An array of bits—one for each cell in the Raw Grayscale Array 260. The current Raw Grayscale array 260 is used to create this structure. Each non-zero cell is represented as with a "1" (set bit).

last_rawGrayBits: The rawGrayBits structure from the previous second's motion test.

diffCount: The number of non-zero cells after XOR-ing the current array of bits with the previous array of bits (i.e., the total number of cells that have changed).

Implementation of the pattern-based motion detection is as follows:

Step #1: The array rawGrayBits is filled with a "1" for each non-zero cell in the Raw Grayscale array 260 and a "0" for each zero cell.

Step #2: cellCount is set equal to ScatterCount (number of non-zero cells in Raw Grayscale array 260).

Step #3: rawGrayBits is XOR'd with last_rawGrayBits to create an array with "1's" representing the pattern-based difference from the previous second.

Step #4: diffCount is set to the number of non-zero cells after the XOR process.

Step #5: The percentage change is calculated using diffCount and cellCount according to the equation: ((diffCount*100)/cellCount).

Step #6: The percentage is compared to cellDiffThreshold. If it is greater the system motion flag is set "TRUE".

Deciding when the seat is occupied and empty is an important task of the occupant classification system 55. A description of the basic decision algorithm will now be provided. In general, the system checks every second to see if the seat occupied status has changed. The terms used are:

totalDU: Current system DU for current frame.

emptyValue: DU threshold for empty or occupied seat.

occupiedWait: Number of seconds the system DU must be above emptyValue before status can be set to "occupied".

emptyWait: Number of seconds the system DU must be less than or equal to emptyvalue before status can be set to "empty".

If the system is occupied, the system simply checks to see if totalDU (system DU) is less than or equal to emptyvalue for a total of emptywait seconds. It does this using the History FIFO structure. If the system is empty it will not test for occupied status unless no motion is detected (must be steady). If the status is "steady", it will check to see if the totalDU (system DU) has been greater than emptyvalue for occupiedWait seconds. It does this using the History FIFO structure.

Referring to FIG. 43, the Dynamic Pattern Process is a running statistic of the occupant's pattern status for the entire period the seat is occupied. These statistics are only collected when the occupant has been "steady" for a pre-defined period, sampleTime1. The statistics are weighted (increased by a greater amount) when the occupant has been steady for an additional amount of time, sampleTime2. This is based on the assumption that as the occupant is steady for longer periods of time, greater statistical weight should be used for the data gathered. The terms used in this implementation are:

sampleTime1: Initial period of time the occupant must be steady before sampleWeight1 is added to the running statistical sample.

sampleTime2: Secondary, longer period of time the occupant must be steady before sampleWeight2 is added to the running statistical sample.

steadyCount: System variable used to count the number of seconds the current occupant has been steady. This value is always zero if there is movement or the seat is empty.

patternPass: System Boolean variable that is set to "TRUE" if the current occupant is passing the pattern recognition tests (occupant qualifies for "Deploy" decision—provided they are heavy enough).

patternY: Running statistical total used to represent pattern system passing occupant.

patternN: Running statistical total used to represent pattern system rejecting occupant.

sampleWeight1: Initial value added to patternY or patternN once occupant has been steady for sampleTime1 seconds.

sampleWeight2: Secondary valued added to patternY or patternN if occupant has been steady for sampleTime2 seconds.

Use of Dynamic Pattern for Decision Process

The following terms are used in the dynamic pattern test for the decision process:

patternCutOff: If patternN and patternY are totaled, patternCutOff represents the percentage patternN must reach to force a "Suppress" decision.

Dynamic pattern is used to correct a wrong decision by the system. Over the course of all testing to date, this statistic has always reflected the correct decision. When patternN and patternY are totaled, if patternN is large enough to exceed the patternCutOff percent, the decision will be forced to "Suppress".

```
if (patternN || patternY)      // make sure at least one is not zero
{
    // now calculate percentage represented by patternN
    percentageN = (patternN * 100) / (patternN + patternY);
}
else percentageN = 0;
if ((use_Pattern) && (percentageN >= patternOutOff))
{
    Decision = Suppress;      // if cutOff is met or exceeded
}                             // force Suppress decision
```

System Timing

Understanding the timing of the system and knowing when data is processed is important to an overall understanding of the system operation. FIG. 44 schematically illustrates the timing of the classification system according to a preferred implementation. Referring to FIG. 44, sensor data is read, conditioned, and processed by both the Weight Estimation 200 and Pattern Modules 300 at sixty frames per second. At the end of each frame's processing, the results are summarized and added to statistical data being kept for that second. Furthermore, every second, the last five seconds of frame histories are analyzed and the current deploy status is updated.

It is important to note, however, that frame timing is simply an adjustable parameter of the classification system and can be set to any desired frequency based on the particular needs of a given platform. There are at least three reasons why having an adjustable frame-processing rate is advantageous. First of all, there may be certain conditions that require a faster decision process. Second, there may be a need to sample data at a different rate. Finally, frame-based timing makes exact simulation possible and promotes a robust development environment.

FIG. 45 shows the steps involved in updating the Current Decision, from the point of data entering the system to the point that a new decision may be determined. These steps will be described in more detail in the following sections with reference to FIGS. 44 and 45.

Frame Processing

Frame Processing is based on the collection of sensor data. Each frame starts with the collection of sensor data 160 and ends with the incorporation of that data into the current second's statistical information 326. Data collection includes reading resistivities from the seat sensors and transforming them into digital values ranging between "0" and "255" using one or more analog-to-digital (A-to-D) converters. This is done during the read sensors step 162. Other types of data available to the system that could be detected and evaluated include thermistor data, ignition voltage, battery voltage, and so on.

A preferred embedded system embodiment has four A-to-D input lines, or read lines, dedicated for receiving seat sensor input. Each line is fed by an 8-to-1 multiplexer (MUX), allowing up to thirty-two analog sensor signals to be multiplexed into the four A-to-D lines. The printed circuit board (PCB) supports up to twenty-eight external seat sensors, although the presently preferred sensor mat design uses only twenty-two sensors.

Each sensor mat 50 (see FIG. 3) for a car platform will have its own unique design based on the seat foam and trim. Each type of mat will typically have its sensors connected to the PCB sensor bus in a unique order. Once the raw sensor values are read across this bus, they must be converted to a standard order for processing. Step 164 applies an InputMap to the sensor data in order to accomplish this. An InputMap is a 28-byte array used to re-map the sensor positions for a particular mat 50. The same mapping is used for all seats in a platform. The array is 1-based, allowing the values "0" and anything greater than "28" to have special meaning. Furthermore, each entry in the array is a 1-based (as opposed to a 0-based ) index used to re-map each raw sensor value to a new position in a 28-byte array. A for-loop in C computer language would look like this:

```
for (uchar i = 0; i<28; i++)
{
    mappedSensors[i] = rawSensors[inputMap[i]-1];
}
```

Some designs may require the omission of certain sensors on a mat. Any omitted sensor is designated with an index value of "0". For omitted sensors, a dummy value of "50" is used as the raw data. This minimizes conditional processing throughout the rest of the system. Support for this feature in the same loop described above would look like this:

```
for (uchar i = 0; i<28; i++)
{
    if (inputMap[i] != 0)
    {
        mappedSensors[i] = rawSensors[inputMap[i]-1];
    }
    else
    {
        mappedSensors[i] = 50;
    }
}
```

Once a sensor's input is mapped to a standard position, the sensor data is averaged against previous data for the same sensor during step 166. This is done with two cascading 3-byte buffers for each sensor. As each buffer is processed, a temporary byte is used to make that 3-byte buffer equivalent to a 4-byte buffer. This results in memory savings. The first buffer (avgBuf1) is used to average the direct sensor data where:

$$Avg=(avgBuf1[0]+avgBuf1[1]+avgBuf1[2]+CurrentSensorData)/4$$

The averaged value from the first averaging buffer is fed into the second buffer (avgBuf2) where:

$$Avg=(avgBuf2[0]+avgBuf2[1]+avgBuf2[2]+Avg)/4$$

Finally, after the averaging operation, each buffer's contents are shifted and the newest value is placed at position zero.

Weight Estimation During Frame Processing

Following is an abbreviated description of the operation of the Weight Estimation Module 200 during frame processing. Although the Weight Estimation Module 200 has been previously described, a brief description is contained here to facilitate a better understanding of the overall system in relation to frame processing. Still referring to FIG. 45, the first step 210 of weight estimation is a DU calculation for each sensor. The DU calculation uses the Averaged Sensor data that has been processed with the averaging buffers and the seat calibration data (created during the seat assembly process) to calculate each sensor's deflection in terms of a DU value. Specifically, each sensor is normalized and its relative deflection (Sensor Delta) is used to obtain a DU value (Sensor DU) by interpolating on the Ledge Curve defined using the calibration data for that sensor.

A Raw Grayscale Array is then created (step 212) so that an Orphan Filter can be applied (step 214) before calculating (step 216) the Raw DU. Although creation of the Raw Grayscale Array is described in the weight estimation section for accuracy, it is primarily used by the Pattern Module 300. Grayscaling is the first step used by the Pattern Module 300 to remove all absolute value references between sensors using the Sensor DUs. This helps the pattern for an occupant or object remain consistent regardless of its weight. The Raw Grayscale Array is a 28-byte array with grayscaled weights from "0" to "3" (with "3" being the most deflection). This array is used for most pattern-related operations.

The Orphan Filter then searches, during step 214, for two types of orphan sensor deflections using the Raw Grayscale Array, namely, sensor deflections without any neighbors, and sensor deflections with only one diagonal neighbor. Any orphan sensor deflections found by the Orphan Filter are eliminated in both the Sensor DU Array and the Raw Grayscale Array by writing a value of "0" at each orphan's location. This filter keeps anomalous sensor movement from distorting results from the Weight Estimation and Pattern Modules.

The Raw System DU is calculated in the Weight Estimation Module 200, during step 216, by adding together all of the Sensor DU values in the Sensor DU Array. The Raw DU value 208 is sent to the Pattern Module 300 where it is used to calculate the Decision DU in a Decision Adjustment phase 320. The Decision DU is ultimately what the system uses as the final estimated weight.

Pattern Evaluation During Frame Processing

An abbreviated description of the Pattern Module 300 during frame processing will now be provided with continued reference to FIG. 45. An Averaged Array is created in step 310 by computing its cell values from the average of the four Sensor DUs on its corners (with a "0" value for any corner without a Sensor DU). The Averaged Array is an anti-aliased image of the Sensor DUs. The Averaged Array is then reduced into an Averaged Grayscale Array with values from "0" to "3" to remove all absolute references from the sensor data. The two grayscaled arrays (Raw and Averaged) are used to process the data in the Pattern Module 300. The relative weights of many regions are also calculated, as well as the width, height, number of active sensors, which rows and columns have occupied sensors, the grayscaled weights for each, and many other values.

Pattern subsystems of the Pattern Module 300 process the pattern data during step 312 to manage or influence the deploy or suppress status of the airbag by identifying non-live occupants such as child seats. The Child Seat Detection subsystem directly initiates a suppress decision when it identifies a deflection pattern indicative of a child seat. The Occupant Classification subsystem, however, only indirectly contributes to system status by altering the final Decision DU when appropriate. The Occupant Classification subsystem also monitors the occupant's position in the seat to allow prioritization of status decisions. Two specific subsystems include the Thin-Wide and ScatterCount subsystems. The Thin-Wide subsystem measures the width of the occupant in the Averaged Grayscale Array and determines if the width is indicative of a $5^{th}$ Percentile Female or a 6-Year Old child. The ScatterCount subsystem analyzes the number of non-zero cells in the Raw Grayscale Array 260. If either of these subsystems determine that the data is indicative of a 6-Year Old in the seat, it will make the Decision DU equal to one-half the Raw DU 208.

Updating the Frame Summary

Figure 46:
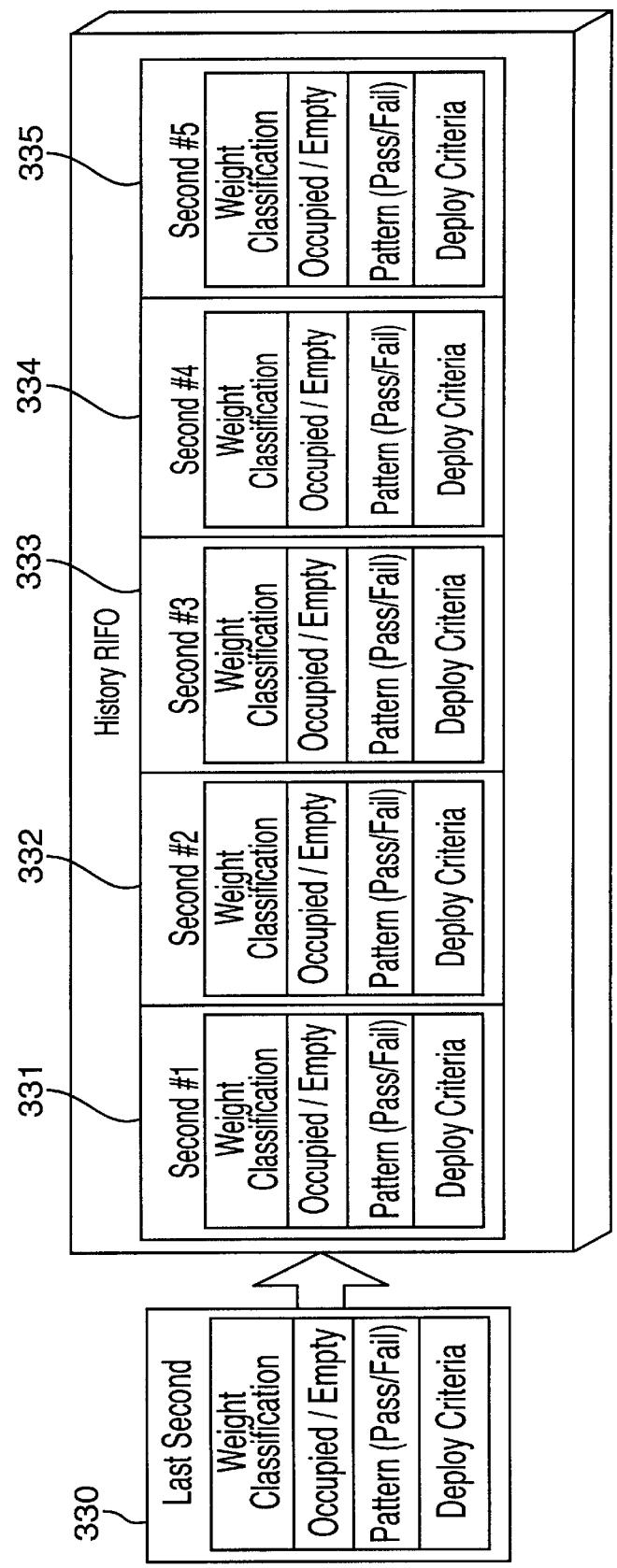
FIG. 46 is a block diagram illustrating the updating of a frame summary in the frame processing of FIG. 45.

FIG. 46 is a block diagram illustrating how the frame summary is updated during step 326 of the process illustrated in FIG. 45. Referring to FIG. 46, statistical information from each of the previous five seconds 331, 332, 333, 334, 335 is maintained by the classification system in a History FIFO queue 328. Some categories of statistical information retained include Estimated Weight, Child Seat Pattern Results, and whether Deploy or Suppress conditions are met. For each new frame, the status for each category has a counter incremented based on the new frame's state.

In the present preferred embodiment, the decision-making process occurs every second. This process could be adjusted, however, to occur at any interval of the Frame Process rate. During the decision-making process, the current (last second's) statistical counters 330 are summarized and pushed onto the History FIFO queue 328. Presently, up to five seconds of history can be used to determine the deploy or suppress status. It should further be noted, however, that deploy and suppress status decisions can have different decision times. In order to allow different decision times, the deploy decision uses a Deploy Seconds value while the suppress decision uses a Suppress Seconds value.

The Decision-Making Module 400 further includes safety features to prevent transitioning between suppress and deploy states when it would be inappropriate. One of these safety features prevents child seats and small children from causing a transition to the deploy state from the suppress state. The system does this by not allowing a transition from the suppress state to the deploy state unless the following are true for a configurable number of consecutive seconds (preferably between 3–5 seconds): First, the Child Seat Pattern Module subsystem must not have "failed" the occupant (i.e., identified a child seat); and second, the estimated weight must be above the minimum system DU setting. Conversely, to allow a transition from the deploy to the suppress state, the estimated weight must be below a system "release" DU setting for a configurable number of consecutive seconds (preferably between 3–5 seconds).

Occupant motion and steady states are also tracked by the classification system to ensure accurate and reliable deployment decisions. Another key safety feature of this system is that certain operations are performed only when the occupant is not moving. For instance, pattern statistics are only collected when the occupant has been steady for a pre-determined period of time. The decision to block information from an occupant in motion is based on two main considerations. First, pattern and weight statistics always tell a clear story after an occupant has been in the seat long enough; and second, in order to prevent false readings, occupant statistics should only be collected when the occupant has been stationary for a pre-determined period of time. Accordingly, all statistics are updated based on the occupant being stationary for a given number of seconds.

Another process for preventing errors in deployment decisions is Margin Management. Margin Management is the process of adjusting thresholds in the system based on the current status of the occupant. For instance, if the occupant is clearly a small child, Margin Management may increment the thresholds used to characterize occupant size upward. This helps decrease the chance that a child will somehow fool the system over time. However, the thresholds are never adjusted to a point where a true adult could not be detected. This mechanism allows for quick recoveries if an initial decision is incorrect.

Having described and illustrated the principles of the invention in various embodiments thereof, it should be apparent that the invention can be modified in arrangement and detail without departing from such principles. I therefore claim all modifications and variations coming within the spirit and scope of the following claims.

What is claimed is:

1. A vehicle occupant detection system comprising:
   a sensor array comprising a plurality of sensors arranged in a vehicle seat;
   a calibration unit configured to calibrate the sensors to normalize sensor sensitivities across the sensor array;
   a weight estimation module configured to estimate a weight of a seat occupant based on deflections of the seat created by the seat occupant;
   a pattern module configured to analyze deflection patterns of the seat, wherein the pattern module is configured to generate and analyze a grayscaled image of the sensor deflections; and
   a decision-making module configured to make a deployment state decision for an airbag based on data from one or more of the other modules, wherein the decision-making module is configured to make an airbag deployment state decision based on information from the pattern module, and wherein the deployment state decision comprises a decision regarding airbag deployment force, airbag deployment direction, or whether or not to deploy the airbag at all.

2. A vehicle occupant detection system according to claim 1, wherein the pattern module comprises a plurality of filters configured to test for characteristics of non-human occupants.

3. A vehicle occupant detection system according to claim 2, wherein the plurality of filters comprises one or more filters configured to test for edge deflections caused by rigid objects in the seat.

4. A vehicle occupant detection system according to claim 1, wherein the decision-making module comprises a memory buffer for storing statistical data corresponding to occupant weight and pattern trends.

5. A vehicle occupant detection system according to claim 4, wherein the decision-making module is configured to analyze the statistical data stored in the FIFO memory buffer to make the deployment state decision.

6. A vehicle occupant detection system according to claim 1, wherein the decision-making module is configured to make the deployment state decision based on the weight estimate from the weight estimation module and on the deflection pattern analysis from the pattern module.

7. A vehicle occupant detection system comprising;
   a sensor array comprising a plurality of sensors arranged in a vehicle seat;
   a calibration unit configured to calibrate the sensors to normalize sensor sensitivities across the sensor array, wherein the calibration unit receives and uses a seat-specific calibration template file to calibrate the sensors, and wherein the seat-specific calibration template file includes data comprising one or more variables selected from a group including a baseline range, a calibration position range, a minimum delta filter value, a delta filter percentage value, a gain, and a maximum delta percent;
   a weight estimation module configured to estimate a weight of a seat occupant based on deflections of the seat created by the seat occupant;
   a pattern module configured to analyze deflection patterns of the seat; and a decision-making module configured to make a deployment state decision for an airbag based on data from one or more of the other modules.

8. A vehicle occupant detection system according to claim 7, wherein the calibration unit uses a deflection force for calibration that is selected to focus system sensitivity on a $5^{th}$ Percentile Female's typical weight characteristics.

9. A vehicle occupant detection system according to claim 7, wherein the calibration unit is further configured to receive sensor data from the seat in response to the deflection force and to produce calibration data for each sensor.

10. A vehicle occupant detection system comprising:
    a sensor array comprising a plurality of sensors arranged in a vehicle seat;
    a calibration unit configured to calibrate the sensors to normalize sensor sensitivities across the sensor array;
    a weight estimation module configured to estimate a weight of a seat occupant based on deflections of the seat created by the seat occupant, wherein the weight estimation module comprises an interpolation algorithm configured to estimate the weight by interpolation using deflection values for the sensors, wherein the interpolation algorithm is configured to optimize sensor focus to distinguish between $5^{th}$ percentile females and 6-year olds;
    a pattern module configured to analyze deflection patterns of the seat; and
    a decision-making module configured to make a deployment state decision for an airbag based on data from one or more of the other modules.

11. A vehicle occupant detection system according to claim 10, wherein the interpolation algorithm of the weight estimation module comprises a ledge region where increases in deflection values correspond to relatively smaller increases in a weight estimate component as compared to other regions.

12. A method of making a deployment state decision for an airbag, said method comprising:
    calibrating the plurality of sensors arranged in the sensor array by applying a selected calibration force to the seat and measuring sensor values;
    selecting the calibration force according to a target weight of a $5^{th}$ Percentile Female;
    receiving sensor data from a plurality of sensors arranged in a sensor array in a seat bottom, wherein said sensor data is representative of seat deflections caused by a seat occupant;
    estimating a weight of the seat occupant using the sensor data;
    analyzing a sensor array deflection pattern using the sensor data; and
    using the weight estimate and deflection pattern analysis to make a deployment state decision for an airbag.

13. A method according to claim 12, further comprising: optimizing sensor detection of a $5^{th}$ Percentile Female's secondary deflection forces by applying the selected calibration force according to a target deflection pattern.

14. A method according to claim 12, wherein calibrating the plurality of sensors produces calibration data used to normalize relative sensor variations.

15. A method according to claim 12, further comprising using calibration information to produce calibration data from baseline and calibration position values for each sensor by:
    determining a difference between the baseline value and the deflected value to obtain a delta value;
    scaling the delta value to obtain a scaled delta value;

error checking to verify that the scaled delta value is within an appropriate range;

filtering the scaled delta value to obtain a filtered delta value; and comparing the filtered delta value with a minimum filtered delta value from the calibration information and taking the greater of the two values as a final filtered delta value.

16. A method for calibrating a seat sensor system according to claim 15, wherein determining a difference includes subtracting the baseline value from the deflected value.

17. A method for calibrating a seat sensor system according to claim 15, wherein scaling includes multiplying the delta value by a gain percentage obtained from the calibration information.

18. A method for calibrating a seat sensor system according to claim 15, wherein filtering includes multiplying the scaled delta value by a filter percentage from the calibration information.

19. A method for calibrating a seat sensor system, said method comprising:

measuring a baseline value of sensors in the sensor system; and physically loading the sensors with a known calibration force to determine a calibration position value of the sensor, wherein the known calibration force is representative of a $5^{th}$ percentile female.

* * * * *

UNITED STATES PATENT AND TRADEMARK OFFICE
CERTIFICATE OF CORRECTION

PATENT NO. : 6,609,054 B2
DATED : August 19, 2003
INVENTOR(S) : Wallace

It is certified that error appears in the above-identified patent and that said Letters Patent is hereby corrected as shown below:

Drawings,
Figure 1, "FIG. 1" should read -- FIG. 1 (PRIOR ART) --.

Column 40,
Line 51, "Occupant must also" should read -- **Occupant must also --.

Column 41,
Line 31, "cellCount Set" should read -- cellCount: Set --.

Column 43,
Line 12, "patternOutOff" should read -- patternCutOff --.

Column 47,
Line 48, "system comprising;" should read -- system comprising: --.

Signed and Sealed this

Thirteenth Day of April, 2004

JON W. DUDAS
*Acting Director of the United States Patent and Trademark Office*